(12) United States Patent
Peal et al.

(10) Patent No.: US 11,745,039 B2
(45) Date of Patent: Sep. 5, 2023

(54) ASSISTED RACKING OF DIGITAL RESISTANCE

(71) Applicant: Tonal Systems, Inc., San Francisco, CA (US)

(72) Inventors: Gabriel Peal, San Francisco, CA (US); Brandt Belson, San Francisco, CA (US)

(73) Assignee: Tonal Systems, Inc., San Francisco, CA (US)

( * ) Notice: Subject to any disclaimer, the term of this patent is extended or adjusted under 35 U.S.C. 154(b) by 0 days.

(21) Appl. No.: 17/855,100

(22) Filed: Jun. 30, 2022

(65) Prior Publication Data

US 2022/0339481 A1 Oct. 27, 2022

Related U.S. Application Data

(63) Continuation-in-part of application No. 17/553,591, filed on Dec. 16, 2021, which is a continuation of (Continued)

(51) Int. Cl.
*A63B 21/005* (2006.01)
*A63B 21/00* (2006.01)
(Continued)

(52) U.S. Cl.
CPC .... *A63B 21/0059* (2015.10); *A63B 21/00181* (2013.01); *A63B 21/015* (2013.01);
(Continued)

(58) Field of Classification Search
CPC .......... A63B 21/0059; A63B 21/00181; A63B 21/015; A63B 21/018; A63B 21/16;
(Continued)

(56) References Cited

U.S. PATENT DOCUMENTS

| 3,465,592 A | 9/1969 | Perrine |
| 3,511,225 A | 5/1970 | Gunpei |

(Continued)

FOREIGN PATENT DOCUMENTS

| CN | 2681776 | 3/2005 |
| CN | 2683184 | 3/2005 |

(Continued)

OTHER PUBLICATIONS

Brakel, J.P.G. Van. "Robust peak detection algorithm using z-scores". Stack Overflow. 2014 (version: Nov. 8, 2020).

(Continued)

*Primary Examiner* — Sundhara M Ganesan
(74) *Attorney, Agent, or Firm* — Van Pelt, Yi & James LLP

(57) ABSTRACT

Assisted racking of digital resistance includes detecting a state of a cable. A motor is mechanically coupled to the cable to provide resistance during an exercise by tensioning the cable. It further includes determining completion of the exercise based at least in part on the detected state of the cable. It further includes selectively removing resistance from the cable based at least in part on the determination that the user has completed the exercise.

14 Claims, 27 Drawing Sheets

Related U.S. Application Data application No. 17/179,289, filed on Feb. 18, 2021, now Pat. No. 11,285,351, which is a continuation of application No. 16/737,684, filed on Jan. 8, 2020, now Pat. No. 11,465,006, which is a continuation of application No. 15/655,682, filed on Jul. 20, 2017, now Pat. No. 10,661,112.

(60) Provisional application No. 63/316,073, filed on Mar. 3, 2022, provisional application No. 62/366,573, filed on Jul. 25, 2016.

(51) Int. Cl.

| | | |
|---|---|---|
| *A63B 21/16* | (2006.01) | |
| *A63B 23/12* | (2006.01) | |
| *A63B 24/00* | (2006.01) | |
| *A63B 21/015* | (2006.01) | |
| *A63B 21/018* | (2006.01) | |
| *A63B 71/00* | (2006.01) | |
| *H02P 1/04* | (2006.01) | |
| *H02P 1/16* | (2006.01) | |
| *G01L 5/107* | (2020.01) | |
| *G01L 5/04* | (2006.01) | |
| *G01L 1/22* | (2006.01) | |
| *G01G 9/00* | (2006.01) | |
| *G01L 1/04* | (2006.01) | |

(52) U.S. Cl.
CPC ............ *A63B 21/018* (2013.01); *A63B 21/16* (2013.01); *A63B 21/169* (2015.10); *A63B 21/4035* (2015.10); *A63B 23/1281* (2013.01); *A63B 24/0062* (2013.01); *A63B 24/0087* (2013.01); *A63B 71/0054* (2013.01); *G01L 5/04* (2013.01); *G01L 5/107* (2013.01); *H02P 1/04* (2013.01); *H02P 1/166* (2013.01); *A63B 2071/0072* (2013.01); *A63B 2220/17* (2013.01); *A63B 2220/34* (2013.01); *A63B 2220/40* (2013.01); *A63B 2220/62* (2013.01); *A63B 2220/80* (2013.01); *A63B 2220/805* (2013.01); *A63B 2220/833* (2013.01); *G01G 9/00* (2013.01); *G01L 1/04* (2013.01); *G01L 1/22* (2013.01)

(58) Field of Classification Search
CPC .............. A63B 21/169; A63B 21/4035; A63B 23/1281; A63B 24/0062; A63B 24/0087; A63B 71/0054; A63B 2071/0072; A63B 2220/17; A63B 2220/34; A63B 2220/40; A63B 2220/62; A63B 2220/80; A63B 2220/805; A63B 2220/833
See application file for complete search history.

(56) References Cited

U.S. PATENT DOCUMENTS

| | | |
|---|---|---|
| 3,953,025 A | 4/1976 | Mazman |
| 4,261,562 A | 4/1981 | Flavell |
| 4,616,823 A | 10/1986 | Yang |
| 4,798,378 A | 1/1989 | Jones |
| 4,817,939 A | 4/1989 | Augspurger |
| 4,869,497 A | 9/1989 | Stewart |
| 4,898,381 A | 2/1990 | Gordon |
| 5,020,794 A | 6/1991 | Englehardt |
| 5,042,798 A | 8/1991 | Sawicky |
| 5,104,121 A | 4/1992 | Webb |
| 5,117,170 A | 5/1992 | Keane |
| 5,265,589 A | 11/1993 | Wang |
| 5,277,684 A | 1/1994 | Harris |
| 5,360,382 A | 11/1994 | Chi |
| 5,433,678 A | 7/1995 | Chi |
| 5,569,121 A | 10/1996 | Sellier |
| 5,583,403 A | 12/1996 | Anjanappa |
| 5,588,938 A | 12/1996 | Schneider |
| 5,624,353 A | 4/1997 | Naidus |
| 5,697,869 A | 12/1997 | Ehrenfried |
| 5,830,116 A | 11/1998 | Gautier |
| 5,897,444 A | 4/1999 | Hellyer |
| 5,993,356 A | 11/1999 | Houston |
| 6,027,429 A | 2/2000 | Daniels |
| 6,142,919 A | 11/2000 | Jorgensen |
| 6,227,047 B1 | 5/2001 | Livingston |
| 6,238,323 B1 | 5/2001 | Simonson |
| 6,280,361 B1 | 8/2001 | Harvey |
| 6,443,877 B1 | 9/2002 | Hoecht |
| 6,508,748 B1 | 1/2003 | Ish, III |
| 6,547,702 B1 | 4/2003 | Heidecke |
| 7,682,287 B1 | 3/2010 | Hsieh |
| 7,686,746 B2 | 3/2010 | Koyama |
| 7,695,418 B2 | 4/2010 | Ish, III |
| 7,885,785 B1 | 2/2011 | Pekarek |
| 7,909,742 B2 | 3/2011 | Ish, III |
| 7,985,166 B2 | 7/2011 | Farnsworth |
| 7,998,033 B1 | 8/2011 | Schroeder |
| 7,998,036 B2 | 8/2011 | Ish, III |
| 8,057,367 B2 | 11/2011 | Giannelli |
| 8,096,926 B1 | 1/2012 | Batca |
| 8,287,434 B2 | 10/2012 | Zavadsky |
| 8,308,620 B2 | 11/2012 | Lyszczarz |
| 8,333,681 B2 | 12/2012 | Schmidt |
| 8,337,364 B2 | 12/2012 | Ishii |
| 8,388,499 B1 | 3/2013 | Rindfleisch |
| 8,475,338 B2 | 7/2013 | Greenhill |
| 8,517,899 B2 | 8/2013 | Zhou |
| 8,727,946 B2 | 5/2014 | Greenhill |
| 8,834,328 B1 | 9/2014 | Batca |
| 8,845,499 B1 | 9/2014 | Boatwright |
| 8,900,097 B1 | 12/2014 | Griggs |
| 8,900,099 B1 | 12/2014 | Boyette |
| 8,968,155 B2 | 3/2015 | Bird |
| 9,211,434 B2 | 12/2015 | Giannelli |
| 9,457,220 B2 | 10/2016 | Olson |
| 9,656,116 B2 | 5/2017 | Giannelli |
| 9,700,753 B1 | 7/2017 | Boatwright |
| 9,861,856 B1 | 1/2018 | Miller |
| 9,901,766 B2 | 2/2018 | Ross |
| 9,901,768 B1 | 2/2018 | Wu |
| 9,999,795 B1 | 6/2018 | Jarosz |
| 10,004,945 B2 | 6/2018 | Sauter |
| 10,143,880 B1 | 12/2018 | Boatwright |
| 10,220,235 B2 | 3/2019 | Norris |
| 10,258,821 B2 | 4/2019 | Jeong |
| 10,265,572 B2 | 4/2019 | Bach |
| 10,286,253 B1 | 5/2019 | Johnson |
| 10,335,626 B2 | 7/2019 | Orady |
| 10,441,840 B2 | 10/2019 | Dalebout |
| 10,486,015 B2 | 11/2019 | Valente |
| 10,500,442 B2 | 12/2019 | Hong |
| 10,549,152 B2 | 2/2020 | Walker |
| 10,589,163 B2 | 3/2020 | Orady |
| 10,596,056 B2 | 3/2020 | Hou |
| 10,709,925 B2 | 7/2020 | Dalebout |
| 10,758,767 B2 | 9/2020 | Olson |
| 11,040,231 B2 | 6/2021 | Rubin |
| 11,097,148 B2 | 8/2021 | Kennington |
| 11,110,317 B2 | 9/2021 | Valente |
| 11,123,592 B2 | 9/2021 | Orady |
| 2001/0023221 A1 | 9/2001 | Simonson |
| 2003/0017918 A1 | 1/2003 | Webb |
| 2003/0032535 A1 | 2/2003 | Wang |
| 2003/0134722 A1 | 7/2003 | Greenland |
| 2003/0153438 A1 | 8/2003 | Gordon |
| 2003/0171192 A1 | 9/2003 | Wu |
| 2003/0176261 A1 | 9/2003 | Simonson |
| 2003/0207734 A1 | 11/2003 | LaStayo |
| 2004/0009848 A1 | 1/2004 | Lee |
| 2004/0082438 A1 | 4/2004 | LaStayo |
| 2004/0092369 A1 | 5/2004 | Slawinski |
| 2004/0157711 A1 | 8/2004 | Regev |

(56) References Cited

U.S. PATENT DOCUMENTS

| | | | |
|---|---|---|---|
| 2005/0143226 A1 | 6/2005 | Heidecke | |
| 2005/0143230 A1 | 6/2005 | Dalebout | |
| 2006/0006836 A1 | 1/2006 | Miehlich | |
| 2006/0040799 A1 | 2/2006 | Pompile | |
| 2006/0069336 A1 | 3/2006 | Krebs | |
| 2006/0229164 A1 | 10/2006 | Einav | |
| 2006/0234832 A1 | 10/2006 | Toyama | |
| 2006/0234840 A1 | 10/2006 | Watson | |
| 2007/0015096 A1 | 1/2007 | Soller | |
| 2007/0054785 A1 | 3/2007 | Drechsler | |
| 2007/0117691 A1 | 5/2007 | Sechrest | |
| 2007/0129223 A1 | 6/2007 | Kolomeir | |
| 2007/0135264 A1* | 6/2007 | Rosenberg | G09B 7/02 482/8 |
| 2007/0142187 A1 | 6/2007 | Kolomeir | |
| 2007/0155587 A1 | 7/2007 | Huang | |
| 2007/0161470 A1 | 7/2007 | Berryman | |
| 2007/0161472 A1 | 7/2007 | Drechsler | |
| 2007/0173384 A1 | 7/2007 | Sechrest | |
| 2007/0202992 A1 | 8/2007 | Grasshoff | |
| 2007/0224582 A1* | 9/2007 | Hayashino | A63B 21/0058 434/247 |
| 2007/0259759 A1 | 11/2007 | Sumners | |
| 2008/0051263 A1 | 2/2008 | Rasmussen | |
| 2008/0051267 A1 | 2/2008 | Ish, III | |
| 2008/0161733 A1 | 7/2008 | Einav | |
| 2008/0248926 A1 | 10/2008 | Cole | |
| 2008/0294074 A1 | 11/2008 | Tong | |
| 2008/0300116 A1 | 12/2008 | Eder | |
| 2009/0023561 A1 | 1/2009 | Ross | |
| 2009/0029835 A1 | 1/2009 | Ellis | |
| 2009/0036277 A1 | 2/2009 | Ish, III | |
| 2009/0075791 A1 | 3/2009 | Kissel | |
| 2009/0111666 A1 | 4/2009 | Wang | |
| 2009/0114892 A1 | 5/2009 | Lesko | |
| 2009/0170675 A1 | 7/2009 | Giannelli | |
| 2009/0221403 A1 | 9/2009 | Chan | |
| 2010/0001177 A1 | 1/2010 | Dolenti | |
| 2010/0069202 A1 | 3/2010 | Olsen | |
| 2010/0144496 A1 | 6/2010 | Schmidt | |
| 2010/0144497 A1 | 6/2010 | Clark | |
| 2010/0216600 A1* | 8/2010 | Noffsinger | A63B 23/12 482/5 |
| 2010/0298097 A1 | 11/2010 | Preumont | |
| 2010/0311552 A1 | 12/2010 | Sumners | |
| 2010/0331148 A1 | 12/2010 | Huang | |
| 2011/0152045 A1 | 6/2011 | Horne | |
| 2011/0172058 A1 | 7/2011 | Deaconu | |
| 2011/0183816 A1 | 7/2011 | Giannelli | |
| 2011/0275481 A1 | 11/2011 | Greenhill | |
| 2011/0294630 A1 | 12/2011 | Reyes | |
| 2012/0021876 A1 | 1/2012 | Hsiung | |
| 2012/0053014 A1 | 3/2012 | Zhu | |
| 2012/0088634 A1 | 4/2012 | Heidecke | |
| 2012/0231929 A1 | 9/2012 | Hsieh | |
| 2012/0279801 A1 | 11/2012 | Watson | |
| 2013/0095978 A1 | 4/2013 | Sauter | |
| 2013/0157816 A1 | 6/2013 | Lyszczarz | |
| 2013/0172153 A1 | 7/2013 | Watterson | |
| 2013/0289452 A1 | 10/2013 | Smith | |
| 2013/0296144 A1 | 11/2013 | Gvoich | |
| 2013/0331239 A1 | 12/2013 | Richards | |
| 2014/0038777 A1 | 2/2014 | Bird | |
| 2014/0113779 A1 | 4/2014 | Loach | |
| 2014/0121071 A1 | 5/2014 | Strom | |
| 2014/0194250 A1 | 7/2014 | Reich | |
| 2014/0194251 A1 | 7/2014 | Reich | |
| 2014/0226963 A1 | 8/2014 | Ryan | |
| 2014/0228174 A1* | 8/2014 | Olsen | A63B 24/0087 482/5 |
| 2014/0228175 A1 | 8/2014 | Lemos | |
| 2014/0287876 A1* | 9/2014 | Etter | A63B 24/0087 482/5 |
| 2015/0020620 A1 | 1/2015 | Garner | |
| 2015/0133828 A1 | 5/2015 | Hachisuka | |
| 2015/0148194 A1 | 5/2015 | Bird | |
| 2015/0165272 A1 | 6/2015 | Bird | |
| 2015/0190667 A1 | 7/2015 | Balandis | |
| 2015/0190678 A1* | 7/2015 | Golsby | A63B 21/00181 482/4 |
| 2015/0258381 A1 | 9/2015 | Suzuki | |
| 2015/0297934 A1 | 10/2015 | Agrawal | |
| 2015/0335950 A1 | 11/2015 | Eder | |
| 2015/0335951 A1* | 11/2015 | Eder | G16H 40/67 482/8 |
| 2015/0367162 A1 | 12/2015 | Mueller | |
| 2016/0101322 A1 | 4/2016 | Potter | |
| 2016/0114211 A1* | 4/2016 | Schmidt | A63B 21/154 482/8 |
| 2016/0151675 A1* | 6/2016 | Chazalon | A63B 24/0087 482/5 |
| 2016/0158603 A1 | 6/2016 | Darwood | |
| 2016/0193497 A1 | 7/2016 | Arst | |
| 2016/0243402 A1 | 8/2016 | Finadri | |
| 2016/0249832 A1 | 9/2016 | Carter | |
| 2016/0332019 A1 | 11/2016 | Rollins | |
| 2016/0332020 A1 | 11/2016 | Chen | |
| 2016/0346617 A1 | 12/2016 | Srugo | |
| 2016/0354638 A1 | 12/2016 | Carr | |
| 2016/0361597 A1* | 12/2016 | Cole | A63B 22/0087 |
| 2017/0173396 A1 | 6/2017 | Lu | |
| 2017/0197103 A1 | 7/2017 | Rau | |
| 2017/0239124 A1 | 8/2017 | Cunningham | |
| 2017/0239517 A1 | 8/2017 | Jeong | |
| 2017/0246507 A1 | 8/2017 | Kennington | |
| 2017/0266481 A1 | 9/2017 | Dalebout | |
| 2017/0282015 A1 | 10/2017 | Wicks | |
| 2017/0319905 A1 | 11/2017 | O'Connor | |
| 2017/0333756 A1 | 11/2017 | Bird | |
| 2017/0361165 A1 | 12/2017 | Miller | |
| 2018/0001181 A1 | 1/2018 | Von Prellwitz | |
| 2018/0021614 A1 | 1/2018 | Taft | |
| 2018/0021616 A1 | 1/2018 | Orady | |
| 2018/0160943 A1 | 6/2018 | Fyfe | |
| 2018/0214729 A1 | 8/2018 | Rubin | |
| 2018/0214730 A1 | 8/2018 | Larose | |
| 2018/0243600 A1 | 8/2018 | Kennington | |
| 2018/0290001 A1 | 10/2018 | Baek | |
| 2018/0326243 A1 | 11/2018 | Badi | |
| 2018/0361200 A1 | 12/2018 | Walker | |
| 2019/0001183 A1 | 1/2019 | Liao | |
| 2019/0046830 A1 | 2/2019 | Chiavegato | |
| 2019/0099632 A1 | 4/2019 | Orady | |
| 2019/0099633 A1 | 4/2019 | Orady | |
| 2019/0099637 A1 | 4/2019 | Valente | |
| 2019/0099652 A1 | 4/2019 | Orady | |
| 2019/0126099 A1 | 5/2019 | Hoang | |
| 2019/0160324 A1 | 5/2019 | Leopoldo Da Camara Filho | |
| 2020/0047027 A1 | 2/2020 | Ward | |
| 2020/0047030 A1 | 2/2020 | Ward | |
| 2020/0047053 A1 | 2/2020 | Ward | |
| 2020/0047054 A1 | 2/2020 | Ward | |
| 2020/0047055 A1 | 2/2020 | Ward | |
| 2020/0054929 A1 | 2/2020 | Ward | |
| 2020/0070005 A1* | 3/2020 | Lin | A63B 24/0087 |
| 2021/0008402 A1 | 1/2021 | Orady | |
| 2021/0170214 A1 | 6/2021 | Orady | |
| 2021/0379436 A1 | 12/2021 | Orady | |
| 2022/0032114 A1 | 2/2022 | Valente | |

FOREIGN PATENT DOCUMENTS

| | | |
|---|---|---|
| CN | 2817911 | 9/2006 |
| CN | 201631963 | 11/2010 |
| CN | 202554808 | 11/2012 |
| CN | 102671346 | 4/2014 |
| CN | 204219688 | 3/2015 |
| CN | 105498151 | 4/2016 |
| CN | 206508201 | 9/2017 |
| DE | 202006006751 | 6/2006 |
| EP | 3202465 | 8/2017 |
| FR | 2968571 | 1/2013 |

(56) References Cited

FOREIGN PATENT DOCUMENTS

| | | |
|---|---|---|
| JP | S62179478 | 8/1987 |
| JP | H07227439 | 8/1995 |
| JP | H10203467 | 8/1998 |
| JP | H11342226 | 12/1999 |
| JP | 3096472 | 9/2003 |
| JP | 2006187317 | 7/2006 |
| JP | 2015031511 | 2/2015 |
| KR | 100847515 | 7/2008 |
| KR | 101160960 | 6/2012 |
| KR | 101166981 | 7/2012 |
| KR | 20140124161 | 10/2014 |
| TW | 397837 | 2/2011 |
| WO | 1988001185 | 2/1988 |
| WO | 1991012854 | 9/1991 |
| WO | 2009061178 | 5/2009 |
| WO | 2009143808 | 12/2009 |
| WO | 2016171799 | 10/2016 |
| WO | 2018022465 | 2/2018 |
| WO | 2021236594 | 11/2021 |
| WO | 2022026464 | 2/2022 |

OTHER PUBLICATIONS

Espacenet, Machine translation of KR20140124161 Description (Year: 2014).

\* cited by examiner

ASSISTED RACKING OF DIGITAL RESISTANCE

CROSS REFERENCE TO OTHER APPLICATIONS

This application claims priority to U.S. Provisional Patent Application No. 63/316,073 entitled WEIGHT ON-OFF filed Mar. 3, 2022 which is incorporated herein by reference for all purposes.

This application is a continuation in part of U.S. patent application Ser. No. 17/553,591 entitled REPETITION EXTRACTION filed Dec. 16, 2021, which is incorporated herein by reference for all purposes, which is a continuation of U.S. patent application Ser. No. 17/179,289, entitled DIGITAL STRENGTH TRAINING filed Feb. 18, 2021, now U.S. Pat. No. 11,285,351, which is incorporated herein by reference for all purposes, which is a continuation of U.S. patent application Ser. No. 16/737,684, entitled DIGITAL STRENGTH TRAINING filed Jan. 8, 2020 which is incorporated herein by reference for all purposes, which is a continuation of U.S. patent application Ser. No. 15/655,682, entitled DIGITAL STRENGTH TRAINING filed Jul. 20, 2017, now U.S. Pat. No. 10,661,112, which is incorporated herein by reference for all purposes, which claims priority to U.S. Provisional Patent Application No. 62/366,573 entitled METHOD AND APPARATUS FOR DIGITAL STRENGTH TRAINING filed Jul. 25, 2016 which is incorporated herein by reference for all purposes.

BACKGROUND OF THE INVENTION

Strength training at home is convenient but often done alone, without the assistance of trained staff. Strength training includes performing movements with high weight that may endanger a user, be awkward for a user, or be difficult for a user to start or end alone.

BRIEF DESCRIPTION OF THE DRAWINGS

Various embodiments of the invention are disclosed in the following detailed description and the accompanying drawings.

DETAILED DESCRIPTION

Figure 1A:
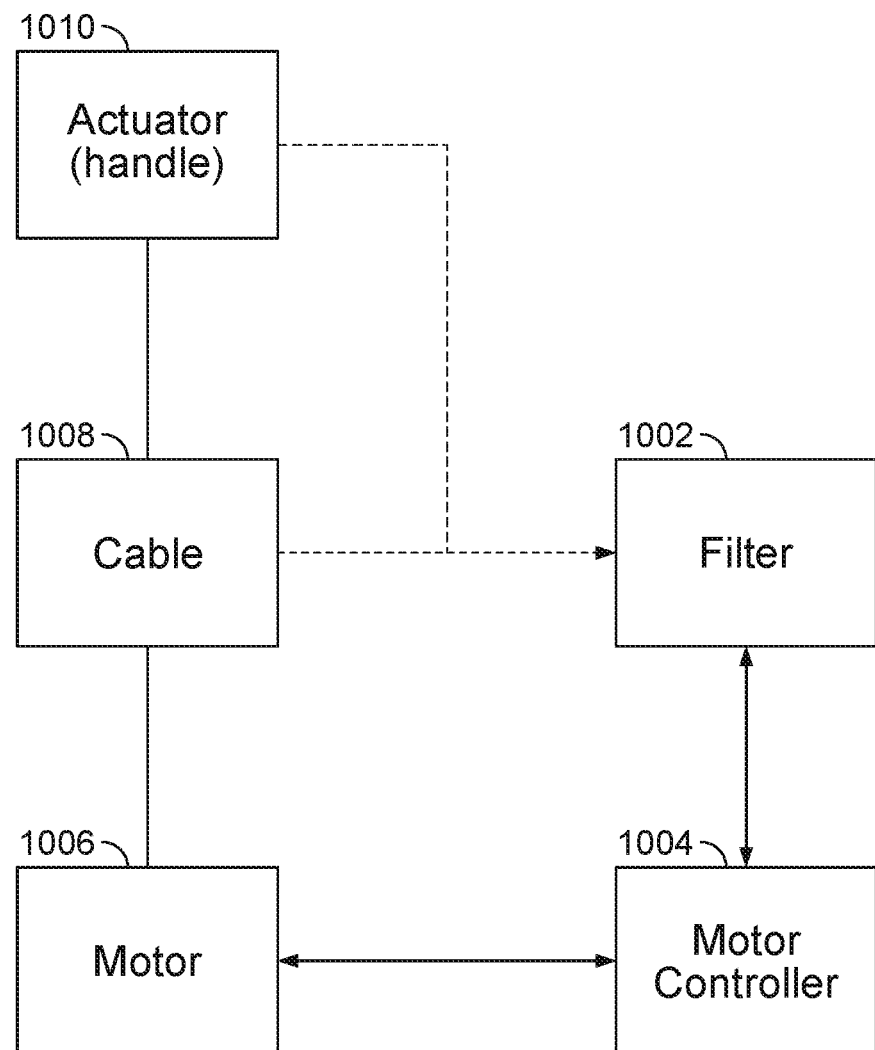
FIG. 1A is a block diagram illustrating an embodiment of a digital strength trainer.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Digital strength training is disclosed. In one embodiment, a user's handle/actuator is coupled via a cable to a motor controlled at least in part by a filter. The filter is controlled by a digital computer to dynamically adjust torque on the motor to make physical exercise more efficient, effective, safe, and/or enjoyable for the user.

Strength Training. For a user, benefits from weight lifting depend greatly on execution of the exercise, including but not limited to: form comprising movement path/pattern, intensity comprising amount of weight/resistance, tempo comprising how fast/slow is the movement, number of sets/repetitions, and timing comprising how long to wait between repetitions and sets. Furthermore, maximal gains are found when the user exercising is pushed to and beyond failure; the point at which they may no longer lift the weight and must go through recovery allowing the muscle to rebuild itself stronger.

A number of additional techniques exist to strengthen a user further. Important ones include the use of concentric, eccentric, and isometric training. Concentric movements are when muscles contract under load, for example using a bicep muscle to initiate lifting a weight. Isometric movements are when a muscle remains stable or at the same position under load, for example once the bicep muscle has lifted the weight, isometric movement is holding the weight in place. Eccentric is when a muscle lengthens under load, for example using a bicep muscle to resist gravity as the weight is being lowered back down.

Collectively, factors comprising form, intensity, tempo, number of sets/repetitions, timing, concentric movements, isometric movements, and eccentric movements are termed "protocols". Traditionally most resistance training involves symmetric concentric and eccentric loads, such that the same amount of weight is used in both directions. For example, a user may lift a weight and then resist gravity under the same weight load when lowering it.

Exercise protocols exist that rely on asymmetric movements, including pure concentric, pure eccentric, and/or blended asymmetric concentric-eccentric movements. The term "concentric loading" is used when the concentric phase has more weight applied to it than the eccentric phase. The term "eccentric loading" is used when the eccentric phase has more weight applied to it than the concentric phase. These protocols, and many variants on them, for example mixtures of concentric-isometric-eccentric combinations, as well as plyometric explosive movements, are well known to any person having ordinary skill in the art. There are communities of users who value asymmetric protocols for health and efficient training. Users engage in strength training not only to strengthen/build muscles, but also the connective tissue such as tendons around the muscles. Eccentric loading has been shown to build tendon more effectively, particularly in the presence of tendinopathy.

In practice actually achieving asymmetric protocols is challenging. A physical weight such as a dumbbell cannot spontaneously change in weight without violating the laws of physics. Hence, achieving a protocol such as eccentric loading is difficult, where the weight on the eccentric phase is heavier than the concentric phase. A user may try to use makeshift solutions such as elastic bands, stepstools, and/or a second user to address asymmetry, but a user must also maintain proper form and proper timing in order to reap a full benefit from asymmetric protocols which is challenging with makeshift solutions.

Another aspect to strength training is that humans are different from each other. For example, each muscle as moved through its range of motion has an optimal length at which point it achieves peak tension, that is, it is at its strongest. Plotted on an X-Y axis as a "muscle-tension curve", the X axis plots position on range of motion, and the Y axis plots tension. There is a point on the muscle-tension curve where tension peaks. This point of optimal length differs from person to person depending on individual DNA, environment, strength, and/or conditioning levels.

Furthermore, a muscle's ability to withstand tension/strength changes as a user fatigues throughout a workout session, such that the shape of the muscle-tension curve changes over time. Having a user move a weight that provides a fixed amount of tension throughout the range of motion is sub-optimal when considering that a muscle's ability to withstand tension varies through its range of motion because the muscle-tension curve is not a flat line. Furthermore, a muscle-tension curve differs for concentric, isometric, and eccentric movements.

Traditionally, the vast majority of strength training methods and/or apparatuses fall into the following categories:

Body Weight: Nothing in addition to the gravitational force of body weight is used to achieve resistance training. Pull-ups are a good example of this. Some systems such as TRX provide props that may help one better achieve this;

Free weights: A traditional example are dumbbells, which also operate using gravity as a force. The tension experienced by a user throughout a range of motion, termed throughout this specification as an "applied tension curve", varies depending on the angle of movement and/or the direction of gravity. For some motion, such as a bicep curl, the applied tension curve is particularly variable: for a bicep curl it starts at near zero when the arm is at full extension, peaks at 90 degrees, and reduces until the arm reaches full curl at near zero again;

Fixed-track machine: Machines that use weights, for example plates of metal comprising a weight stack, coupled by a cable attached to a cam joined to a mechanism running on a pivot and/or track. These often have a fixed applied tension curve, though some systems such as Nautilus have used oddly shaped cams in order to achieve non-linear applied tension curves. Often a weight setting is selected for a weight stack by using a pin inserted associated with a desired plate; and Cable-machines: Also known as gravity-and-metal based cable-machines, these are a cross between free weights and fixed track machines. They comprise a weight stack attached to a cable, often via a pulley system which may be adjustable in height or direction. Fixed-track machines have historically been criticized by some for overly isolating a single muscle. Free weights on the other hand have historically been criticized by some for activating too many small stabilizer muscles, meaning that a user's workout may be limited by these small muscles before the large ones have even gotten a good workout. Cables do not run on a track, and thus still require some use of stabilizer muscles, but not as much as free weights because the direction of pull is strictly down the cable. The effective applied tension curves varies if the angle of attack between a user's hand and the cable changes throughout the range of motion.

While gravity is the primary source of tension and/or resistance in all of the above, tension has also been achieved using springs and/or flexing nylon rods as with Bowflex, elastics comprising rubber bands/resistance bands as with TheraBand, pneumatics, and hydraulics. These systems have various characteristics with their own applied tension curve.

Electronic Resistance. Using electricity to generate tension/resistance is disclosed. In one embodiment, an electromagnetic field is used to generate tension/resistance. In some embodiments, an electronic motor is used to generate tension/resistance. In one embodiment, a three-phase brushless direct-current motor is used to generate tension/resistance. Alternatively, an induction alternating-current motor or other electrical system is used to generate tension/resistance.

A strength trainer using electricity to generate tension/resistance may be smaller and lighter than traditional strength training systems such as a weight stack. A strength trainer using electricity to generate tension/resistance may also be versatile by way of electronic and/or digital control. Electronic control enables the use of software to control and direct tension. By contrast, traditional systems require tension to be changed physically/manually; in the case of a weight stack, a pin has to be moved by a user from one metal plate to another.

Such a digital strength trainer using electricity to generate tension/resistance is also versatile by way of using dynamic resistance, such that tension/resistance may be changed nearly instantaneously. When tension is coupled to position of a user against their range of motion, the digital strength trainer may apply arbitrary applied tension curves, both in terms of position and in terms of phase of the movement: concentric, eccentric, and/or isometric. Furthermore, the shape of these curves may be changed continuously and/or in response to events; the tension may be controlled continuously as a function of a number of internal and external variables including position and phase, and the resulting applied tension curve may be pre-determined and/or adjusted continuously in real time.

FIG. 1A is a block diagram illustrating an embodiment of a digital strength trainer. The digital strength trainer includes the following:
a controller circuit (1004), which may include a processor, inverter, pulse-width-modulator, and/or a Variable Frequency Drive (VFD);
a motor (1006), for example a three-phase brushless DC or induction AC motor, driving by the controller circuit;
a spool with a cable (1008) wrapped around the spool and coupled to the spool. On the other end of the cable an actuator/handle (1010) is coupled in order for a user to grip and pull on. The spool is coupled to the motor (1006) either directly or via a shaft/belt/chain/gear mechanism. Throughout this specification, a spool may be also referred to as a "hub";
a filter (1002), to digitally control the controller circuit (1004) based on receiving information from the cable (1008) and/or actuator (1010);
optionally (not shown in FIG. 1A) a gearbox between the motor and spool. Gearboxes multiply torque and/or friction, divide speed, and/or split power to multiple spools. Without changing the fundamentals of digital strength training, a number of combinations of motor and gearbox may be used to achieve the same end result. A cable-pulley system may be used in place of a gearbox;
one or more of the following sensors (not shown in FIG. 1A):
a position encoder; a sensor to measure position of the actuator (1010). Examples of position encoders include a hall effect shaft encoder, grey-code encoder on the motor/spool/cable (1008), an accelerometer in the actuator/handle (1010), optical sensors, position measurement sensors/methods built directly into the motor (1006), and/or optical encoders. Other options that measure back-EMF (back electromagnetic force) from the motor (1006) in order to calculate position also exist;
a motor power sensor; a sensor to measure voltage and/or current being consumed by the motor (1006);
a user tension sensor; a torque/tension/strain sensor and/or gauge to measure how much tension/force is being applied to the actuator (1010) by the user. In one embodiment, a tension sensor is built into the cable (1008). Alternatively, a strain gauge is built into the motor mount holding the motor (1006). As the user pulls on the actuator (1010), this translates into strain on the motor mount which is measured using a strain gauge in a Wheatstone bridge configuration. In another embodiment, the cable (1008) is guided through a pulley coupled to a load cell. In another embodiment, a belt coupling the motor (1006) and cable spool or gearbox (1008) is guided through a pulley coupled to a load cell. In another embodiment, the resistance generated by the motor (1006) is characterized based on the voltage, current, or frequency input to the motor.

In one embodiment, a three-phase brushless DC motor (1006) is used with the following:
a controller circuit (1004) combined with filter (1002) comprising:
a processor that runs software instructions;
three pulse width modulators (PWMs), each with two channels, modulated at 20 kHz;
six transistors in an H-Bridge configuration coupled to the three PWMs;
optionally, two or three ADCs (Analog to Digital Converters) monitoring current on the H-Bridge; and/or
optionally, two or three ADCs monitoring back-EMF voltage;
the three-phase brushless DC motor (1006), which may include a synchronous-type and/or asynchronous-type permanent magnet motor, such that:
the motor (1006) may be in an "out-runner configuration", used throughout this specification when the shaft is fixed and the body of the motor rotates, such as that use by an electric bike hub motor;
the motor (1006) may have a maximum torque output of at least 60 Nm and a maximum speed of at least 300 RPMs;
optionally, with an encoder or other method to measure motor position;
a cable (1008) wrapped around the body of the motor (1006) such that entire motor (1006) rotates, so the body of the motor is being used as a cable spool in one case. Thus, the motor (1006) is directly coupled to a cable (1008) spool. In one embodiment, the motor (1006) is coupled to a cable spool via a shaft, gearbox, belt, and/or chain, allowing the diameter of the motor (1006) and the diameter of the spool to be independent, as well as introducing a stage to add a set-up or step-down ratio if desired. Alternatively, the motor (1006) is coupled to two spools with an apparatus in between to split or share the power between those two spools. Such an apparatus could include a differential gearbox, or a pulley configuration; and/or an actuator (1010) such as a handle, a bar, a strap, or other accessory connected directly, indirectly, or via a connector such as a carabiner to the cable (1008).

In some embodiments, the controller circuit (1002, 1004) is programmed to drive the motor in a direction such that it draws the cable (1008) towards the motor (1006). The user pulls on the actuator (1010) coupled to cable (1008) against the direction of pull of the motor (1006).

One purpose of this setup is to provide an experience to a user similar to using a traditional cable-based strength training machine, where the cable is attached to a weight stack being acted on by gravity. Rather than the user resisting the pull of gravity, they are instead resisting the pull of the motor (1006).

Note that with a traditional cable-based strength training machine, a weight stack may be moving in two directions: away from the ground or towards the ground. When a user pulls with sufficient tension, the weight stack rises, and as that user reduces tension, gravity overpowers the user and the weight stack returns to the ground.

By contrast in a digital strength trainer, there is no actual weight stack. The notion of the weight stack is one modeled by the system. The physical embodiment is an actuator (1010) coupled to a cable (1008) coupled to a motor (1006). A "weight moving" is instead translated into a motor rotating. As the circumference of the spool is known and how fast it is rotating is known, the linear motion of the cable may be calculated to provide an equivalency to the linear motion of a weight stack. Each rotation of the spool equals a linear motion of one circumference or $2\pi r$ for radius r. Likewise, torque of the motor (1006) may be converted into linear force by multiplying it by radius r.

If the virtual/perceived "weight stack" is moving away from the ground, motor (1006) rotates in one direction. If the "weight stack" is moving towards the ground, motor (1006) is rotates in the opposite direction. Note that the motor (1006) is pulling towards the cable (1008) onto the spool. If the cable (1008) is unspooling, it is because a user has overpowered the motor (1006). Thus, note a distinction between the direction the motor (1006) is pulling, and the direction the motor (1006) is actually turning.

If the controller circuit (1002, 1004) is set to drive the motor (1006) with a constant torque in the direction that spools the cable, corresponding to the same direction as a weight stack being pulled towards the ground, then this translates to a specific force/tension on the cable (1008) and actuator (1010). Calling this force "Target Tension", this force may be calculated as a function of torque multiplied by the radius of the spool that the cable (1008) is wrapped around, accounting for any additional stages such as gear boxes or belts that may affect the relationship between cable tension and torque. If a user pulls on the actuator (1010) with more force than the Target Tension, then that user overcomes the motor (1006) and the cable (1008) unspools moving towards that user, being the virtual equivalent of the weight stack rising. However, if that user applies less tension than the Target Tension, then the motor (1006) overcomes the user and the cable (1008) spools onto and move towards the motor (1006), being the virtual equivalent of the weight stack returning.

Setting the controller circuit to drive the motor with constant torque is an example of a filter (1002): Throughout this specification, the equations by which the controller circuit (1004) is configured to drive the motor (1006) are collectively referred to as a "filter". A basic filter comprises position as a mandatory input of a filter, for example position of the actuator (1010) and/or cable (1008). One example of a basic filter is one that drives the motor (1006) with constant torque. An analogy to a digital strength training filter is a digital camera filter such as a sepia filter, or Polaroid filter, which includes equations that govern how the digital information from a camera sensor are processed to produce an image. Sometimes digital camera filters mimic something from the analog world such as film, which include chemicals on plastic film that react to the exposure of light. Similarly, by way of digital control, a digital strength training filter may make the resulting system feel like a weight stack being acted on by gravity on planet Earth, a weight stack being acted on by gravity on the moon, a weight stack connected via a pulley system acted on by gravity on planet Earth, a spring, a pneumatic cylinder, or an entirely new experience.

The set of equations that describe the behavior of the motor (1006) are its filter (1002). This filter (1002) ultimately affects how the system feels to a user, how it behaves to a user, and how it is controlled. A motor may be controlled in many ways: voltage, current, torque, speed, and other parameters. This is an important part of a filter (1002), because the filter includes equations that define the relationship between the intended behavior of the motor (1006) relative to how the motor (1006) is controlled.

The system described above with the controller circuit (1004) being set to drive the motor (1006) with constant torque is a basic filter (1002). Throughout this specification this filter is referred to as a "Constant Torque Filter". In such a case, the user experiences a fixed tension on the actuator (1010) assuming low overall system friction. With a Constant Torque Filter, when the system is to behave like an ideal strength training machine with a weight corresponding to a mass m, then m is the specified Target Tension described above. The ideal strength training machine is considered ideal in the sense that it exhibits no friction, momentum, or intertia.

The Constant Torque Filter does not exhibit all of the characteristics of a weight stack acted on by gravity. Such a weight stack has to obey the equations of gravity, has momentum, and has a top speed achievable while falling. A filter mimicking such behavior is called a "Weight Stack Filter" throughout this specification.

A Weight Stack Filter must mirror the behavior of a weight machine with a weight stack. The physics of such a machine are described by a number of equations including:

$$F=m \cdot a \text{ or Force=Mass multiplied by Acceleration;}$$

Wherein: a=g (acceleration is the speed of gravity), and m is the mass of the weight stack, for the force F pulling the weight stack towards the ground.

The weight stack has two forces acting upon it: first, gravity pulling it to the ground; and second, tension from the cable (1008) pulling it up. If the gravity force is greater than the tension, the weight stack moves towards the ground until it bottoms out and/or reaches ground position. If the tension force is greater, then the weight stack moves up away from the ground. If the two forces are equal, then the velocity/speed of the weight stack does not change. If the two forces are equal when the velocity is zero, then the weight stack remains suspended at a fixed position.

The weight stack also experiences friction, which applies in all three cases of the gravity force being greater than tension, gravity force being less than tension, and gravity force being equal to the tension force. The net force determines the acceleration that the weight stack experiences, which over time also determines its velocity, as velocity is the integral of acceleration over time. As F=m·a, or rearranged mathematically $$a = \frac{F}{m},$$

acceleration on the weight stack is the force it is experiencing divided by the mass. As described above, the weight stack experiences two forces added together: $F_1=-m \cdot g$ being the gravity force, with the negative convention because gravity is pulling down, and $F_2=Tg$ being the tension force, wherein g is used as the gauges are calibrated using weight with respects to the planet. That is, a 10 lb weight experiences less force on the moon because of the gravitational pull of the moon being lower. As all strain gauges are calibrated using a weight hanging against gravity on this planet, the g for gravity on earth is included in this equation.

Continuing the analytical solution, $F=F_1+F_2$, so as $$a = \frac{F}{m},$$

then $$a = \frac{F_1 + F_2}{m} = \frac{Tg - m \cdot g}{m} = \left(\frac{T}{m} - 1\right) \cdot g$$

To account for friction in a simple way, gravity g is multiplied by a number between 0 and 1, where a 1 indicates no friction and a 0 indicates so much friction that gravity is completely negated.

$$a = \frac{F_1 + F_2}{m} = \frac{Tg - m \cdot g}{m} = \left(\frac{T}{m} - 1\right) \cdot g \cdot r$$

wherein r is this friction factor.

In one embodiment, a value of r=0.7 is used from empirical data. This is a simple friction model for illustration. A more complex model may factor in speed, and different friction coefficients for static and dynamic friction. Any person having ordinary skill in the art may produce relevant equations as found in kinematics/physics textbooks.

For a Weight Stack Filter, the above equations define acceleration a as a function of tension T. To complete the Weight Stack Filter, this equation must be related to the way the motor (1006) is being controlled.

In one embodiment, tension T is sampled every 10 milliseconds, that is 100 times per second. In some embodiments, torque on the motor (1006) is controlled using the same methods as the Constant Torque Filter. The equations above defines the acceleration that the weight stack, and hence the user, experiences. At a rate of 100 times per second, tension T is measured and acceleration a calculated, to adjust torque on the motor (1006) such that motor (1006) behaves in a manner consistent with that acceleration. At a rate of 100 times per second motor position, directly or indirectly by measured cable or spool position, is measured. Velocity is then calculated as the change in position divided by the change in time of 10 ms. Acceleration is then calculated as the change in velocity divided by the change in time of 10 ms.

When measured acceleration is compared with the calculated acceleration governed by the equation, if measured acceleration is too high, then motor torque is increased. If we measured acceleration is too low, then motor torque is reduced. In one embodiment, both cases are performed using a PID loop.

In some embodiments, instead of measuring cable tension to calculate velocity, torque is calculated directly. In order to control torque of the motor (1006) directly, a series of calculations are made to model the tension on a cable (1008) of a weight stack moving. In this case, torque/tension is calculated as it is controlled by the controller. The tension on a cable (1008) of a moving weight stack is not static, and varies with the speed/velocity and kinetic energy of the weight stack, which may be calculated by changes in potential energy.

The kinetic energy equation for a moving mass is:

$$E = \frac{1}{2} \cdot m \cdot v^2$$

and the potential energy of a weight stack is:

$$E = m \cdot g \cdot h$$

where m is the mass, g is the gravitational acceleration, and h is the height from the ground.

As energy expended/work between two points in time is force times distance:

$$W = \Delta E = F \cdot d$$

Combining these equations, the force exhibited by a moving weight stack is:

$$F = \frac{\frac{1}{2} \cdot m \cdot v_1^2 - \frac{1}{2} \cdot m \cdot v_2^2}{d}$$

Where $v_1$ is the velocity at the start of a time period, $v_2$ is the velocity at the end of a time period, d is the distance the mass travels during that time period. Throughout this specification this equation is called the "kinetic force equation".

Put another way:
 if velocity of the mass did not change, then the tension experienced by a user is the standard tension of mass times gravity, or no change;
 if the velocity of the mass increases, then the tension experienced by the user during that period of time is higher than just mass times gravity and is increased by the amount of the kinetic force equation; and
 if the velocity of the mass decreases, then the tension experienced by the user during that period of time is lowered than just mass times gravity and is decreased by the amount of the kinetic force equation. For example, imagine a ball thrown up into the air at 1 meter per second. If a force continues to push up at the ball at mg it continues at the same velocity. If the force is less, the ball slows down. And, if the force is more, the ball speeds up. The equations reflect that instead of monitoring the velocity of the ball, it is determined how "heavy" the ball feels to the person pushing on it.

Force F as calculated in the above equation is the torque that is applied to the motor using the same method as that of the Constant Torque Filter.

Alternately, a simple equation to accomplish this is the standard relationship F=m·a: If the acceleration the weight stack experienced during a period of time is known, the net force/resistance that the user experiences may be calculated using this equation. The end result is the same, which may also be derived by using the kinetic force equation taking the limit as d goes to zero. Which equation is used in a particular embodiment depends on whether acceleration may be measured/calculated with enough accuracy.

In one embodiment, an adjustment loop is:

1. The torque on the motor (1006) is set to be a force equivalent to mg when coupled to a hub with a cable (1008) wrapped around it. At this moment in time the cable (1008) is already moving at a velocity;
2. A specified period of time later, for example 5 ms, the velocity is measured and found to have changed in the positive direction, meaning that acceleration was experienced. This acceleration may be calculated by dividing the difference in velocity by the time period that has elapsed. Multiplying this acceleration by the gravitational constant yields the amount of additional force the motor supplies to the user. The torque on the motor is adjusted accordingly.

If the velocity was found to have reduced, then the torque is also reduced in response to negative acceleration.

If there is no change in velocity, that is acceleration is zero, then the torque maintains at m·g·r, where r is the radius of the hub, the equivalent of a force of m·g; and 3. Repeat this process.

This process represents a case when the weight stack is being pulled by a user away from the ground. If the weight stack is falling to the ground, the process is similar; and acceleration is expected due to gravity. If the motor accelerates slower than gravity, it is because the user is resisting, and the force exerted by the motor/torque is adjusted accordingly such that F=m·g+m·a, where a is the additional acceleration from the user.

These equations enable a goal to model a weight stack. The benefits of a Weight Stack Filter is that it feels to a user like a traditional weight machine, and also allows the user to utilize kinetic energy, or energy that has been stored in the form of velocity, to their advantage to finish the exercise. However, some benefits to the user occur by not allowing them to store kinetic energy and later take it back, which some exercise professionals consider a form of cheating. Throughout this specification, the terms "torque" and "tension" are used interchangeably, as one may be calculated from the other—torque is tension multiplied by radius of the hub.

In a constant torque system, the motor (1006) provides a fixed torque that is not adjusted by acceleration, and is set to a torque of m·g·r, which is not adjusted up or down based on changes in velocity and/or acceleration. Throughout this specification this is termed a "no cheat mode" or "momentum free mode". Some fitness experts suggest that a user should not be allowed to generate momentum because that reduces the amount of work required in the balance of the range of motion. The use of a no cheat mode is a trade-off between feeling "natural" and forcing the user to not cheat.

As an aside, another benefit of the gravity "natural" model of the Weight Stack Filter is that at times the user experiences tension in excess of mg. Some may not consider this cheating as it provides additional strain on the user. Hence, a "true no cheat mode" may be designed with the disclosed techniques that performs all of the calculations for the gravity model, and allows the case of additional tension during acceleration of the weight stack, but not the case of reduced tension during deceleration of the weight stack:

$$torque = m \cdot r \cdot (g + \max(0, a))$$

where max(0, a) either selects 0 or positive values of a, acceleration experienced by the weight stack as measured by changes in velocity of the cable/actuator (1008, 1010) attached to the hub.

Filters. As described earlier using the analogy of the digital camera to partially explain them, filters govern a specified behavior. To accomplish this, it often requires that this specified behavior be expressed in different forms of variables, and as such it becomes the responsibility of the filter to convert between these forms.

Figure 1B:
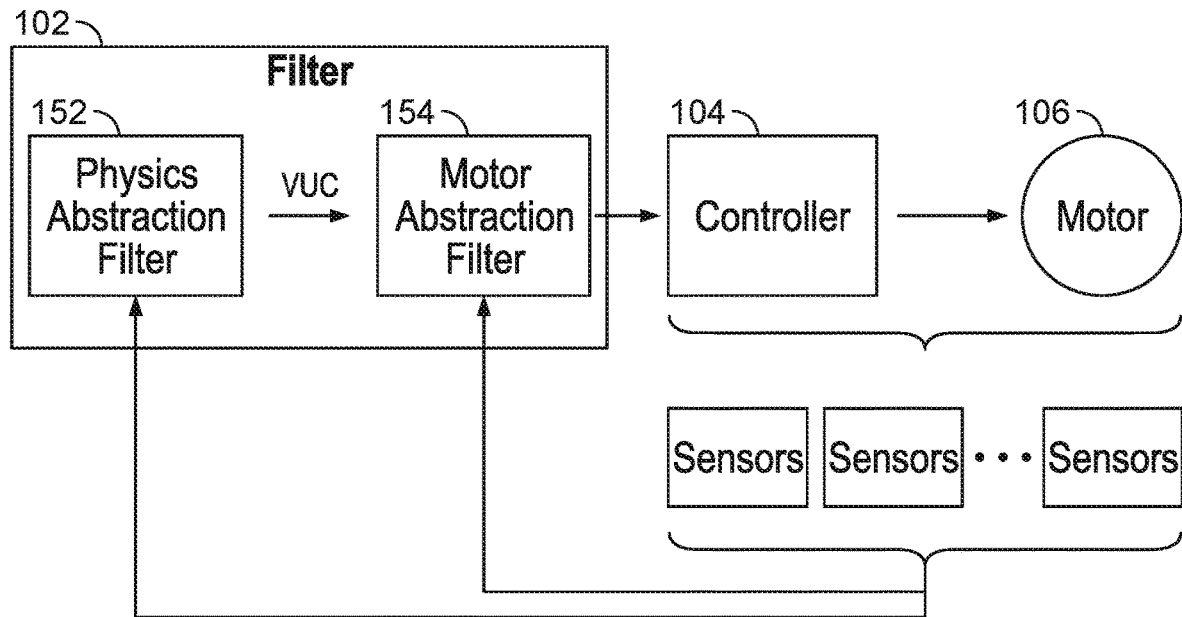
FIG. 1B is a block diagram illustrating an embodiment of a motor being controlled in a manner to cause it to behave like a fitness machine.

FIG. 1B is a block diagram illustrating an embodiment of a motor being controlled in a manner to cause it to behave like a fitness machine. In one embodiment, the system of FIG. 1B is a subset of the system of FIG. 1A. The embodiment of FIG. 1B shows a four stage pipeline, with feedback from the latter two stages to the first two stages. The first two stages, comprising the physics abstraction filter and motor abstraction filter, are collectively referred to as the "filter", with such examples being the Constant Torque Filter and the Weight Stack Filter. However, when it comes to implementing this filter, up to two stages of filtration may be conceptualized: While an embodiment need not be limited to two stages, conceptually splitting them into two stages is illustrative as two distinct tasks are accomplished by the filter (1002). These two "stages" of filters may be referred to as the physics abstraction filter (152), and the motor abstraction filter (154). As many filters based at least in part on mathematical equations, the two stages may be combined into a single equation.

Splitting into two stages is conceptual as different motor configurations are controlled differently. A system may be referred to as the combination of three stages: i) motor abstraction filter (154), ii) controller, and iii) motor. This system has a Variable Under Control (VUC), which is the variable most directly controlled by the system. Consider the following examples:

| Motor Abstraction Filter | Controller | Motor |
| --- | --- | --- |
| Speed VUC: Adjusts Voltage via PID loop monitoring motor speed measured by a sensor, utilizing 6-step commutation (commutation based on hall sensor input). | Voltage Pulse Width Modulator (PWM) driving 6-Transistor H-Bridge | 3-Phase Brushless Direct Current Permanent Magnet Synchronous ("BLDC motor") |

-continued

| Motor Abstraction Filter | Controller | Motor |
|---|---|---|
| Position VUC: Adjusts Voltage via PID loop monitoring motor position measured by a sensor, utilizing sinusoidal commutation (commutation based on motor position from a sensor) | Voltage Pulse Width Modulator driving 6-Transistor H-Bridge | 3-Phase Brushless Direct Current Permanent Magnet Synchronous |
| Torque VUC: Adjusts Voltage via PID loop monitoring motor current draw measured by a sensor, utilizing Field Oriented Control (Field Oriented Control based on both current measurements, and motor position from a sensor) | Voltage Pulse Width Modulator driving 6-Transistor H-Bridge | 3-Phase Brushless Direct Current Permanent Magnet Synchronous |
| Torque VUC: Directly adjusts motor current, utilizing Vector Control (Vector Control based on motor position from a sensor) | Current Mode Modulator coupled to 6-Transistor H-Bridge | 3-Phase Brushless Direct Current Permanent Magnet Synchronous |
| Torque VUC: Directly adjusts motor slip via simple loop measuring motor speed and Volts/Hz modulation. | Voltage Pulse Width Modulator driving 6-Transistor H-Bridge | 3-Phase Induction Alternating Current Motor ("induction motor") |
| Speed VUC: Directly adjust voltage via a PID loop monitoring motor speed and Volts/Hz modulation. | Voltage Pulse Width Modulator driving 6-Transistor H-Bridge | 3-Phase Induction Alternating Current Motor |

In each of the above configurations, different types of sensors are required depending on the VUC and the type of controller and motor.

In all of the Torque VUC modes above, a proxy for torque is used: current draw for BLDC motors, and slip for induction motors. Conversion between this proxy and torque in the required units, such as ft-lbs, is another step to be accomplished. Such a calibration is performed by characterizing the system. The accuracy of this conversion may vary based on a number of variables including motor temperature and age. One option may be to measure true torque using a sensor, or some other variable that is used to calculate torque, then use a PID loop to correct for this inaccuracy.

Is shown above, the VUC may be speed, position, or torque. If a given physics model is desired, then further equations could be written to translate between the desired physical behavior and the VUC.

| Physics Abstraction Filter (152) | VUC | Logic |
|---|---|---|
| Constant Force | Torque | Direct Linear Relationship |
| "Weight Stack" | Torque | Equations that model gravity, momentum, and friction to calculate the force exhibited on the weight stack; force converted to torque via a direct linear relationship |
| "Weight Stack" | Speed | Equations that model gravity, momentum, and friction to calculate the speed of the weight stack based on torque or force measurements (inputs from the user "acting upon the weight stack) |

As stated earlier, these stages may be combined into a single stage, for example:

| Physics Abstraction Filter (152) + Motor Abstraction Filter (154) | Controller | Motor |
|---|---|---|
| Force Control: Adjusts voltage via PID loop monitoring measured force (or torque). | Voltage Pulse Width Modulator driving 6-Transistor H-Bridge | 3-Phase Brushless Direct Current Permanent Magnet Synchronous |

In the domain of fitness equipment intended for strength training, an optimal option for direct control of torque is appropriate, the consequence is the use of a Torque VUC with either a BLDC or Induction motor as a suitable choice. The choice between current based modulation or PWM depends on a number of factors, including the price and availability of components. In one embodiment, PWM control is more prevalent and hence lower cost.

Force may be indirectly controlled if the system includes a spring mechanism. In one embodiment, a linear spring is coupled to the cable (1008). Alternatively, a rotational spring is coupled to the rotation of the motor (1006). With a spring mechanism, controlling force becomes a matter of controlling motor position. Hence, a VUC may be the amount of compression of the spring controlled by motor position.

Position Control. A traditional way to control motor position is to use a standard stepper motor. As well, three-phase brushless DC motors, brush DC motors, and/or induction motors may be precisely position controlled using methods such as a PID loop.

For a suitable stepper motor, position may be controlled directly. Stepper motors are controlled by pulses rather than voltage/current. The pulses command the motor to move one step at a time via shifting electromagnetic fields in the stator of the motor. A control system for a stepper motor is simpler to directly control position rather than velocity. While it is possible to control a stepper motor via velocity by controlling the frequency of the pulses being driven into the motor, position may be preferred in an embodiment.

The equations above describe velocity based control, which may be analytically formed for position based control as, similar to how velocity may be accumulated by summing acceleration over time, position may be accumulated by summing velocity over time.

$$p_{model_n} = p_{model_{n-1}} v_{model} \cdot \Delta t$$

thus $$p_{error} = p_{actual} - p_{model}$$

which tells the controller how many pulses need to be sent to the motor to adjust its position.

In a position based system, it is possible to more easily control tension by adding elasticity, such as a spring, into the system. One example is a rotational spring added to the shaft referred to as a series elastic actuator. A series elastic actuator may be a spring integrated into the shaft between the motor/gearbox (1006) and the hub, wherein the hub is the part that the cable (1008) wraps around. If the hub remains in a fixed position, but the shaft rotates, hence increasing the tension on the spring, that additional tension translates into tension on the cable, or if the motor shaft remains fixed and the hub rotates a similar occurrence happens.

Hence, if the position of the motor (1006) and the position of the hub are measured, then tension may be easily inferred using the characteristics of the spring mechanism. Likewise, if tension were measured directly using a strain gauge for example, then the relative position of the hub to the shaft may be easily calculated. A stepper motor may directly control tension in the system by controlling the relative position of the motor (1006) as compared to the hub. In one embodiment, the controller (1004) calculates a desired relative position between the hub and the shaft in order to produce the tension desired, compares that to the current relative position between the hub and the shaft, then sends the appropriate number of pulses to the stepper motor (1006) to adjust its position to match.

Figure 2:
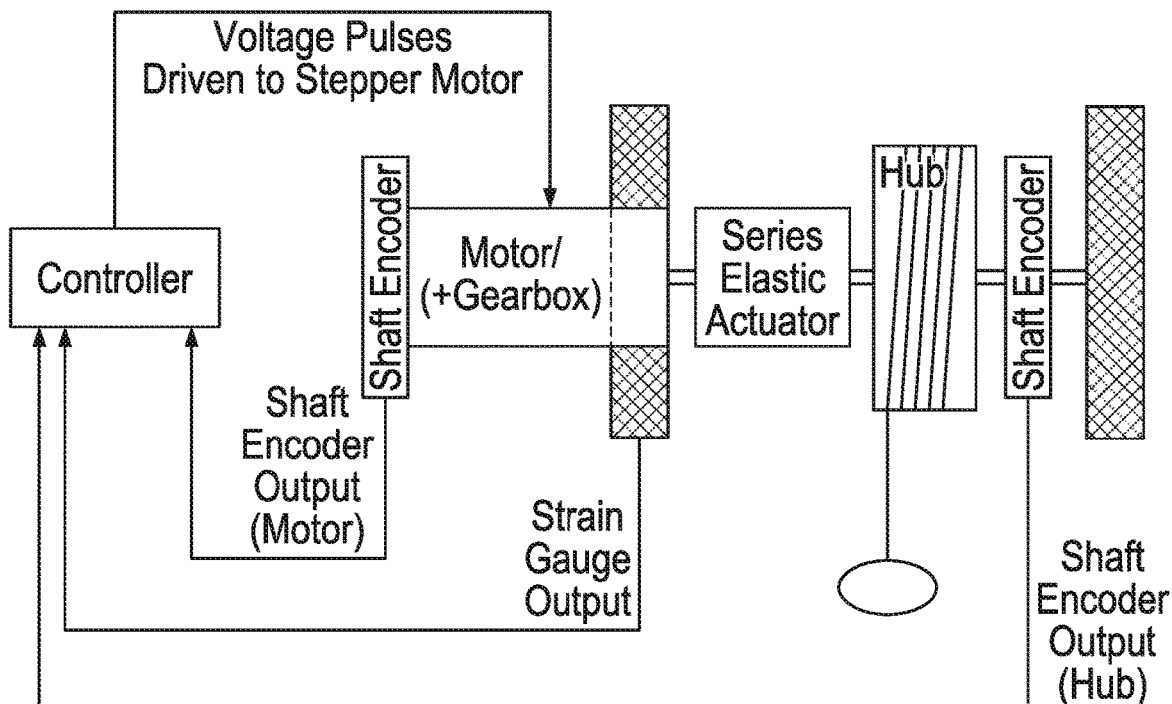
FIG. 2 is an illustration of an embodiment of a series elastic actuator with a shaft encoder on either side of it to control tension.

FIG. 2 is an illustration of an embodiment of a series elastic actuator with a shaft encoder on either side of it to control tension. While all systems have elasticity in them, adding additional elasticity into the system may make it simpler to control as the level of elasticity may be selected to match the characteristics of the stepper motor, for example the step size. As shown in FIG. 2, also adding a gearbox between the motor (1006) and the shaft may allow the step size of the motor to be divided or multiplied to a more desirable number.

For example, if a series elastic actuator is selected to flex up to 90 degrees, and generates tension from 0 lbs to 200 lbs over those 90 degrees when coupled to a hub and a cable wrapped around that hub, to control tension in 0.5 lb increments a minimum of 400 steps is required in that 90 degree range since 400 steps=200 lbs/0.5 lbs/step.

This is the equivalent of 1600 steps per rotation of the hub as 1600 steps/rotation=400*(360/90). If a stepper motor only had 32 steps per rotation, then a gearbox with a 50× ratio creates the level of desired resolution, as 1600=32×50. Using a 50× gearbox reduces the amount of output torque required by the motor a factor of 50×. Also note that the motor (1006) needs to be designed to resist the torque applied to it when 200 lbs of force is pulled on the cable (1008) in this example, which may be calculated using the radius of the hub and the ratio of the gearbox. An equivalency is a reduction in speed such that the motor could drive the hub by 50×. The selection of a motor also affects noise of the finished system. Some motors are louder than others and gearboxes also generate noise.

The above description is for a sample embodiment with certain characteristics, and demonstrate certain calculations and design parameters/techniques/philosophies. Any person having ordinary skill in the art of motor-driven-system design may perform these calculations using standard equations and make trade-off based decisions to arrive at a final design including selecting which variables to control using a control system.

Figure 3:
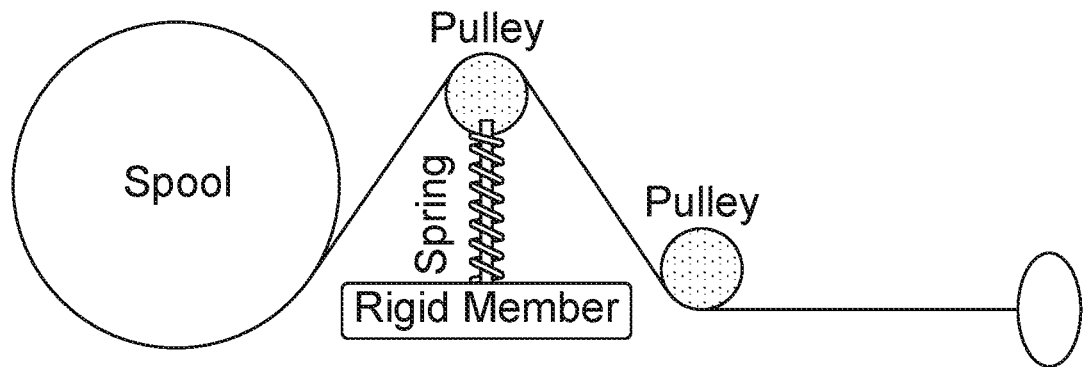
FIG. 3 is an illustration of an embodiment of a linear spring to control tension.

FIG. 3 is an illustration of an embodiment of a linear spring to control tension. FIG. 2 described how a rotational spring may use used; the linear spring may instead be used in a system, an example given in FIG. 3. As shown in FIG. 3, as the motor (1006) rotates the spool, it causes the cable (1008) to be spooled in. If a user is resisting, the pulley coupled to the linear spring moves towards the rigid member, causing the spring to compress. Because the force on the cable is directly correlated to the compression of the spring, simply measuring spring compression, and adjusting motor position to product a desired amount of spring compression, such as in a PID loop, may be sufficient to control cable tension. This is similar to the series elastic actuator, with a linear spring being applied to the cable (1008) rather than to the spool.

Position Measurement. Motor position may be measured using a number of methods, including:

Hall Sensors: Hall sensors mounted to the stator of the motor may track the position of the magnets relative to the stator. Signals from these sensors may be measured to determine the position of the motor, for example by using an analog to digital convertor (ADC) to track the sinusoidal waveform generated as the magnet passes by a Hall sensor and characterizing the position of the motor relative to a point in the waveform, or by digitally counting the magnets as they move past the Hall sensors;

Encoder: An encoder coupled to the physical rotation of the motor measures motor movement and report it using digital pulses. An example of such an encoder is a Quadrature Encoder. Some quadrature encoders rely on electrical connections such as brushes, others use optical sensors, and others rely on magnets and Hall sensors;

Indirect: Movement of the motor (1006) may be measured indirectly by measuring the movement of anything the motor is coupled to, such as a belt, chain, shaft, gearbox, and so forth;

Voltage: Back-EMF voltage generated by a motor may indicate motor position under certain circumstances; and/or Other: Other methods exit to measure the position and movement of a motor. The method used does not affect the fundamentals of the disclosed. However, different methods may exhibit different characteristics such as: i) accuracy [resolution], ii) delay, iii) sampling rate. The required set of characteristics depend on the filter being used.

Motor Selection. The choice of whether to choose an induction motor or a BLDC, and the parameters of the chosen motor depends on cost, size, weight, thermal constraints, for example how hot the motor gets and how is it cooled, and desired reliability and/or duty cycle. While many motors exist that run in thousands of revolutions per second, an application such as fitness equipment designed for strength training has different requirements and is by comparison a low speed, high torque type application.

In one embodiment, a requirement of such a motor (1006) is that a cable (1008) wrapped around a spool of a given diameter, directly coupled to a motor (1006), behave like a 200 lbs weight stack, with the user pulling the cable at a maximum linear speed of 62 inches per second. A number of motor parameters may be calculated based on the diameter of the spool.

| User Requirements | | | | | |
|---|---|---|---|---|---|
| Target Weight | 200 lbs | | | | |
| Target Speed | 62 inches/sec = | 1.5748 meters/sec | | | |
| Requirements by Spool Size | | | | | |
| Diameter (inches) | 3 | 5 | 6 | 7 | 8 | 9 |
| RPM | 394.7159 | 236.82954 | 197.35795 | 169.1639572 | 148.0184625 | 131.5719667 |
| Torque (Nm) | 67.79 | 112.9833333 | 135.58 | 158.1766667 | 180.7733333 | 203.37 |
| Circumference (inches) | 9.4245 | 15.7075 | 18.849 | 21.9905 | 25.132 | 28.2735 |

Thus, a motor with 67.79 Nm of force and a top speed of 395 RPM, coupled to a spool with a 3 inch diameter meets these requirements. 395 RPM is slower than most motors available, and 68 Nm is more torque than most motors on the market as well.

Hub motors are three-phase permanent magnet BLDC direct drive motors in an "out-runner" configuration: throughout this specification out-runner means that the permanent magnets are placed outside the stator rather than inside, as opposed to many motors which have a permanent magnet rotor placed on the inside of the stator as they designed for more speed than torque. Out-runners have the magnets on the outside, allowing for a larger magnet and pole count and are designed for torque over speed.

Hub motors also tend to be "pancake style", meaning they are higher in diameter and lower in depth than most motors. Pancake style motors are advantageous for a wall mount, subfloor mount, and/or floor mount application where maintaining a low depth is desirable, such as a piece of fitness equipment to be mounted in a consumer's home or in an exercise facility/area.

Motors may also be "direct drive", meaning that the motor does not incorporate or require a gear box stage. Many motors are inherently high speed low torque but incorporate an internal gearbox to gear down the motor to a lower speed with higher torque and may be called gear motors. Direct drive motors may be explicitly called as such to indicate that they are not gear motors.

If a motor does not exactly meet the requirements illustrated in the table above, the ratio between speed and torque may be adjusted by using gears or belts to adjust. A motor coupled to a 9" sprocket, coupled via a belt to a spool coupled to a 4.5" sprocket doubles the speed and halves the torque of the motor. Alternately, a 2:1 gear ratio may be used to accomplish the same thing. Likewise, the diameter of the spool may be adjusted to accomplish the same.

Alternately, a motor with 100× the speed and 100th the torque may also be used with a 100:1 gearbox. As such a gearbox also multiplies the friction and/or motor inertia by 100×, torque control schemes become challenging to design for fitness equipment/strength training applications. Friction may then dominate what a user experiences. In other applications friction may be present, but is low enough that it is compensated for, but when it becomes dominant, it is difficult to control for. For these reasons, speed or position VUC are more appropriate for fitness equipment/strength training systems. For Position VUC, motors such as stepper motors may be good options. Stepper motors with a high holding torque may be controlled very accurately.

Constant Torque Filter. A motor (1006) may be controlled to provide a fixed amount of torque, and respond to changes in position and speed to maintain that torque. The method to accomplish this may depend on the type of motor.

The torque of an induction motor is nearly linear and proportional to the amount of "slip". Throughout this specification slip is defined as the ratio between the actual speed of an AC motor and the frequency being driven into the AC motor. The greater the slip, the greater the torque. The relationship between slip and torque may be determined by characterizing the motor, whereby a test is run and the relationship between slip and torque is plotted manually. Once a relationship has been determined, in some cases it may be approximated by a linear equation.

An induction motor, such as a three-phase alternating current (AC) induction motor, is controlled by driving three sinusoidal waves into each of the three leads of the motors. The input three sinusoidal waves are matched in frequency and amplitude, and separated by 120 degrees of phase difference. A motor with no load/zero torque rotates at the same frequency as the input. As load is added and the motor must exhibit torque to drive that load, the motor slows down. The difference between the speed of the motor and/or rotor, and the input is its slip and is directly proportional to the torque of the motor. Multiple schemes may be used to determine the correct combination of amplitude and frequency to accomplish a certain amount of slip. A common scheme is referred to as "volts per hertz".

Controlling a motor precisely requires application of a variable under control, the measurement of that variable using a sensor, and a feedback loop, such as a PID loop to perform correction. At times, multiple PID loops may be used either in series, in parallel, or in recursion with a loop within a loop, which the "plant" being controlled by the outer loop includes a PID loop within itself. Throughout this specification, a plant is the portion of system under control for a PID loop.

Torque of a BLDC may be nearly linear and proportional to the amount of current being drawn by the motor. By measuring the current being drawn and adjusting the voltage, torque may be accurately controlled. Determining the relationship between current and torque may be performed by characterizing the motor, whereby a test is run and the relationship between current and torque is plotted. Once the relationship has been determined, in some cases it may be approximated by a linear equation.

In the case of constant torque, a strain gauge is not strictly necessary, although there may be other design decisions that lead to one being used. In induction motors, measuring the speed of the motor which may be calculated by measuring the position of the motor is sufficient in order to determine tension. In a BLDC motor, measuring the current draw of the motor is sufficient in order to determine tension.

Converting slip or current to an amount of torque with high accuracy may be challenging across variations of motors, temperature, and age of the system. If higher accuracy is desired, torque may be measured empirically and a correction factor may be applied. This correction factor may be applied through a PID loop, meant to ensure that measured torque is equal to the desired target torque, with the PID loop adjusting the correction factor until the two are matched. Such a PID loop may be very slow, taking on the order of seconds or minutes to converge.

Because friction in the motor or system may affect the relationship between slip or current, and actual output torque, two correction factors may be calculated, one for each direction analogous to a hysteresis curve. This is because in one direction the torque experienced by a user is that of the motor plus friction, and in the other direction it is that of the motor minus friction. Alternatively, a number of friction models may be utilized such as those described below.

Background references for motor and control include "*AC Induction Motor Volts per Hertz Control, Driven by eTPU on MCF523x*" by Freescale Semiconductor, Wikipedia articles on: "*Induction Motor*"; "*Brushless DC Electric Motor*"; and "*PID Controller*", "*PID for Dummies*" (http://www.csimn.com/CSI_pages/PIDforDummies.html), "*PID Without a PhD*", by Tim Wescott of Wescott Design Services, "*Sensorless Field Oriented Control of 3-Phase Permanent Magnet Synchronous Motors*" by Texas Instruments, "*InstaSPIN-FOC* and *InstaSPIN-MOTION User's Guide*" by Texas Instruments, and "*TMS320x2806x Piccolo Technical Reference Manual*" by Texas Instruments.

Sensors—Tension and Torque. To measure tension on the cable (1008) and/or actuator (1010), the "force" on the cable (1008) and/or actuator (1010) must be measured. For motor based systems where the cable (1008) wraps around a spool, force may be converted to torque by multiplying the force by the radius of the spool.

Torque on the motor may be estimated using techniques such as current draw for a BLDC motor, or slip for an induction motor. Measuring tension directly is a different means of accomplishing the same measurement. There are advantages of doing both, including compensating for drift over temperature and age, as well as friction in the system.

In one embodiment, tension is measured by using a strain gauge in-line in the cable (1008) in a Wheatstone bridge or similar configuration. In such a case an ADC, possibly after an op-amp stage, measures the voltage at the output of the Wheatstone bridge. Before use the tension measurement system must be calibrated. Various weights may be hung on the cable (1008) against gravity, and the measured voltage plotted against the weight. In this way, voltage may be translated into weight by reversing the function plotted. In some cases, the relationship may be approximated by a linear function.

Figure 4:
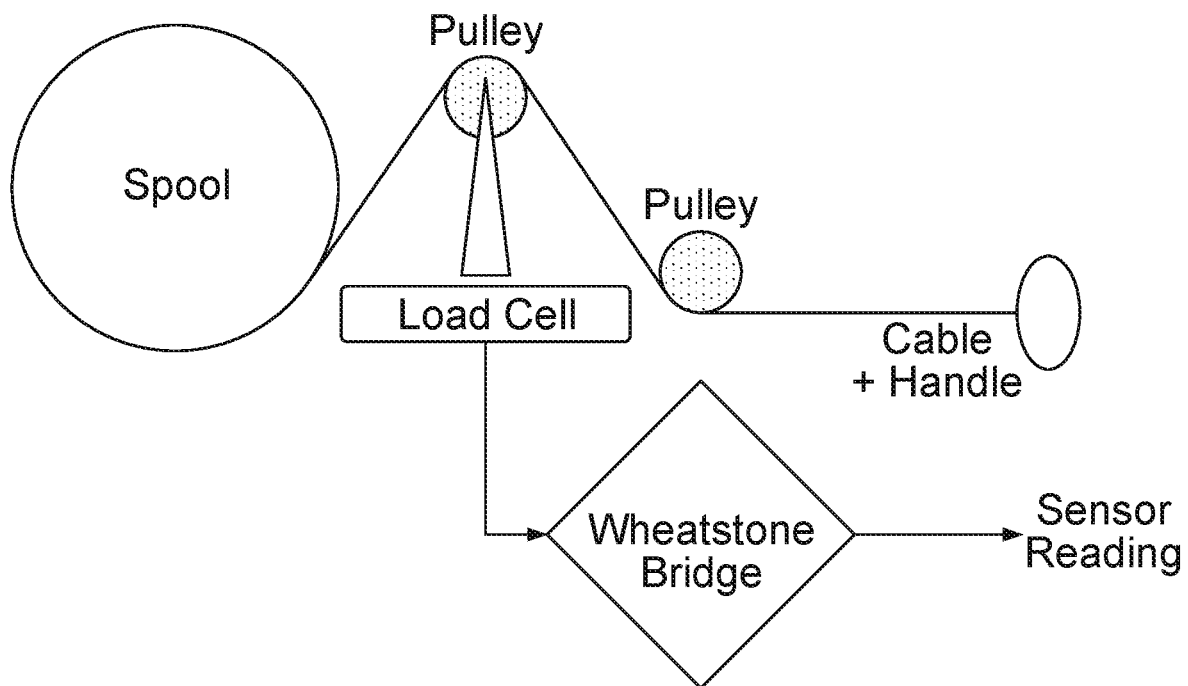
FIG. 4 is an illustration of an embodiment of tension measurement using a strain gauge.

FIG. 4 is an illustration of an embodiment of tension measurement using a strain gauge. As shown in FIG. 4, a cable (1008) is wrapped around a spool which may be directly or indirectly coupled to a motor (1006). To measure the tension on the cable (1008), it is passed over a pulley. As the cable tension increases, the downward force on the load cell increases linearly. The ratio between the force on the load cell and the tension on the cable may be calculated using trigonometry. While calibration also accounts for this, it is useful to ensure that the load cell maximum limits are not exceeded as specified for the selected load cell. If the angle that the cable approaches and departs the pulley is symmetric, then horizontal components are cancelled out.

Figure 5:
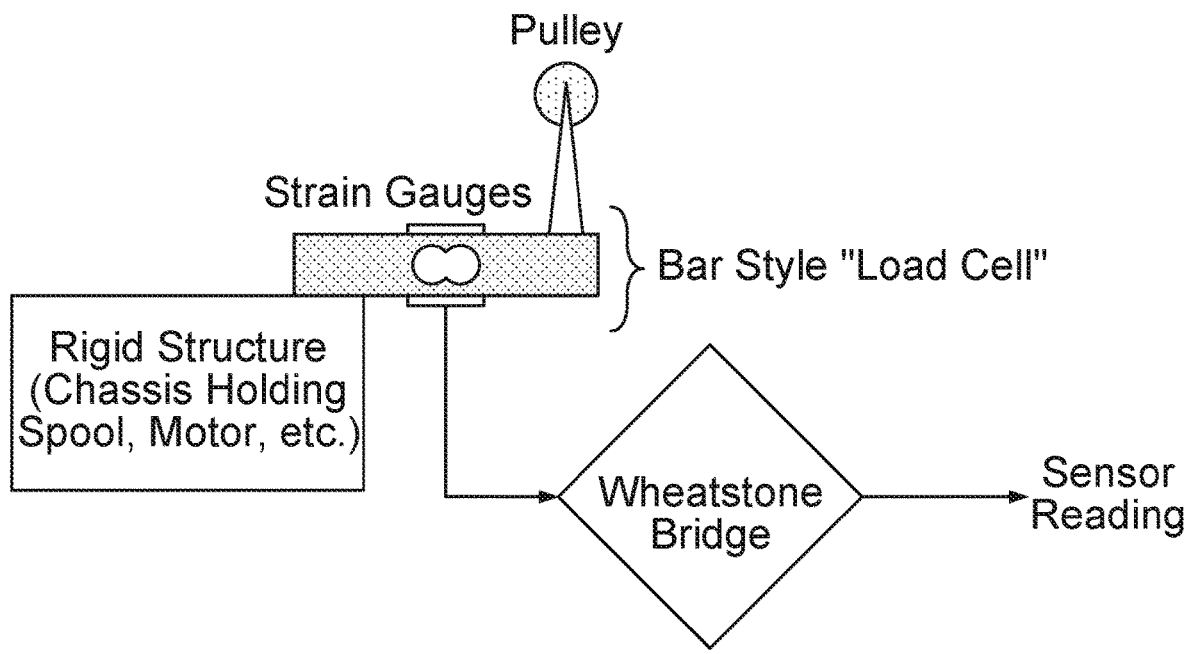
FIG. 5 is an illustration of an embodiment of tension measurement using a bar-style load cell.
Figure 6:
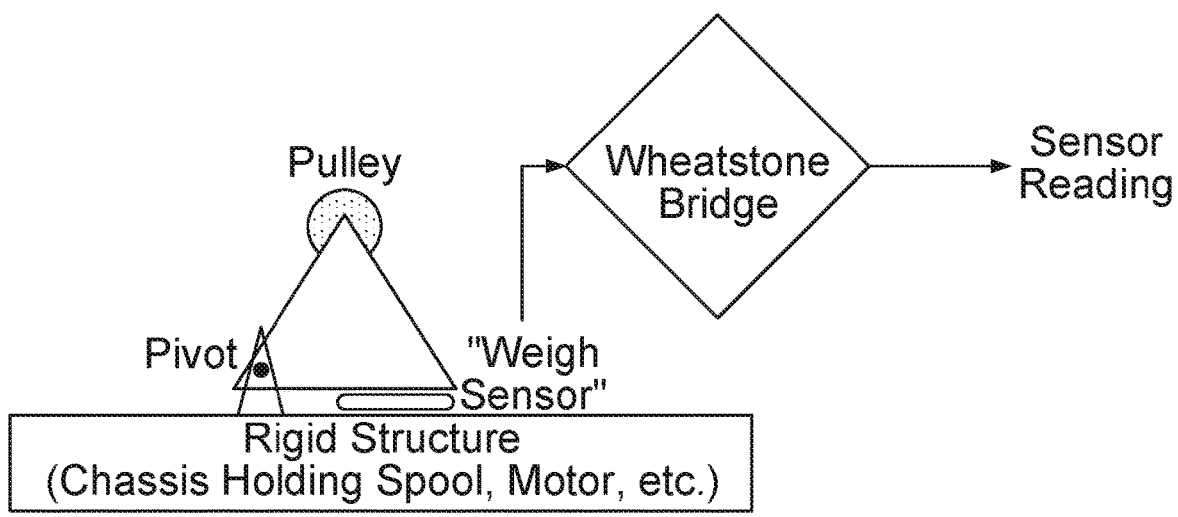
FIG. 6 is an illustration of an embodiment of tension measurement using weight sensors which use strain gauges to sense downward force.

FIG. 5 is an illustration of an embodiment of tension measurement using a bar-style load cell. As shown in FIG. 5, a bar style load cell built using strain gauges is used to sense the downward force. FIG. 6 is an illustration of an embodiment of tension measurement using weight sensors which use strain gauges to sense downward force. FIG. 6 places a pulley on a mount coupled to a pivot such that force is concentrated over the weight sensor.

In both the cases of FIG. 5 and FIG. 6, the load cell or weight sensor may respond to downward force by changing the electrical resistance of the circuit. Coupled to a Wheatstone bridge, these changes in electrical resistance are detected and converted to voltage, and may be read by the system controller (1004) using an amplifier and an ADC in sequence.

Figure 7:
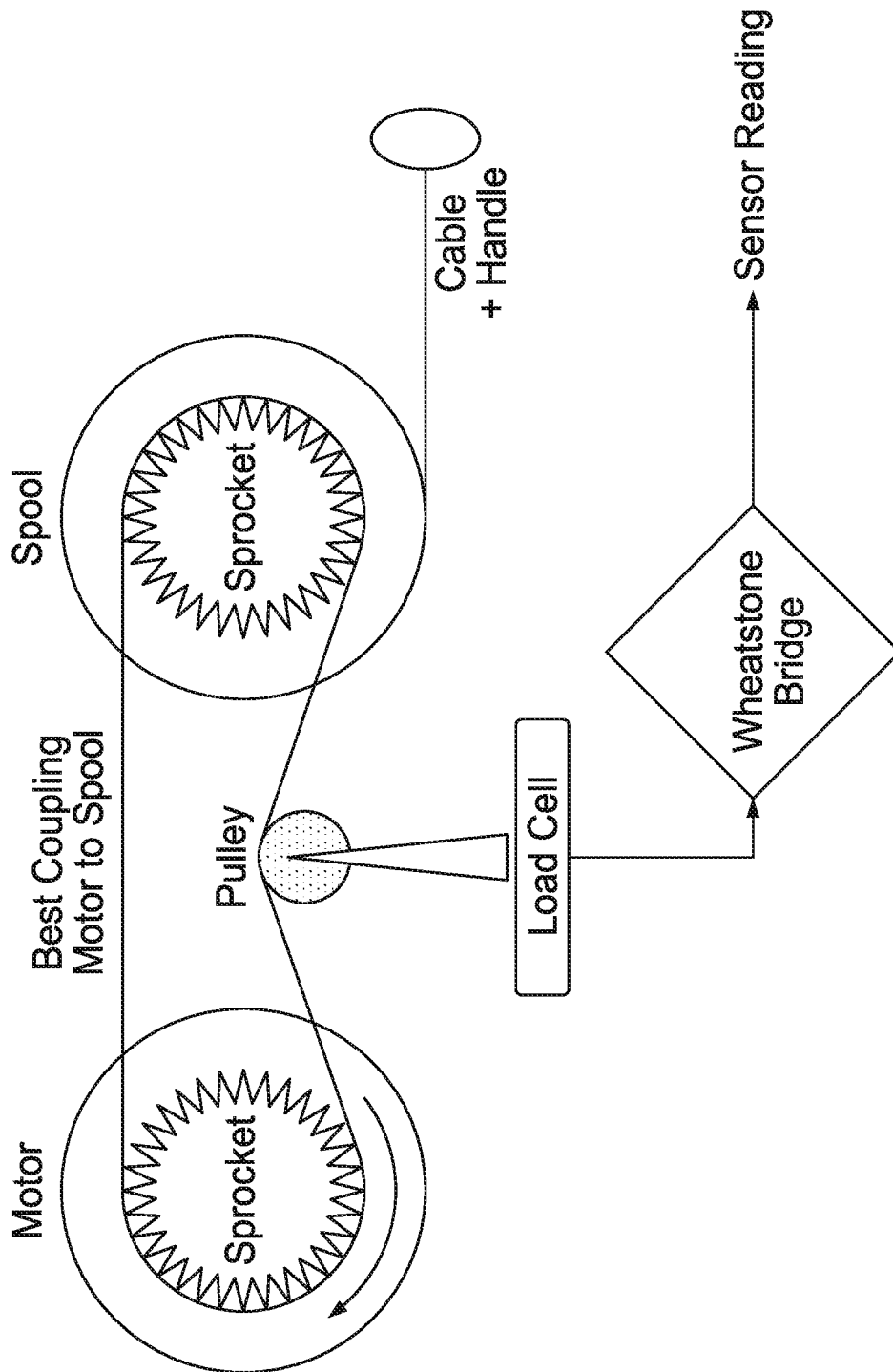
FIG. 7 is an illustration of an embodiment of tension measurement using a belt coupling.

FIG. 7 is an illustration of an embodiment of tension measurement using a belt coupling. Apart from that shown in FIG. 5 and FIG. 6, a second way to measure tension is measuring tension on a belt coupling the motor and spool, also by using a strain gauge or load cell, as shown in FIG. 7. As tension on the cable (1008) increases, additional tension is put on the belt coupling the motor (1006) to the spool. As this belt passes over a pulley as shown in FIG. 7, this additional belt tension translates into a downward force on the pulley in a similar manner to that shown in FIGS. 5 and 6.

A third way to measure tension is to apply a strain gauge to the mount holding the motor, also with a Wheatstone bridge. As in other examples, the tension measurement system is calibrated. Various weights may be hung on the cable against gravity, which may cause a force to be applied to the motor mount and thus to the strain gauge, and plot measured voltage against weight. In this way, voltage may be translated into weight by referencing the plot. In many cases, the relationship may be approximated by a linear function.

Sensors—Speed and Position. Measuring velocity may be determined using a number of sensors. In one embodiment, a sensor is a shaft encoder. A shaft encoder measures the rotational position of the shaft of the motor. As the motor rotates the shaft encoder produces an output, for example a pulse every quarter rotation. Counting the edges of these pulses yields position. A pulse may be conceptualized as a voltage level that rises then drops, with two edges per pulse and two opportunities for counting.

For example, consider a motor (1006) with a shaft encoder that produces 8 counts per rotation. The motor (1006) is attached to a gearbox with a 70× reduction ratio. The output shaft of the gearbox is connected to a hub with a 0.15 meter (~6 inch) diameter.

It may be determined then that the circumference of the hub is approximately 0.471 meters. Hence, the hub completes one full rotation when the cable moves 0.471 meters. There are 560 counts, from 8 counts per rotation multiplied by the 70× reduction ration, off the shaft encoder for every rotation of the hub. Thus, every count corresponds to a movement of 0.000841 meters (or 0.841 millimeters).

Selection of sensor type, number of pulses, and so forth is driven by the desired sensitivity of the system. Some shaft encoders give an analog sinusoidal output rather than digital pulses, such that output may be read using an ADC. In such a case the sensitivity and/or number of bits of the ADC is also significant. Other sensors may include optical sensors or accelerometers monitoring the rotation of the hub/shaft/gearbox and/or the movement of the cable. The selection of the right sensor may depend on desired characteristics and cost.

The control systems described above were designed to model a weight stack and control a motor where the variable under control is velocity. In various embodiments, a different variable is controlled, such as position, acceleration, or even tension as measured. Determining which variables to control may depend on available sensors, sensor cost, sensor maximum frequency, sensor performance, sensor latency/delay, sensor accuracy, and characteristics of the system including characteristics of the motor, gearbox if any, and elasticity of the cable.

Due to the characteristics of each type of motor, while any variable is controlled on any motor, it may be preferable to: directly control torque on AC motors; directly control speed on DC motors; and directly control position on stepper motors. In addition, torque control on DC motors may be possible by controlling current rather than voltage. As well, depending on the type of motor being used, it may be simpler to directly infer some variables rather than measure them.

For example, the system above described using a strain gauge or similar to measure tension. However, the output torque of an AC three-phase induction motor may be calculated if the output speed is known. In such a case, it may not be necessary to use a strain gauge to measure tension. Instead, the speed of the motor may be measured, using a number of techniques, such as a shaft encoder, and the torque/tension may be inferred/calculated. Different speed sensors have different characteristics in terms of cost, maximum speed, resolution, and so on.

In some embodiments, multiple sensors are combined to achieve measurement across a variety of speeds while maintaining low cost, termed throughout this specification as "sensor fusion". In the case of a BLDC motor, motor position may be calculated by using a Hall sensor and/or measuring the back-EMF voltage at the leads of the motor. These techniques yield a reading more than accurate enough to control the motor. However, the accuracy of the reading decreases as the speed of the motor decreases. Sensors that measure the physical position of the motor directly increase in cost as their required top speed increases. In addition, at high speed it is more likely that such sensors accumulates error.

In one embodiment, a Hall sensor is used to determine motor position at high speed, and a physical position sensor is used to measure motor position at low speed. Fusing these two readings may be done with an algorithm as follows:
1. Initial Position, termed "POS", is set to 0, and the motor is at rest. The sensor fusion is in "low-speed mode" and a Slow Sensor such as a physical position sensor is used to measure motor position;
2. As the motor starts moving, position information is collected from the Slow Sensor in low-speed mode. In a loop, from one iteration to the next, the change in position is calculated and added to POS;
3. If the absolute value of the change in position ever exceeds a pre-determined threshold such as a maximum speed threshold, switch to "high-speed mode" using a Fast Sensor such as Hall sensor to determine motor position;
4. In high-speed mode, the change in position is calculated from one reading to the next and added to POS;
5. If the absolute value of the change in position ever drops below a pre-determined threshold such as a minimum speed threshold, switch back to low-speed mode. The minimum speed threshold may be similar to the maximum speed threshold, or different if hysteresis is used to prevent flip-flopping.

Thus, the change in position is constantly being calculated from both the low-speed sensor and the high-speed sensor in each iteration of the loop. In one embodiment, at any one time only one of the two readings is being trusted for the sensor fusion. Alternatively, the two readings may be linearly or non-linearly combined. This is the reading that is being added to POS. Also note that change in position may be both negative and positive depending on the direction of rotation of the motor.

In order to properly/precisely control a motor, a motor control algorithm may need to know absolute motor position. This is the position of the rotor relative to the stator; the magnets relative to the coils. This absolute position is sometimes referred to as motor angle or magnetic angle, and used such that a motor control algorithm may decide which electrical angle to drive in order to yield the desired result.

The Fast Sensor may use a Hall Sensor and/or voltage at the motor leads, which are directly correlated to the position of the magnets relative to the coils; the Fast Sensor has information about the absolute position of the motor. The Slow Sensor, while higher resolution, only provides relative information about the position of the motor. By combining information from both sensors, the absolute position of the motor may be determined regardless of which sensor is being monitored. For example, after getting information from the Fast Sensor, motor absolute position is known. After switching to the Slow Sensor, relative motor movements are accumulated, and the absolute position of the motor is maintained because it was known at the time when system switched from using the Fast Sensor to the Slow Sensor. Additional details about this process are detailed in the example below.

In one embodiment, a Hall Sensor is used in combination with an encoder. The encoder provides high resolution position information and the Hall Sensor provides low resolution position information. A two-state Hall Sensor provides two outputs: a digital 1 if a magnet is present, and a 0 if no magnet is present. If in a three-phase brushless motor, three Hall Sensors are installed next to three adjacent coils, then the combination of outputs from those Hall sensors determines the absolute position of the motor. This produces combinations of outputs that isolate motor position to one of six regions of motor angle: 0-60 degrees, 60-120 degrees, 120-180 degrees, 180-240 degrees, 240-300 degrees, and 300-360 degrees of electrical angle position.

Because two-state Hall Sensors may report the same values throughout an entire region such as 0-60 degrees, the Hall Sensors cannot be used to detect small movements of the motor. However, whenever the Hall Sensors change state, for example flipping from a 0 to a 1, or a 1 to a 0, it is then known exactly which boundary the motor is at: 0, 60, 120, 180, 240, or 300.

If this information is combined with a high resolution sensor such as an encoder, the two can be combined to derive absolute position with high resolution, using an algorithm such as:
1. The absolute position of the motor, POS, is initially set to 0, and as the encoder tracks movement, POS is updated accordingly/accumulates movement;
2. After the motor moves no more than 60 degrees, one of the Hall Sensors toggles. As a result the motor angle becomes known as 0, 60, 120, 180, 240, or 300. At this point, the current position POS and the determined motor angle are recorded into two variables: POS_ANGLE and ANGLE; and 3. After this point, true motor angle can always be calculated from POS by comparing it to POS_ANGLE and ANGLE.

In the above examples, the relationship between the encoder resolution and the angle resolution is important. For example, an encoder may generate a certain number of count per 360 degree electrical rotation. This ratio is important in correlating encoder movement and motor angle movement.

Delta_Motor_Angle_Degree=Delta_Encoder_Position/
Encoder_Count_Per_Motor_Angle_Degree In the example above:

Motor_Angle=(ANGLE+(POS−POS_ANGLE)/EncoderCount_per_motor_Angle_Degree)mod 360

Many encoders have a top speed after which they become unreliable, but a fusion system like this may rely on the Hall Sensors once the speed passes a certain threshold. In such a case, once the motor is running at a high speed:

1) Speed which may be expressed as angular speed may be determined by the rate at which Hall Sensors toggle; the inverse of the period at which the Hall Sensors toggle is directly proportional to speed; and 2) Angle may be calculated using the most recently determined position (0, 60, 120, 180, 240, or 300), added to the time delta since that position was determined multiplied by the angular speed of the motor.

As described above these techniques fuse multiple sensors that each provide information that on their own may not provide a description of the complete system, but using these fusing techniques, information from multiple sensors may be combined to get a strong set of information about motor position.

Friction, Momentum, and Inertia Compensation. As described above, a filter (1002) controls a motor (1006) to produce a certain amount of tension on a cable/actuator (1008/1010), varied over time to accomplish a certain goal including a given feel for the user.

In one embodiment, the motor (1006) is controlled to produce a fixed amount of tension at all times. This fixed amount of tension may be maintained regardless of the speed or acceleration of the motor (1006) or the cable (1008) coupled to the motor. Without limitation, a motor (1006) may vary tension over time based on some other goal/filter, but this simple case is illustrative. The cable (1008) is spooled onto a spool coupled to the motor (1006). The motor rotor and spool have mass to them. The cable (1008) may route through a number of pulleys as it traverses the rest of the system in FIG. 1A. The mass of the motor rotor and spool has consequence that the motor exhibits momentum and inertia. Practically, tension experienced with respect to the cable (1008), while unspooling in the concentric phase of an exercise, is higher than intended during acceleration, and lower than intended during deceleration due to friction by running over pulleys. Thus, the user experiences a tension higher than intended during the unspooling concentric phase, and lower than intended during the spooling eccentric phase.

With an appropriate filter, these unintended effects may be compensated for. For friction compensation, such a filter adjusts the tension generated by the motor so that the tension experienced by the user after the cable has passed through all the pulleys and other friction sources is as intended. In a simple model, a friction compensation ratio is a percentage of tension that is added during spooling, termed "positive velocity", and subtracted during unspooling, termed "negative velocity".

For example, if the friction compensation ratio is set to 15% as measured empirically while friction compensation is not applied to the system, then tension generated by the motor is increased by 15% during spooling, and decreased by 15% during unspooling in order to compensate for that friction. For example, for a goal of 100 lb, the filter will set 115 lb and 85 lb of motor tension for spooling and unspooling, respectively. As the system transitions between spooling and unspooling, the friction compensation filter avoids a discontinuity and smooths where motor tension jumps between 85 lbs and 115 lbs. The filter adds tension based on a saturating linear function of speed. For example, the function is a linear transition from 85 lbs to 115 lbs from a cable speed −2 inches per second to 2 inches per second, wherein the linear function saturates to 115 lbs for velocity over 2 inches per second, and saturates to 85 lbs for velocity below −2 inches per second. The thresholds in the example above at +/−2 inches per second may be adjusted based on the amount of tension such as to effect the fastest transition possible, without ever exceeding a maximum allowed slope. For larger tensions the thresholds are increased, and for lower tensions the thresholds are decreased.

In an alternative embodiment, an advanced function such as a saturating sine or a logistic function is used. Another example of an advanced filter is one that implements a mathematical function derived from the physics equations that model the friction in the system compensated for.

Similarly, a filter may be designed to compensate for momentum/inertia. Such a filter is a function of acceleration rather than speed, because of the definition of momentum according to physics equations. When there is momentum caused by mass, then during acceleration, the tension experienced by the user is higher than intended, and hence the motor tension is reduced. During deceleration the tension experienced by the user is less than intended, and hence the motor tension is increased. The compensation filter is a linear function of acceleration. The slope of this filter may be calculated based on the known mass of the system, or determined empirically by characterizing the behavior of an actual system with momentum compensation turned off.

In an alternative embodiment, an advanced filter may model the kinetic energy of the system, and decrease motor tension whenever kinetic energy of the system is increasing, and increase motor tension whenever kinetic energy is decreasing. This ensures the user is not exhibiting any of the work that is contributing to or benefiting from the kinetic energy of the system. Instead, the motor (1006) compensates for such an effect. For example, the angular momentum of the system may be modeled based on the mass and shape of the motor rotor combined with spool. More complex models also include linear momentum, as well as the momentum of gearboxes, pulleys, and other elements of the system. Another filter may continuously calculate the kinetic energy of the system, and compare it to the amount of kinetic compensation the motor has absorbed through the addition or removal of tension, then calculate how much additional tension compensation should be applied.

Trainer Intelligence. When a user is performing an exercise, the part of their body being exercised moves through a range of motion necessary to perform that exercise. For example, a bicep exercise might move from the elbow being fully extended wherein the bicep muscle is fully elongated, to the elbow being fully bent wherein the bicep is fully contracted. This presents an opportunity for "Trainer Intelligence" as described below.

In some embodiments, for a user performing the exercise with the system of FIG. 1A, during this motion the cable (1008) may move through a range of motion which corresponds to a range of motion for the cable (1008), spool, and motor (1006) of the system, if a motor is being used. In some embodiments, changes in cable (1008) position may correspond to changes in the readings of various sensors and in the physical position of various actuators such as linear electro-magnetic-mechanical, pneumatic, and so forth. This range of motion is termed "percent range of motion", which ranges from 0% to 100%, with the convention that 0% represents the beginning of the range of motion when the elbow is fully extended, and 100% represents the end of the range of motion when the elbow if fully bent. Both actual and ideal range of motion is considered. Actual range of motion is that a current user enacts, and ideal range of motion is that which a user should enact for an ideal or intended exercise.

Strength training exercises are divided into sets. Each set includes one or more repetitions. A user typically performs one or more sets of a given exercise. In order to determine a percent range of motion, the systems in FIG. 1A may first calibrate itself, and may then also make dynamic adjustments. This is possible because the user performs several repetitions of every movement. The first time a user performs a given movement/exercise, a start position, an end position, and stride length, the end position minus the start position, may be recorded. The end position may be the point at which the direction of movement changes from the direction corresponding to the weight stack moving away from the ground to the direction corresponding to the weight stack moving towards the ground. The start position may be the point at which the direction of movement changes from the direction corresponding to the weight stack moving towards the ground to the direction corresponding to the weight stack moving away from the ground. In one embodiment, calibration and/or adjustment may be based on recordings from each movement in a set. Alternatively, calibration and/or adjustment may be based on recordings over multiple sets, such that the results over time are combined and stored for use in future sets.

A user may momentarily change direction of travel at a point that does not demark the beginning or end of a repetition. This may happen if a user is struggling. Such movements may be filtered out for the purposes of determining range of motion, or noted in another way.

Constantly recording and updating the start point, end point, and the calculated stride length are important to calculations. Points change over time, as a user taking a step away from the machine shifts the start and end points the equivalent distance. If the stride length has not changed, the true range of motion may not be changed but be offset, which may be filtered or dealt with appropriately with a calculated offset. The start points and end points may be updated with each repetition, or an average, moving average, or weighted average of the last plurality of recorded samples are used, and may include samples from previous sets.

In some embodiments, range of motion and repetitions are extracted from a series of position updates. Hysteresis is used to filter out small movements that may be mistaken for a new repetition, such as when a user is struggling, and this learns over time by averaging the position of the start and end of the range of motion. Averaging may also occur over weighted averages and/or moving averages. Sample code includes:

```
// Repetition Extraction from position data.
(this function is to be called every time the
// position of the virtual weight stack changes).
It will extract segments (each rep is 2
// segments), and calculate the position in (% of range of motion)
as it learns the range
// of motion.
void processRe(int32 newpos) {
    // newpos is the virtual position of the weight stack
    at the current moment. GROUND is a
    // constant that indicates the lowest possible
    position the weight stack can take.
    // g_ReEndSetFlag is a global flag that indicates to
    this rep extraction algorithm that
    // the current set has come to an end, an a new set should begin.
    This can be user initiated
    // or be based on a timer (when newpos <= GROUND, start a timer,
    and if the weight stack
    // doesn't move above ground after a certain amount of time threshold
    (say 10 seconds), we
    // can declare the set over.
    if(g_ReEndSetFlag && newpos <= GROUND) {
        g_ReSegCount = 0; // which will trigger a full
        reset in the if statement below
        g_ReEndSetFlag = 0;
    }
    if(g_ReLow >= g_ReHigh && g_ReSegCount > 0) {
        g_ReSegCount = 0;
    }
    // Now we're starting a new set!
    if(newpos <= GROUND && g_ReSegCount <= 0) {
        g_ReDirUp = 1; // the direction the weight stack is
        moving (up or down)
        g_ReSegUp = 1; // each rep has two segments, an
        up and a down segment. This stores
            // the direction of the current segment
        g_RePos = GROUND; // the previous position of
        the weight stack
        g_RePercent = 0; // percent position into the range of
        motion. 0% is the start of the
                // range if motion, and 100% is the
                end of the range of motion
        g_ReSegCount = 0; // counts the number of segments
        (2 segments per rep)
        g_ReLow = GROUND; // This is the position of the
        (average) beginning of the range of motion
        g_ReHigh = -1; // Like ReLow, but it's the end;
        -1 => we won't use these until initialized
        // The next two thresholds are used to implement
        hysteresis, were the weight stack reversing
        // direction does not count as a new segment unless
        it's gone past the appropriate threshold
        g_ReHighThreshold = -1; // The threshold for going
        from Up to Down
        g_ReLowThreshold = -1; // The threshold for going
        from Down to Up
        g_ReFlag = 0; // A flag that indicates that a change
        in direction was ignores because it
                // didn't comply with one of the above two thresholds
        g_RePercent = 0; // Global, and the output of this function;
        represents the position as
                // a percent of range of motion
        return;
    } else if(newpos < GROUND) {
        newpos = GROUND; // filter out what happens down there ;)
    }
    if(g_ReLow >= g_ReHigh && g_ReSegCount > 0) {
        g_RePercent = 0; // This should never happen
    } else if(g_ReSegCount < 2) {
        g_RePercent = 0; // percent isn't useful until a full repetition
        has completed (that's 2
        // segments; one on the way up, and one on the way down
```

```
} else {
  // Multiply by 1000 since we are calculating
  10th's of a percent (fixed point)
  g_RePercent = (int)((int32)(newpos - g_ReLow) *
  (int32)1000L / (int32)(g_ReHigh - g_ReLow));
}
if(g_ReDirUp) {
  if(newpos < g_RePos) {
    // wow, direction changed!
    g_ReDirUp = 0;
    if(g_ReFlag) {
      g_ReFlag = 0;
    } else if(newpos < g_ReHighThreshold && g_ReSegCount > 1) {
      g_ReFlag = 1;
      g_ReFlagCount++;
    } else if(newpos < 6000 && g_ReSegCount == 0) {
      g_ReFlag = 1;
      g_ReFlagCount++;
    } else {
      // Let's record the "high" position
      if(g_ReSegCount < 2) {
        g_ReHigh = g_RePos; // first segment, just record
      } else {
        // Moving average for future segments
        g_ReHigh = (g_ReHigh * 3 + g_RePos * 7) / 10;
      }
      // We have a new high point; let's update the thresholds
      g_ReHighThreshold = (g_ReLow +
      (int32)2L*g_ReHigh) / (int32)3L;
      g_ReLowThreshold = ((int32)2L*g_ReLow +
      g_ReHigh) / (int32)3L;
      if(g_ReSegCount == 0) {
        // First half of the first rep; let's set the low threshold
        // such that minimum rep length is 10 cm
        g_ReLowThreshold = g_ReHighThreshold -
        g_AsTicksPerMm * 100L;
      }
      g_ReSegCount++;
      g_ReFlag = 0;
      g_ReFlagCount = 0;
      g_ReSegUp = g_ReDirUp;
      g_ReFlagGround = 0; // reset the ground flag
      // Notify a listener that a up segment has completed
      (this is a place where
      // any code relying on repetition extraction can make decisions
      at the end of a
      // up segment)
      onReEndOfUpSegment(newpos);
    }
  }
} else {
  if(newpos > g_RePos) {
    // wow, direction changed!
    g_ReDirUp = 1;
    if(g_ReFlag) {
      TEST_PRINTF(": %-10d LOW\n", g_RePos);
      g_ReFlag = 0;
    } else if(newpos > g_ReLowThreshold && g_ReSegCount > 0) {
      TEST_PRINTF("! %-10d LOW [Threshold = %d]\n",
      g_RePos, g_ReLowThreshold);
      g_ReFlag = 1;
    } else {
      // Let's record the "high" position
      if(g_ReSegCount < 2) {
        g_ReLow = g_RePos; // first segment, just record
      } else {
        // Moving average for future segments
        g_ReLow = (g_ReLow * 3 + g_RePos * 7) / 10;
      }
      // We have a new low point; let's update the thresholds
      g_ReHighThreshold = (g_ReLow + 2*g_ReHigh) / 3;
      g_ReLowThreshold = (2*g_ReLow + g_ReHigh) / 3;
      g_ReSegCount++;
      g_ReFlag = 0;
      g_ReFlagCount = 0;
      g_ReSegUp = g_ReDirUp;
```
```
      // Notify a listener that a down segment has completed
      (this is a place where
      // any code relying on repetition extraction can make decisions
      at the end of a
      // down segment)
      onReEndOfDownSegment(newpos);
    }
  } else if(newpos <= GROUND) {
    if(!g_ReFlagGround) {
      // Notify a listener that the weight stack has reached the
      ground (this is a place
      // where any code relying on repetition extraction can make
      decisions that are to be
      // make when the weight stack returns to the ground)
      onRegGround( );
    }
    g_ReFlagGround = 1;
  }
}
g_RePos = newpos;
}
```

Significant changes in stride are noted as they indicate that the user is not completing the full range of motion on the exercise. This is particularly true if the start point is the same, but the end point has changed resulting in a reduced range of motion. This may be an indication of a user that is fatigued or being lazy.

In some embodiments, significant changes in stride are detected through the use of thresholds. For example, a reasonable range of motion for a healthy repetition begins at between 0% and 10%, and ends at between 90% and 100%. If the user ends a repetition at a lower point, such as 83% rather than greater than 90%, then this is considered a significant reduction in range of motion, at which point a user may be alerted and/or coached.

The concentric phase of an exercise is reflected when range of motion is increasing, for example 0% to 100%, and the eccentric phase of an exercise is reflected when range of motion is decreasing, for example from 100% to 0%. The bounds of 0% and 100% need not be actually reached as the user may be lazy or exceeding their average. When range of motion changes from increasing to decreasing, or decreasing to increase, is sufficient to determine a transition from concentric to eccentric or eccentric to concentric.

Figure 8:
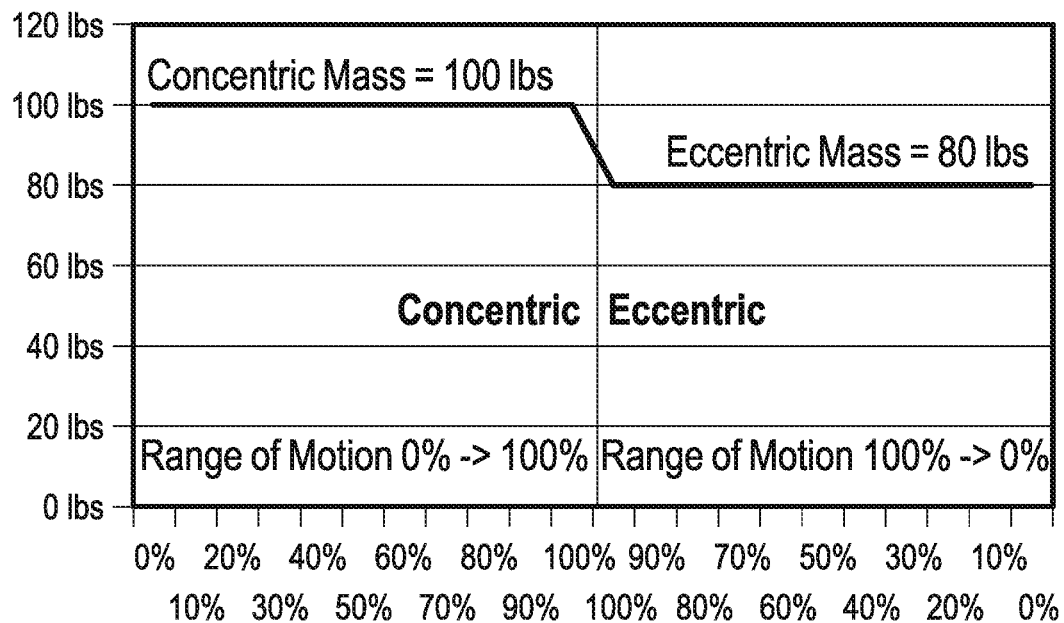
FIG. 8 is an illustration of an embodiment of concentric loading.

FIG. 8 is an illustration of an embodiment of concentric loading. A user may request eccentric or concentric loading, where either the eccentric mass is greater than the concentric mass, or the concentric mass is greater than the eccentric mass. In such a case, mass m, may be selected based on direction of travel based on range of motion. In the example of FIG. 8, concentric mass is 100 lbs and eccentric mass is 80 lbs, and m may be plotted as shown in FIG. 8.

As shown in FIG. 8, the mass m changes near-instantaneously from 100 lbs to 80 lbs when the x-axis reads 100%, so the change is near-instantaneous as the direction of motion changes. As the concentric and eccentric phases both have ranges of motion between 0% and 100%, the difference between the two phases is the direction of motion, essentially a function that exhibits hysteresis.

Figure 9:
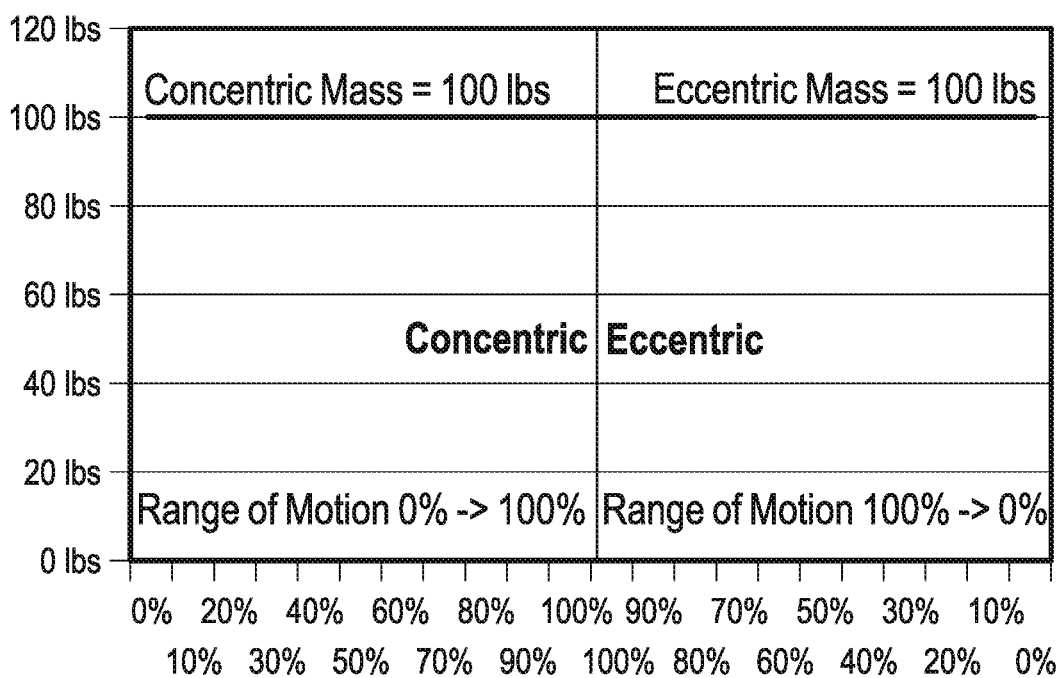
FIG. 9 is an illustration of an embodiment of equal loading.
Figure 10:
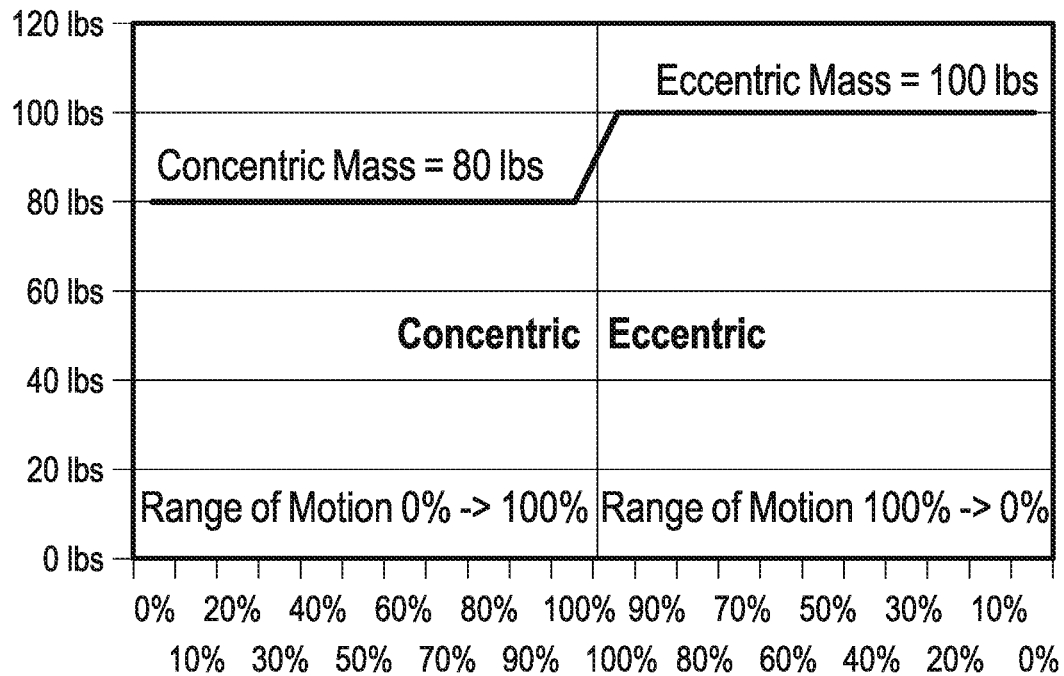
FIG. 10 is an illustration of an embodiment of eccentric loading.

FIG. 9 is an illustration of an embodiment of equal loading. By contrast to FIG. 8, independent of range of motion or direction of travel, the mass is 100 lb. FIG. 10 is an illustration of an embodiment of eccentric loading. As with the concentric loading example of FIG. 8, there is a near-instantaneous change in load. This instantaneous change in load may feel uncomfortable to the user and may even jolt them with the sudden increase in force applied to the user.

In one embodiment, instead of determining an amount of perceived mass based on either a concentric or eccentric phase, mass is determined simply based on the direction. If the weight stack is rising, a certain mass, Mass-Up, is selected and if the weight stack is falling, a certain mass, Mass-Down, is selected.

The examples above, including concentric loading and eccentric loading, and those that follow, are collectively referred to throughout this specification as "Variable Strength Curves" (VSCs). A number of techniques make the system feel better and/or more comfortable/natural to the user.

Figure 11:
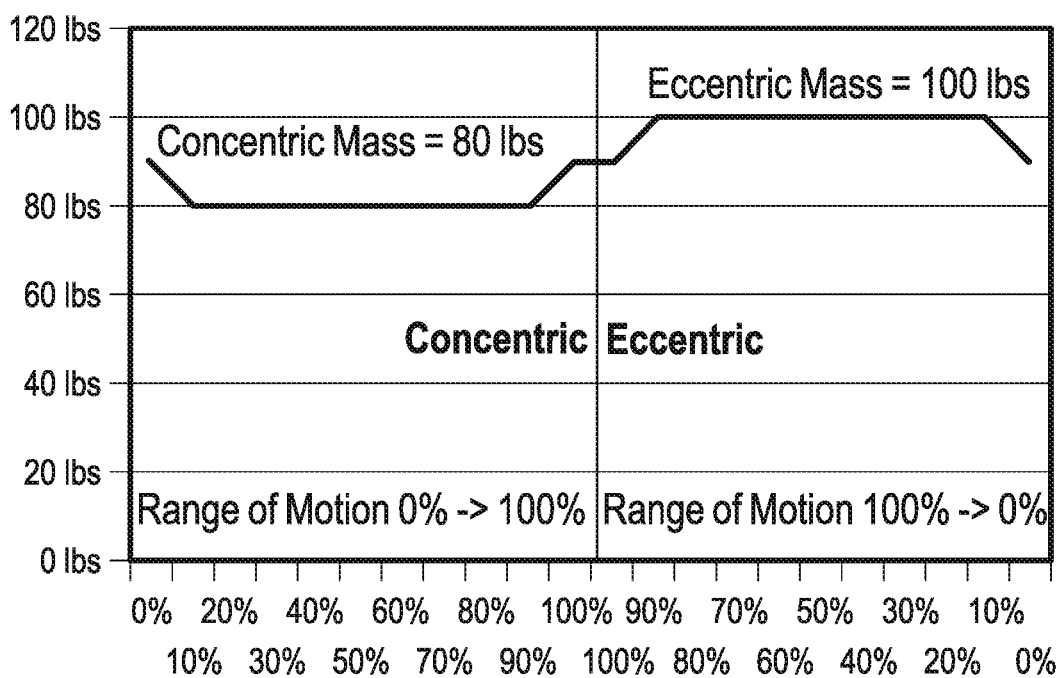
FIG. 11 is an illustration of moderated mass change.

FIG. 11 is an illustration of moderated mass change. As shown in FIG. 11, in the concentric phase the representative mass increases from 80 lb at a range of motion of 90%, to a midpoint of 90 lb at a range of motion 100%, then continues to increase in the eccentric phase between 100% and 90% range of motion to a full 100 lb. As eccentric range of motion reaches 10%, the mass reduces again to a midpoint of 90 lbs at 0%, then in the concentric phase between 0% and 10% range of motion reduces back to 80 lb, as shown in the wraparound in FIG. 11. As shown in FIG. 11, transitions are smooth and the user does not experience a jolt.

FIG. 11 indicates ranges of motion of "0%" and "100%", but a user may be lazy or injured and not reach their theoretical minimum and maximum range of motion. In one embodiment, a relative measure of range of motion is used such that 100% instead refers to the point at which the user reverses direction moving from a concentric motion to an eccentric motion, and 0% refers to the point at which the user reverses direction moving from an eccentric motion to a concentric motion. In a further embodiment, this relative range of motion is used for moderating mass. Thus, the percent position along the way is only an estimate since it is challenging to know precisely when the user reverses direction. They instead are dynamically estimated by knowing the recent start and end positions of the range of motion and calculated stride length based on average, moving, and/or weighted averages. As a result, the ideal plot of FIG. 11 may be distorted by error in the actual range of motion, and distortion may be conceptualized as being a transformation caused by error; the selection of curves leave room for this distortion.

In one example, if a user were to pull the cable (1008) halfway under concentric motion to 80%, then reverse direction, for the purposes of mapping to this plot, the 80% point maps to the 100% of the eccentric portion of FIG. 11, assuming that the reversal point is the end point of 100%, and the expected start point that the user is expected to return to is 0%.

Figure 12:
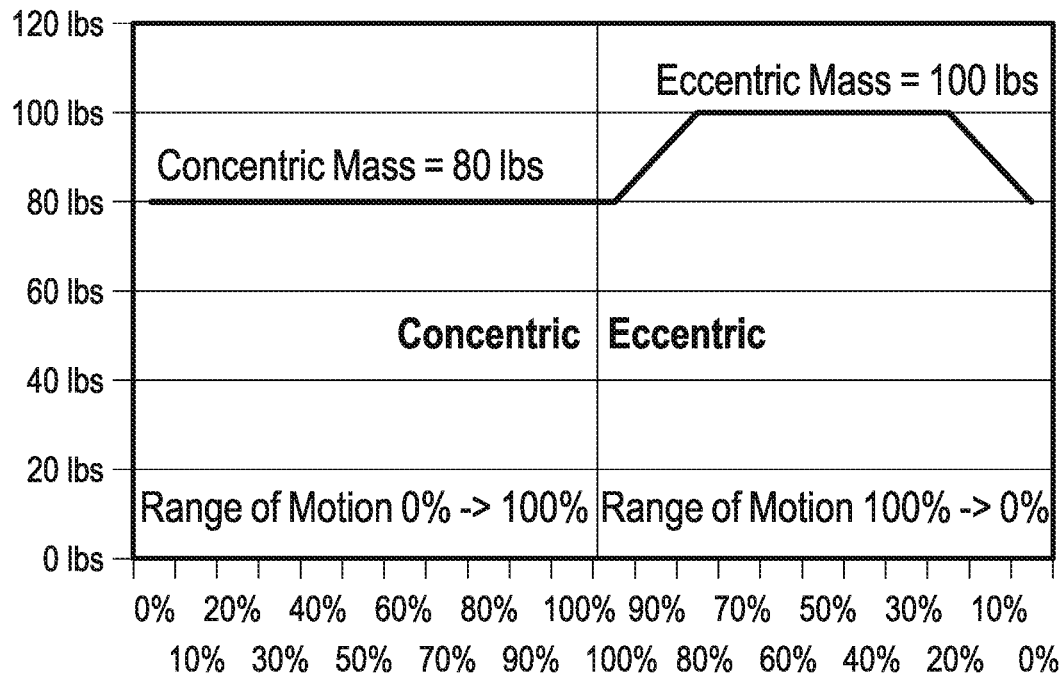
FIG. 12 is an illustration of shifted moderated mass change.

FIG. 12 is an illustration of shifted moderated mass change. Considering FIG. 11, a disadvantage may be that concentric weight rising near the end of a range of motion is when users are not generally strong. FIG. 12 shows a shifted version, for example such that the shift in eccentric load happens solely in the eccentric phase. In the example shown in FIG. 12, the thresholds are 80% and 20%. While shown in FIG. 12, the function need not be piecewise linear. Any person having ordinary skill in the art understands many variations of functions exist that accomplish a similar result. This function in FIG. 12 is referred to as function $M_1(x)$.

One disadvantage of $M_1(x)$ is that a user may not experience the full eccentric load during the entire range of motion. Focusing initially on the eccentric range between 100% and 80% as shown FIG. 12, full eccentric load may be achieved in this region of range of motion by changing the function to also include time as a variable.

Consider an alternate function $M_2(x,t)$ as follows:
1. At the start of the concentric phase, m=80 lb;
2. When a user reaches 100% range of motion, the end of the concentric phase, or comes to a full stop, for example no longer moving the cable (1008), with a range of motion higher than some threshold such as 80%, the system assumes that the user has completed the concentric phase and is about to release the cable (1008);
3. The user is now expected to hold that position for 2 seconds or some other goal. The mass m is increased linearly over that course of 2 seconds from 80 lb to 100 lb; and
4. After holding the position, the eccentric range of motion is at 100% but the mass is now 100 lbs.

If the user violates the hold time goal of 2 seconds and releases the cable (1008) sooner, then the mass m is increased with range of motion, and it is set such that function $M_1(x)$ is used instead. Thus, the combined function may be expressed as:

$$\max[M_1(x), M_2(x,t)]$$

as whichever function, $M_1$ or $M_2$, increase mass more quickly is the one that is actuated.

In one embodiment, in order to aid the user in meeting the hold time goal, a visual cue, audio cue, and/or other coaching/training/teaching mechanism may be given to the user to indicate and/or encourage the user to hold for the full goal, for example 2 seconds. An example of a visual cue is a light that lights up, or words on a screen, or a bar/slider/circle that fills over a 2 second hold time, and/or a combination of these.

Timing in weight lifting is important as the amount of time spent moving through the range of motion in both the concentric and eccentric phase may affect the benefits of the workout depending on goals. In some cases, a fast speed may be required and in others a slow speed may be required. Visual cues may be given to the user to guide them as to speed—such as a bar that shows where the user actually is in the range of motion as compared to where they should be given the desired speed.

Figure 13:
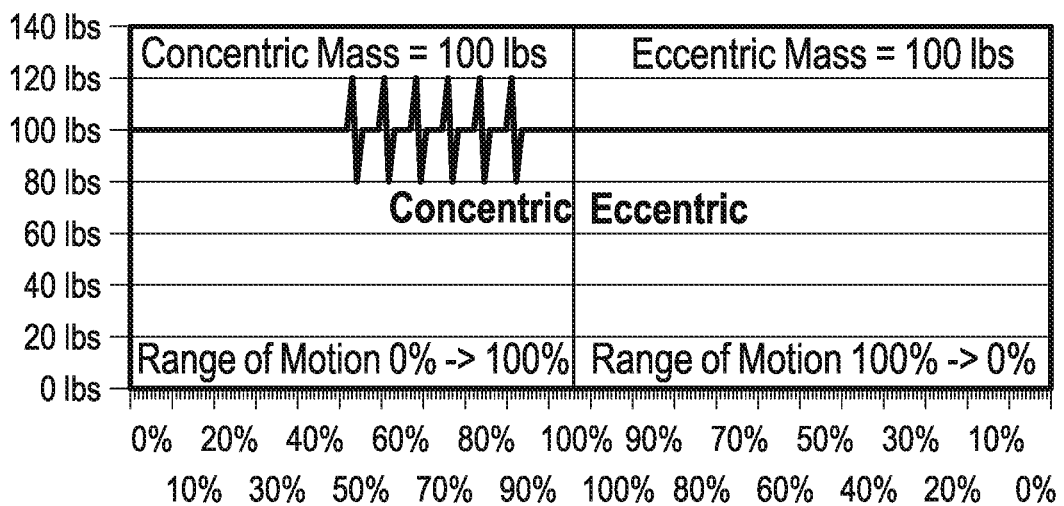
FIG. 13 is an illustration of haptic feedback.

FIG. 13 is an illustration of haptic feedback. Some users may ignore visual cues. By rapidly varying the tension that the user experiences in the cable, the user may also be given a physical/haptic/tactile cue to indicate that they are moving at the wrong speed. As shown in FIG. 13, when mass is instantaneously pulsed, the user feels it as "bumps" or "clicking-through" on the cable (1008). This may be an effective technique to alert the user they are not behaving correctly. In one embodiment, a physical cue may also be given by pulsing mass based on time rather than position, for example a change of m every 100 milliseconds for 1 second.

FIGS. 8 through 13 are ideal if humans were equally strong through their entire range of motion. Most muscles however have a point of peak tension; a point in their range of motion where they are strongest. Varying mass such that it also peaks at the point of peak tension ensures that the muscle is being pushed to its limit. There may be other corollary benefits, such as ensuring that good form is maintained by not overloading a muscle outside the point of peak tension.

Figure 14:
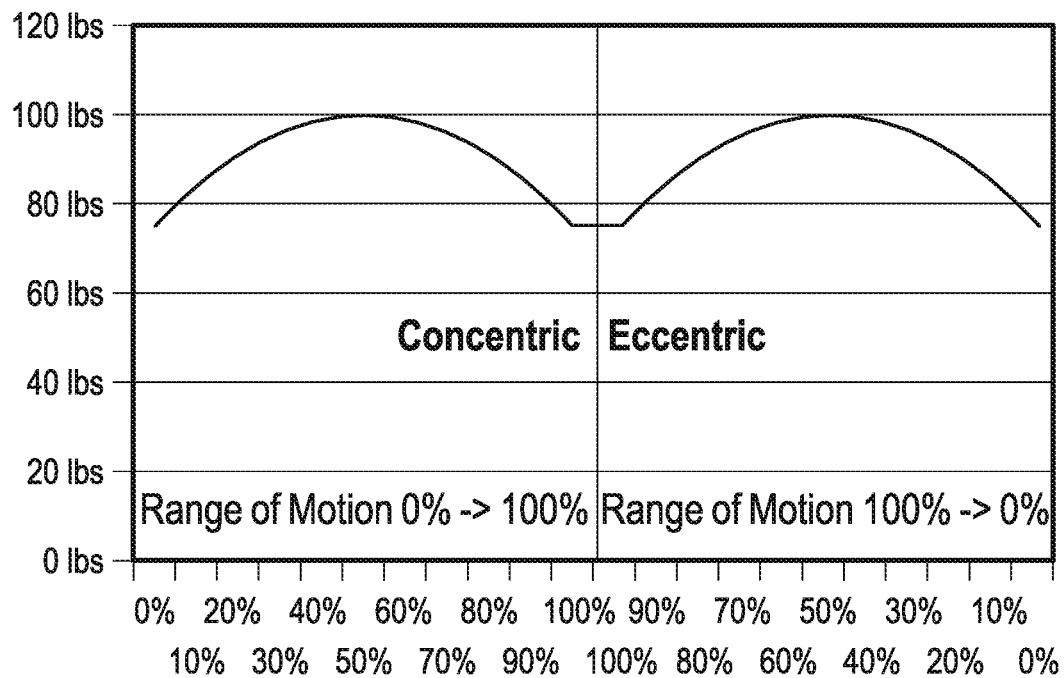
FIG. 14 is an illustration of peak tension.
Figure 15:
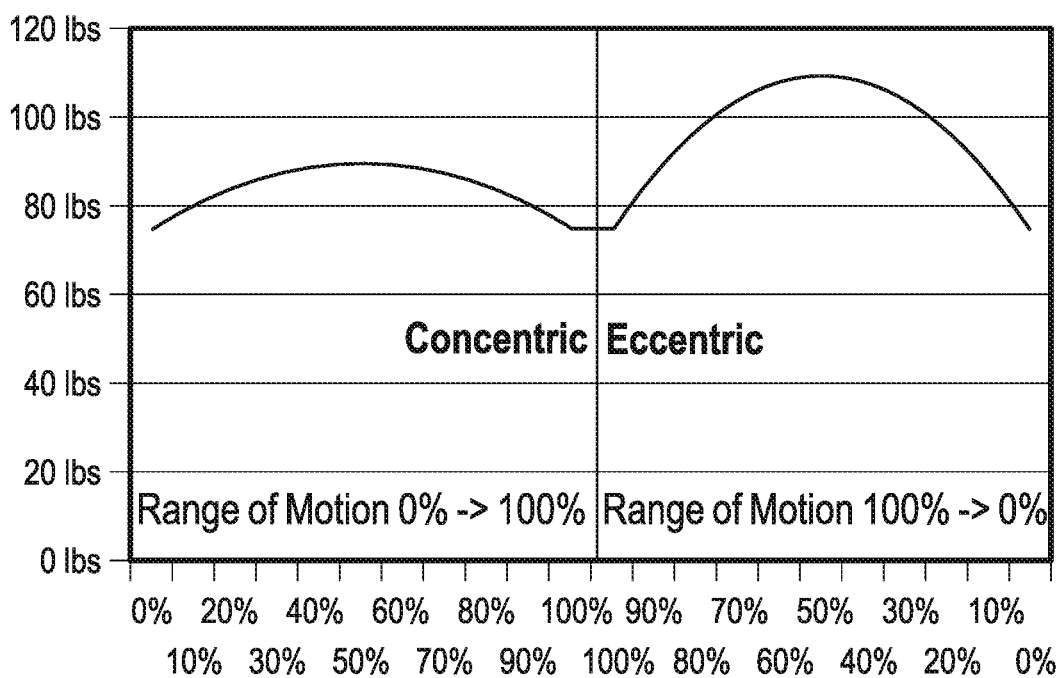
FIG. 15 is an illustration of adjusted peak tension.

FIG. 14 is an illustration of peak tension. FIG. 14 illustrates a mass function as a parabolic function of $M(x)=100-100\times(0.5-\text{PercentRangeOfMotion})^2$. Any person having ordinary skill in the art understands many other functions exist to accomplish this goal. As peak tension is not always at the 50% point, and varies from person to person, and even over time on the same person as they get stronger or weaker, these functions are adjusted for each user over time. FIG. 15 is an illustration of adjusted peak tension. FIG. 15 shows a variant of the function in FIG. 14 but exhibits eccentric loading using a piecewise parabolic function.

Dynamic Spotting Protocol. Consider a scenario where a user is in the middle of a concentric phase and reaches a point where they cannot complete the range of motion because they are fatigued. This is a common scenario in weight lifting, and may be considered poor form because the user cannot complete the range of motion. However, if the system detects this scenario it "spots" the user, analogous to a human spotter for weight lifting, for example:

1. A user begins by pulling the cable/actuator (1008/1010) through the range of motion;
2. The user's range of motion is between pre-determined motion thresholds, for example 20% and 80%;
3. The velocity of the cable drops to zero, or below some pre-determined velocity threshold close to zero;
4. Even at a low velocity, measured and/or calculated tension applied by the user is found to be above a pre-determined tension threshold, such as 60% of the current m;
5. The tension and low velocity persists for a pre-determined period of time, for example 1.5 seconds;
6. The system responds by slowly reducing m, for example linearly over the course of 2 seconds from 100% of starting/current m to a pre-determined mass threshold, for example 90% of starting m. As soon as velocity rises above some pre-determined velocity threshold such as 5 cm per second, m stops slowly reducing, and a new function adjusts m through the remainder of the range of motion. Two examples of a new function is a post-spot function or a scaled version of the prior function that the user got stuck on.

The above procedure describes an embodiment corresponding to one spotting protocol, and other protocols exist. In one embodiment, during the concentric phase m is reduced such that velocity of the cable/actuator (1008/1010) does not fall below a pre-determined velocity threshold. If a user's velocity drops below that threshold, m is reduced by a corresponding amount in order to aid the user to maintain a minimum velocity. Such a system may also prevent the user from exceeding a maximum velocity by increasing m if the velocity rises above a target threshold. In a further embodiment, this is accomplished using linear formulas or a PID loop.

In one embodiment, the logic described above is implemented by a series of if statements in software. Alternatively, the logic described above is implemented by a rules engine. Alternatively, the logic described above is implemented using equations. Alternatively, the logic described above is implemented using look-up tables.

Such a spotting procedure may enable "forced repetitions" where a user is aided in completing their full range of motion by being spotted when they get stuck rather than being forced to prematurely end their repetition. This may have health/efficiency benefits for the user.

Figure 16:
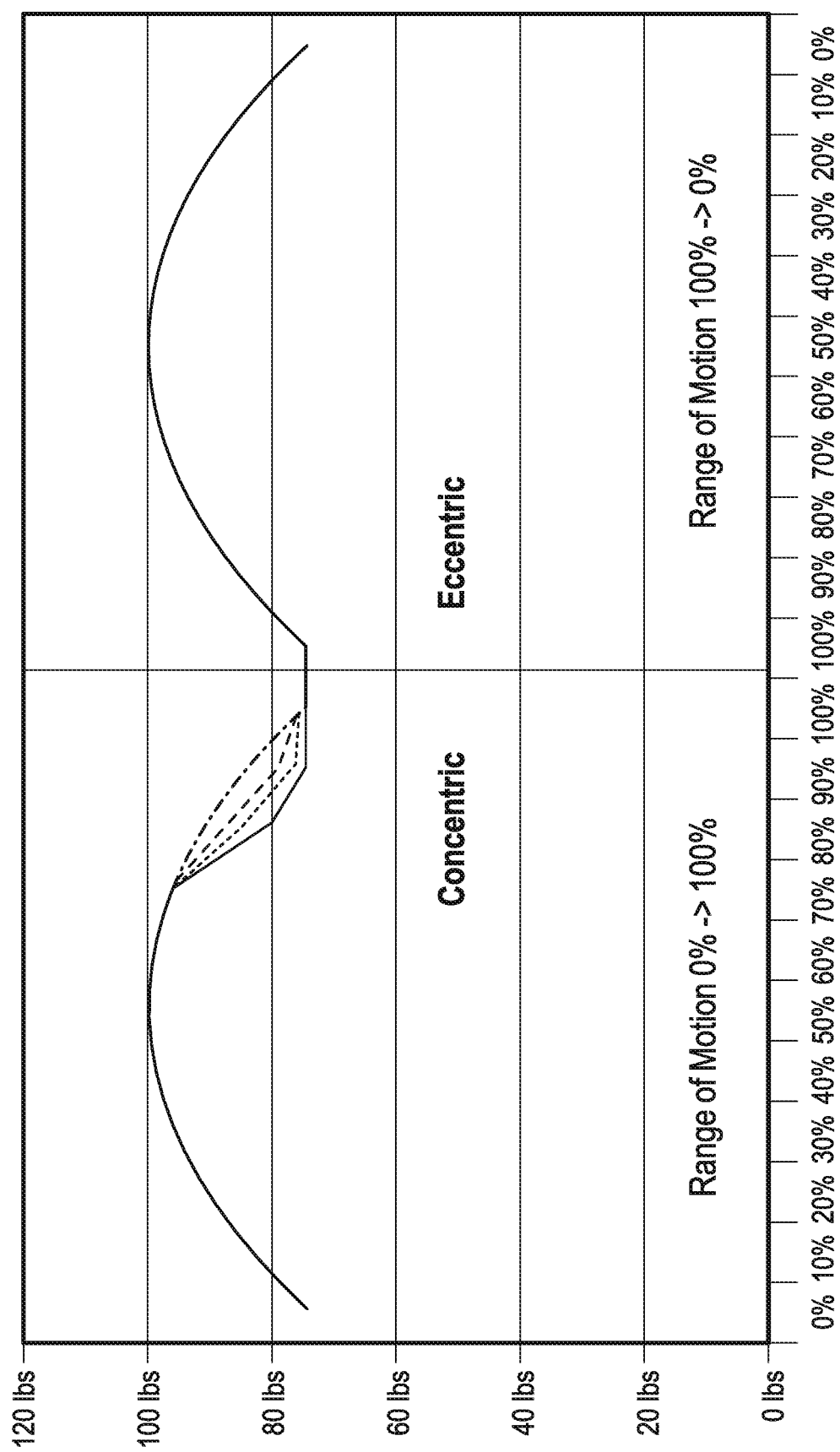
FIGS. 16 and 17 are illustrations of user accommodation in repetitions.
Figure 17:
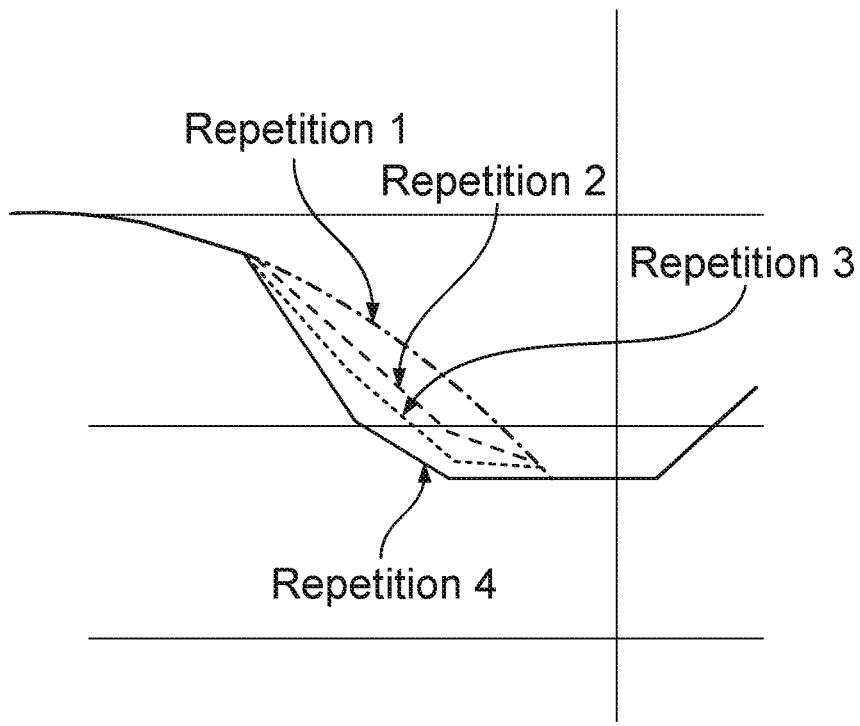

FIGS. 16 and 17 are illustrations of user accommodation in repetitions. For a case where a user is making it past 80% percent range of motion in the concentric phase, but is not completing the full 100%, this may be an indication of bad form and a symptom of fatigue. Adjusting the function after each repetition such that the mass m between 80% and 100% is reduced to accommodate the user is implemented as shown in FIG. 16, and a close-up is shown in FIG. 17 indicating four different repetitions.

In this example, after each repetition the user made it past 80% but not to the full 100%, so the system responded by adjusting the mass function after each of the 4 example repetitions. In one embodiment, the logic described above is implemented by a series of if statements in software. Alternatively, the logic described above is implemented by a rules engine. Alternatively, the logic described above is implemented using equations. Alternatively, the logic described above is implemented using look-up tables.

As shown in FIGS. 16 and 17 the system may in communicating with the user make reference to a repetition of peak-mass 100 lbs, because that is the greatest amount of mass in the function which occurs at 50% range of motion. If, for example, peak-mass were 150 lbs instead of 100 lbs, the function looks similar, but everything is scaled by a factor of 1.5×.

If a user gets stuck between 0% and 20% of range of motion in the concentric phase, it may indicate that the mass m is far too high for this given repetition. In such a case, the system may automatically adjust m as follows:

1. A user begins by pulling the cable/actuator (1008/1010) through a range of motion;
2. The user's range of motion is between pre-determined motion thresholds, for example 0% and 20%;
3. The velocity of the cable drops to zero, or below some pre-determined velocity threshold close to zero;
4. Even at a low velocity, measured and/or calculated tension applied by the user is found to be above a pre-determined tension threshold, such as 60% of the current m;
5. The tension and low velocity persists for a pre-determined period of time, for example 1.5 seconds;
6. The system responds by slowly reducing m, for example linearly over the course of 2 seconds from 100% of starting/current m to a pre-determined mass threshold, for example 60% of starting m. As soon as velocity rises above some pre-determined velocity threshold such as 5 cm per second, m stops slowly reducing, and a new function adjusts m through the remainder of the range of motion. Two example of a new function is a post-stuck function or a scaled version of the prior function that the user got stuck on.

Figure 18:
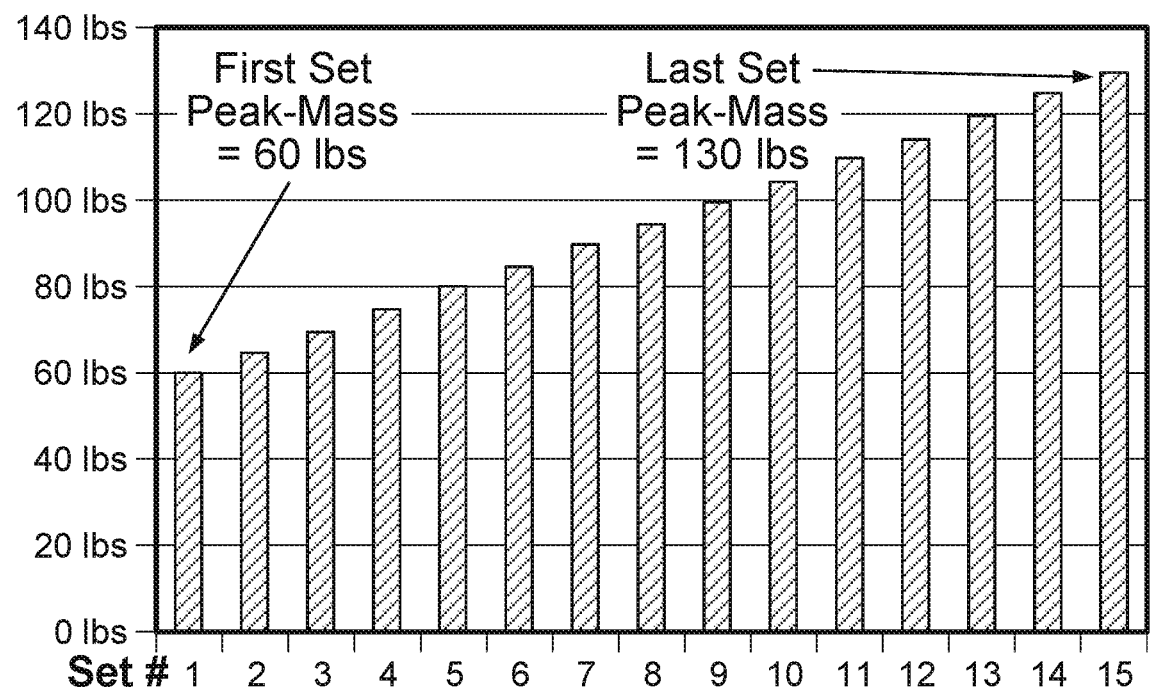
FIG. 18 is an illustration of an escalation service.

Escalation Service. FIG. 18 is an illustration of an escalation service, also sometimes called ladders. For a set of 15 repetitions, while traditionally users may normally perform a set where peak-mass is the same for each repetition, it is useful to change the peak-mass from rep to rep, as shown in FIG. 18. The example in FIG. 18 shows 15 reps, where the first rep starts with a peak-mass of 60 lbs, and each rep increases mass by 5 lbs until a peak-mass for 130 lbs is seen in rep 15. The step size of 5 lb is an example, and a programmed step size need not be fixed and/or linear. The number of reps of 15 is an example, and the programmed rep count need not be fixed and/or linear. This protocol is known as an escalation or ladder protocol, and may be useful for a user in reaching full failure/fatigue, and in building muscle.

Figure 19:
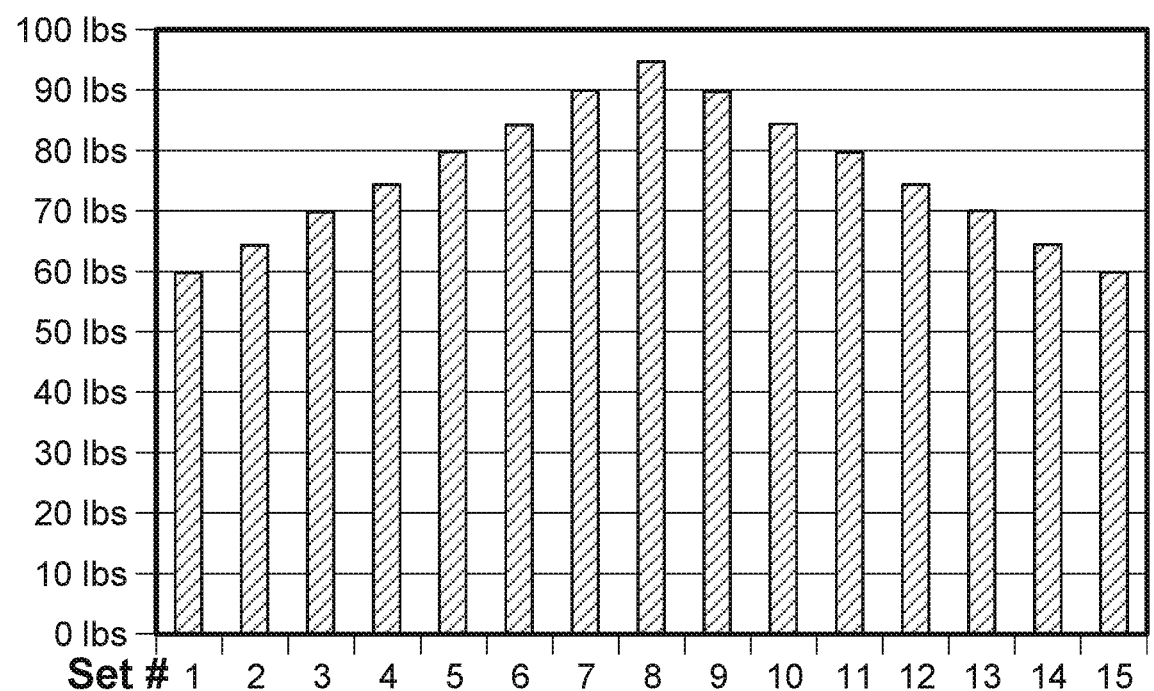
FIG. 19 is an illustration of a pyramid protocol.
Figure 20:
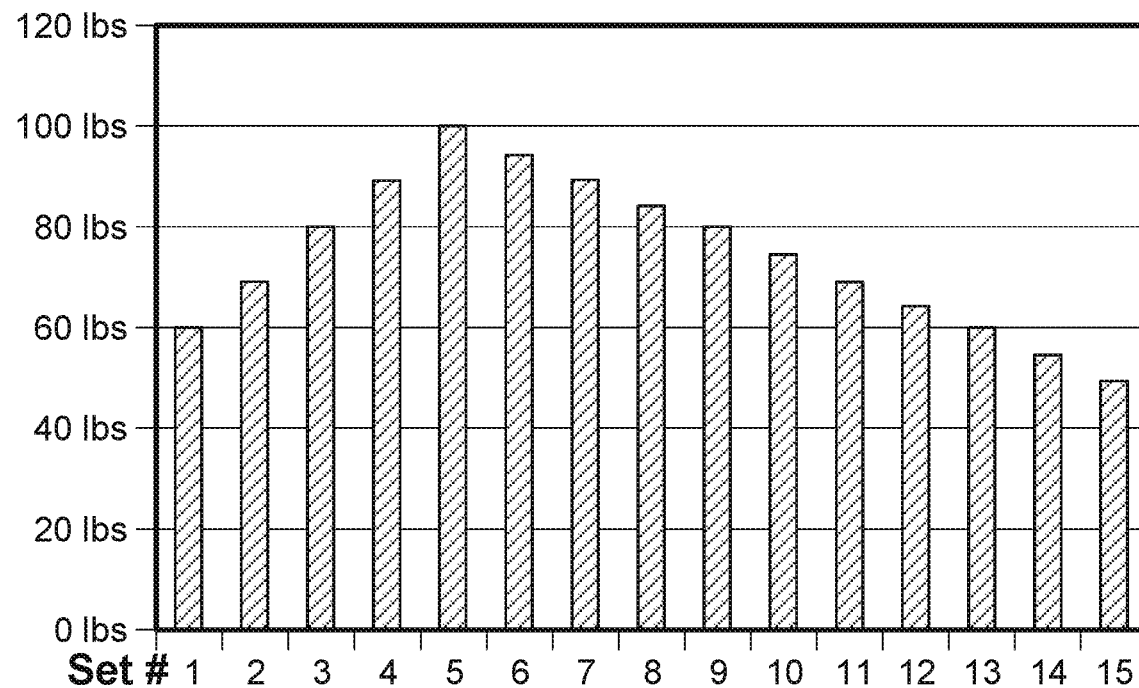
FIG. 20 is an illustration of lopsided pyramid protocol.
Figure 21:
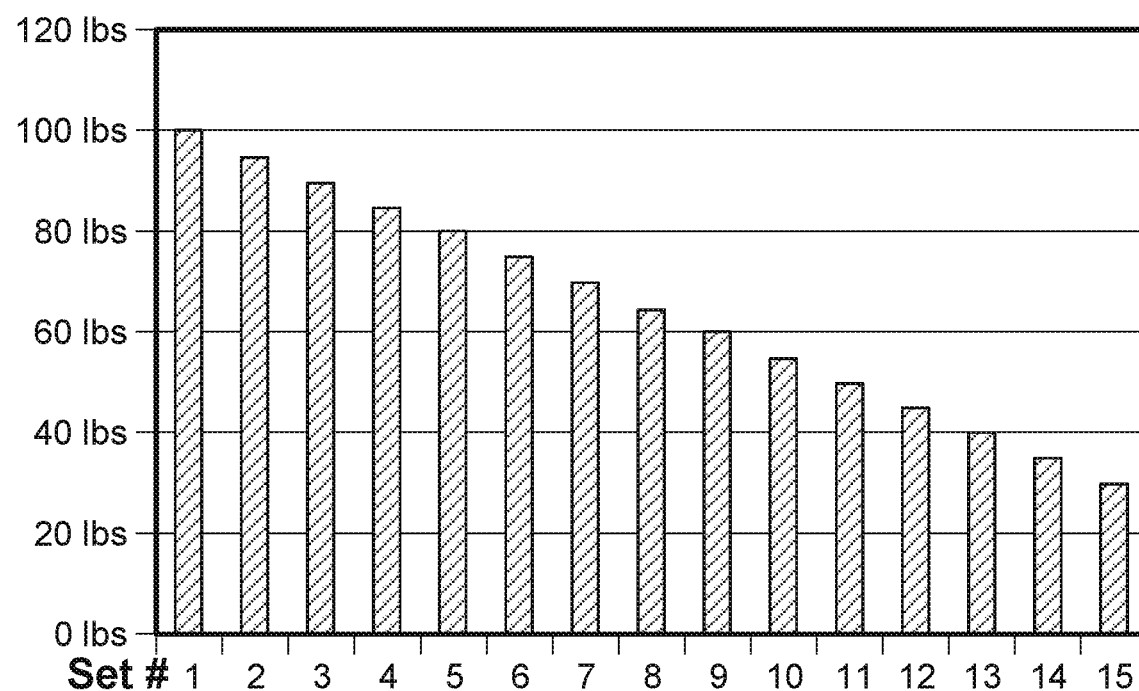
FIG. 21 is an illustration of a drop set protocol.

Other useful protocols also exist. FIG. 19 is an illustration of a pyramid protocol, wherein an escalation protocol is used to get to the middle of the set and then a corresponding de-escalation/drop set protocol is used to from the middle of the set to the end of the set to reduce mass at the depth and rate it was increased during escalation. FIG. 20 is an illustration of lopsided pyramid protocol, wherein an escalation protocol and drop set protocol are used without being necessarily symmetric to the middle of the set. FIG. 21 is an illustration of a drop set protocol, wherein peak-mass is changed downwards from rep to rep. In FIGS. 19-21, mass varies for one or more repetitions in various pre-determined mass functions.

Throughout this specification, "Dynamic Resistance" refers to the technique of using a mass function that varies throughout range of motion, through concentric and eccentric phases, and peak-mass that varies through repetitions in a set, spotting a user, and adjustment of m based on a user's ability or when they get stuck. Dynamic Resistance is enabled by electronic control of tension. In one embodiment, electronic control of tension is performed in part by using an electric motor. Alternatively, electronic control of tension is performed without any electric motor.

BLDC Motor Embodiment. In one embodiment, a BLDC motor (1006) is used as part of a technique for electronic control of tension.

Figure 22:
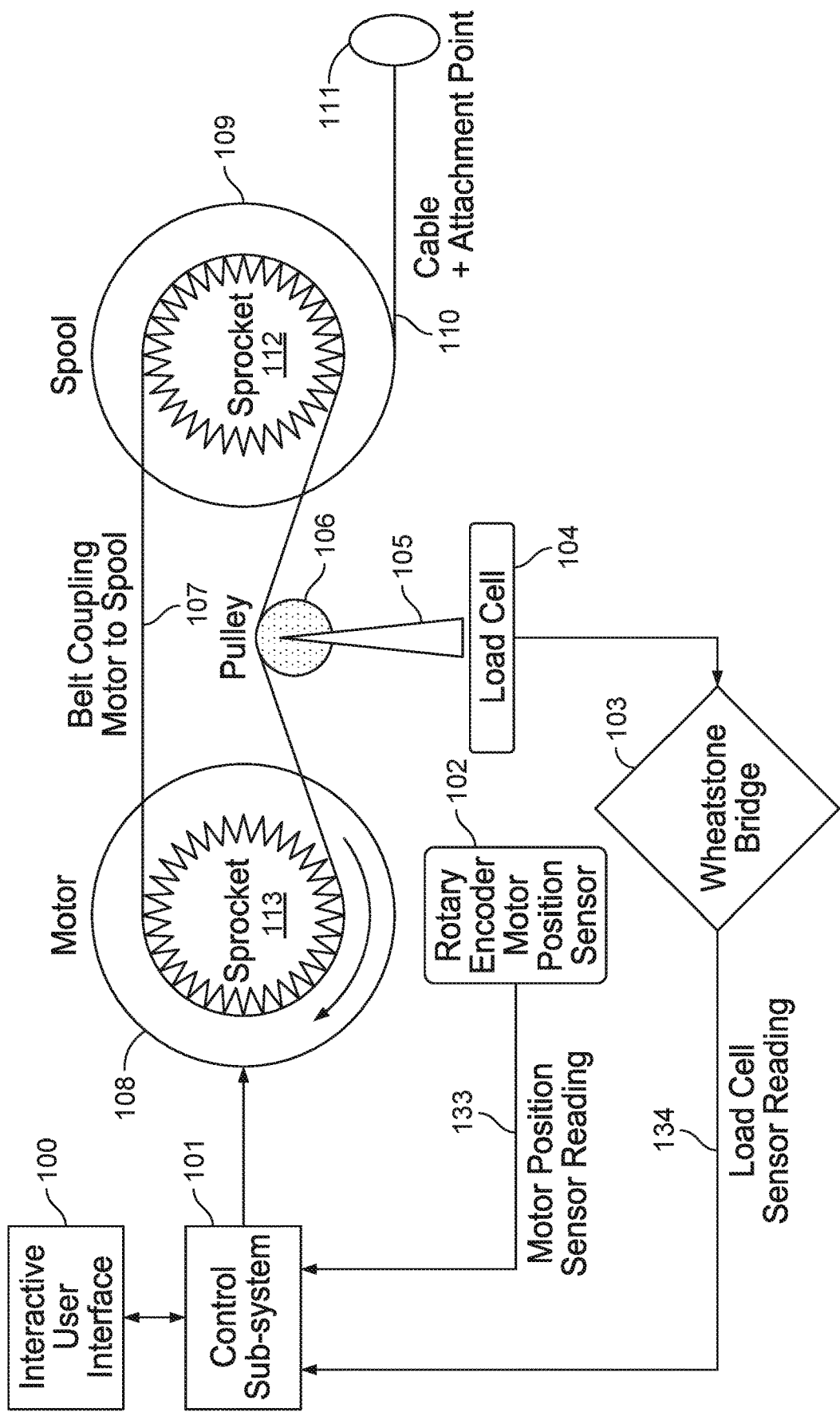
FIG. 22 is a block diagram illustrating an embodiment of a BLDC motor version of a digital strength trainer.

FIG. 22 is a block diagram illustrating an embodiment of a BLDC motor version of a digital strength trainer. As shown in FIG. 22, a primary component under control is the (1006) motor (108), which is a three-phase BLDC permanent magnet motor. In one embodiment, motor (108) is designed to be relatively low speed, and high torque, utilizing an out-runner configuration and 26 poles. Motor (108) is coupled to sprocket (113), which is coupled to spool (109). It is coupled to spool (109) through a belt and sprocket. Spool (109) is coupled to sprocket (112). Sprocket (113) and sprocket (112) are coupled using a tooth and/or timing belt (107). The teeth on the belt prevent slip. The belt is tensioned by running the belt over a pulley (106).

Spool (109) has a (1008) cable (110) wrapped around it. Cable (110) may be a cord made up of at least one of the following: steel, nylon, polyester, and/or kevlar cord. Cable (110) may be a belt, a rope, a chain, or a similar cable. Cable (110) has an attachment point (111) at the end of it. This attachment point is an actuator (1010) that may be either a handle that the user pulls on and/or a connector that a handle or accessory such as a bar, strap, or more complex system may be attached to upon which a user pulls directly or indirectly.

Attachment point (111) is part of an exercise machine, such as a chest press machine or a smith machine; many traditional machines use a cable (1008) to interface to a weight stack. Such a cable (1008) is connected to a (1010) member or handle that the user pushes or pulls on, directly or indirectly through an attachment point.

In one embodiment, pulley (106) is mounted on a load cell (104). As the motor (1006) generates torque, which is translated into force on the belt, that force excites load cell (104). The electrical output of a load cell (104) is connected in a Wheatstone bridge (103) configuration, and the output of the Wheatstone bridge is the reading from the load cell (134). This reading is used to determine the amount of torque being generated by the motor in units of weight.

Load cells are calibrated for an accurate reading, wherein the calibration takes into account belt tension generating a pre-load condition on the load cell. Calibration may be performed by first measuring the load cell sensor reading (134) with no weight on the cable (110)/attachment point (111). This reading may be marked as corresponding to zero "0" lb. The motor is then locked in position and a 20 lb weight hung on the cable (110)/attachment point (111), the load cell sensor reading (134) is taken, and this reading may be marked as corresponding to 20 lbs. By using linear interpolation and extrapolation, all load cell sensor readings may be converted to lb, kg, oz, g, and so forth. The motor is coupled to a rotary encoder motor position sensor (102) that produces a motor position sensor reading (133).

Figure 23:
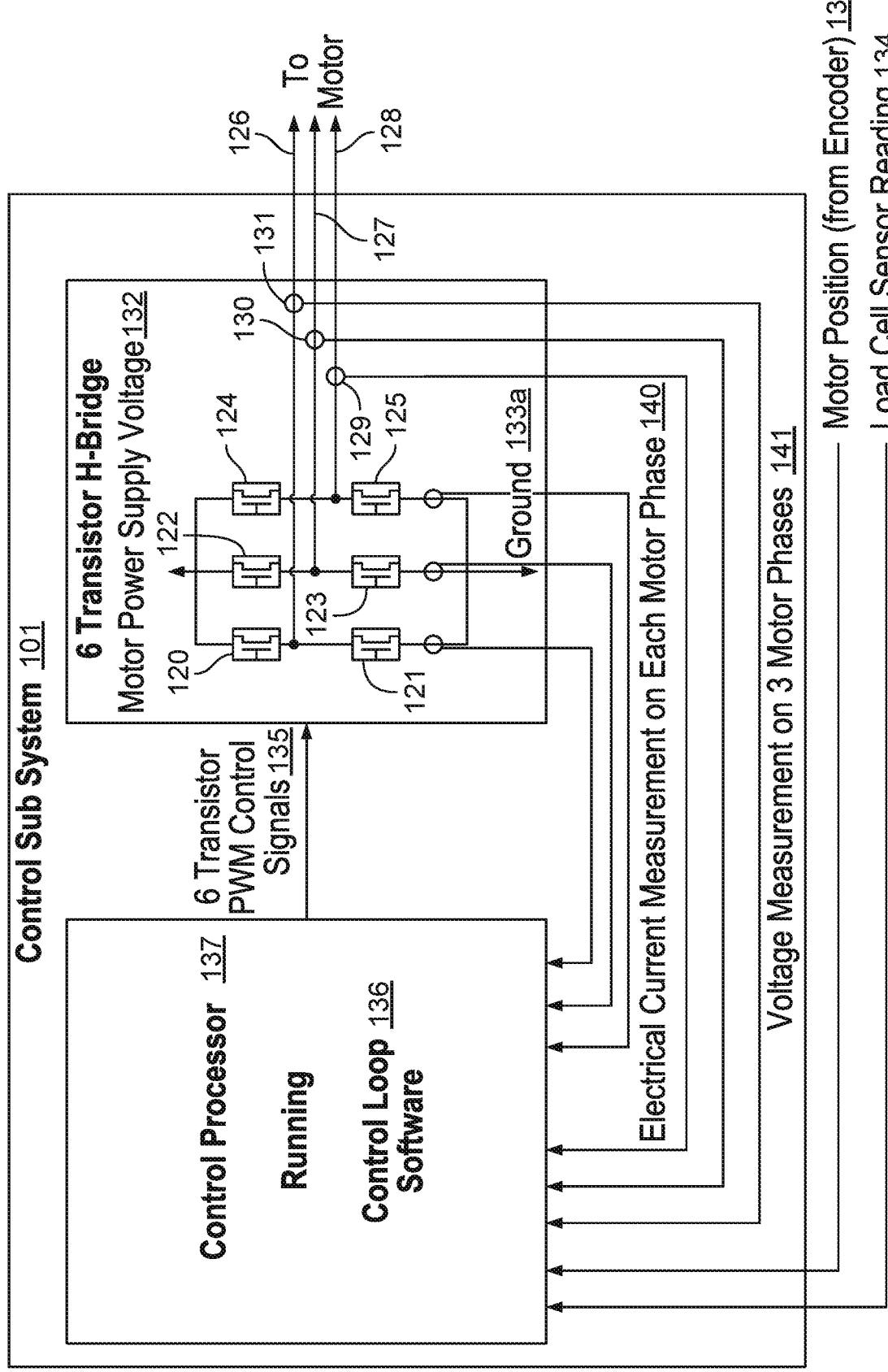
FIG. 23 is a block diagram illustrating an embodiment of a control subsystem for a BLDC motor version of a digital strength trainer.

FIG. 23 is a block diagram illustrating an embodiment of a control subsystem for a BLDC motor version of a digital strength trainer. Motor position sensor reading (133), and load cell sensor reading (134) are input to control subsystem (101). Control subsystem (101) drives motor (108) via the three phase control signals (126), (127), and (128), which are the primary inputs into the motor and source of power.

In one embodiment, motor phase control signals (126), (127), and 128 are driven by a standard six-transistor H-Bridge. The H-Bridge comprises transistors (120), (121), (122), (123), (124), and (125); and draws from between motor power supply voltage (132) and ground (133), and is driven by six transistor PWM control signals (135). In one embodiment, the H-Bridge uses electrical current measurement resistors that drive electrical current measurement (140). This may be accomplished by measuring the voltage drop across the resistor, which is directly proportional to the amount of current flowing through the resistor. Because one side of the resistor is grounded, only the supply side of the resistor connected to the transistor need be measured using an ADC. Note that it is only necessary to measure the current flowing on two of the three legs, since the net current flowing in the system is zero. The third may be calculated from the two that are measured.

The voltage on each of the three motor phases at points (129), (130), and (131) are measured using an ADC. These three motor phase voltages (141) may be used to calculate motor position using a position estimator as any person having ordinary skill in the art may understand.

The six PWM control signals (135) are digital signals driven by a control processor (137), running software to implement a control loop (136). The control processor (137) takes as inputs electrical current measurement on each of the motor phases (140), voltage measurement on each of the motor phases (141), motor position from encoder (133), and load cell sensor reading (134) as inputs. In addition, the processor is coupled to interactive user interface (100).

Figure 24:
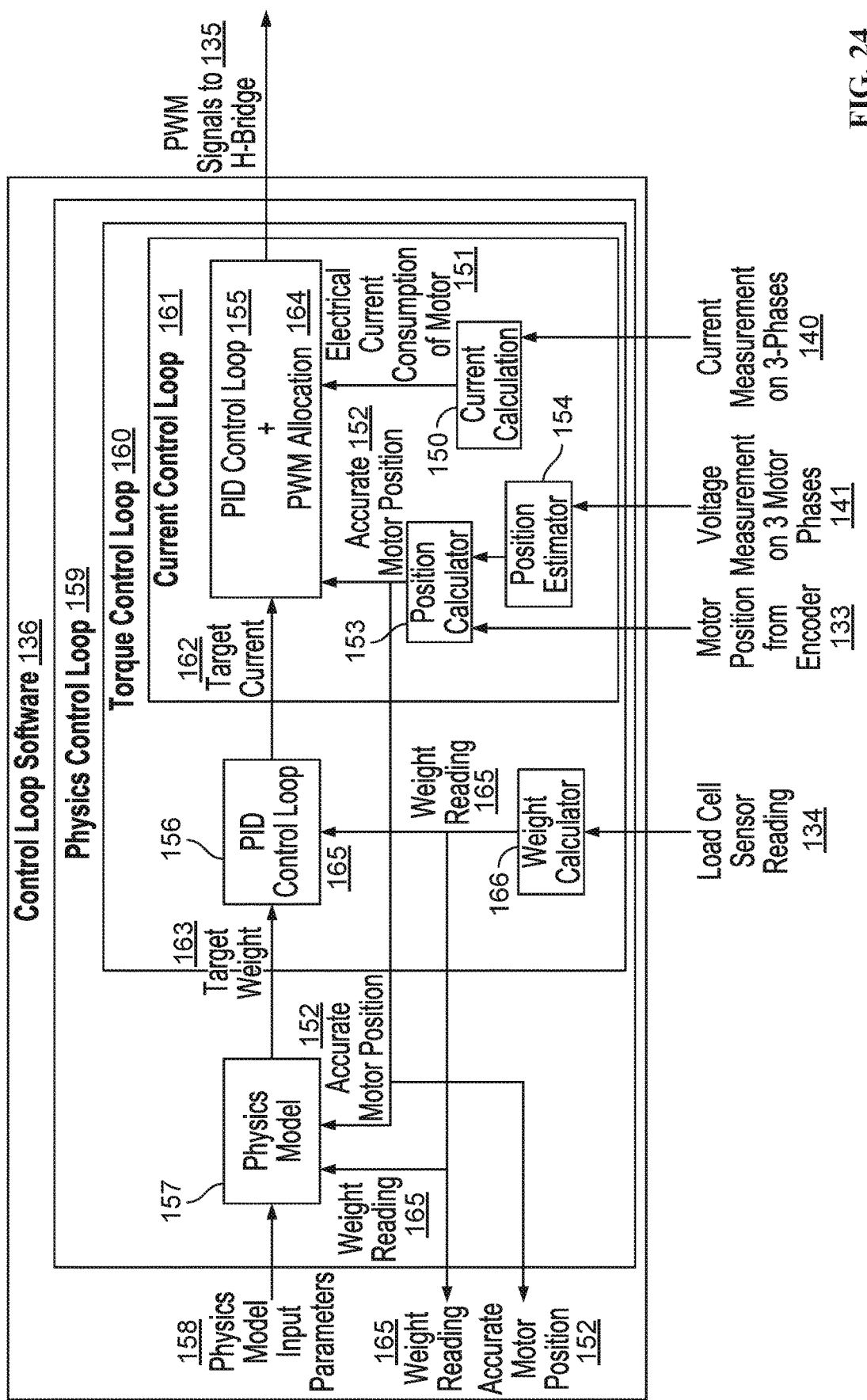
FIG. 24 is a block diagram illustrating an embodiment of a control loop for a BLDC motor version of a digital strength trainer.

FIG. 24 is a block diagram illustrating an embodiment of a control loop for a BLDC motor version of a digital strength trainer. The current measurement (140) is input to a calculation of current (150), to evaluate the current consumption (151) of the motor (1006). Because the net current through the three phases of the motor is zero, the current consumption (151) is associated with the magnitude of the current that flowed through the motor. One or two of the legs may have positive current flow, while the remaining leg(s) may have zero or negative current flows. By summing the total positive current flow, this indicates the amount of current flowing through the motor (151). This amount of current flowing through the motor (151) is directly proportional to the torque output of the motor. If a goal is to drive the motor with constant torque, for example with a Constant Torque filter, an associated objective is to ensure that consumption (151) stays as constant as possible and equal to the amount of current that corresponds to the desired torque. This may be accomplished by utilizing a PID loop that compares measured current (151) to a target current (162), and adjusts the duty cycle of the PWM accordingly.

The technique to driving the three phases of a 3-phase BLDC motor is dependent on the position of the motor (1006). Each physical position of the motor corresponds to an electrical angle that depends on the number of poles that the motor physically is built with. Each electrical angle corresponds to a relationship of voltages between the three phases, in which each phase is driven with a sinusoid such that each of the three phases is phase shifted by 120 degrees relative to the remaining two phases in the set. Determining the electrical angle that the motor must be driven with depends on determining an accurate physical position of the motor (152).

In one embodiment, motor back-EMF may be measured by measuring voltage on the motor phases (141). While the motor is rotating, this back-EMF is generated, and the relative voltage generated on each of the three phases of the motor is directly related to the position of the motor. Any person having ordinary skill in the art may understand determining motor position from voltage measurement. This is a primary function of position estimator (154). A limitation of position estimator (154) is that it does not function unless the motor speed is sufficiently high. For low speeds, a motor position may be determined using an encoder (133) or similar device. A position calculator (153) applies sensor fusion to combine data from motor position (133) and position estimator (154) in order to produce an accurate motor position (152).

Advantages of applying sensor fusion to combine low speed and high speed data to determine motor position comprise: i) it is resilient to encoder slip in the event the encoder is coupled to the motor using a friction based mechanism that may slip; ii) it does not require an encoder to operate at high speeds which may be costly or complex; and iii) it provides a direct correlation between encoder position and motor electrical angle, which otherwise has to be calibrated—and in some cases every time the system is powered up. Motor position (152) may also be used to calculate velocity, and velocity may be used to calculate acceleration.

If a relationship between target torque and target current is known, then a simple lookup table and/or equation may be used to convert between the two. Such a scheme may be susceptible to variation over time and instance from a number of factors including temperature, wear, age, manufacturing variance, and so forth. If the torque output of the motor may be measured directly or indirectly, it is used to establish and/or calibrate for the relationship between target torque and target current (162).

Throughout this specification, the terms target torque (163) and target weight (163) may be used interchangeably because weight and torque are converted directly between one another. In one embodiment, a PID control loop (156) compares target torque (163) to a reading from a load cell sensor (134) and adjusts target current (162) to match. In a further embodiment, because the system is dynamic, the time constants of this PID loop are long.

In one embodiment, as described above in calibration of the load cell sensor, the load cell sensor reading (134) is converted to the same units as target torque (163). This is performed by weight calculator (166) that converts the load cell reading (134) to weight reading (165). Target torque (163) has a direct and linear relationship to a target weight (163) desired in terms of cable tension on the cable (1008), which is directly proportional to the radius of the spool (109) that the cable (110) is wrapped around, and the relative ratio of the radii of the two sprockets (113) and (112).

In some embodiments, a constant torque filter is used and this system is sufficient. Alternatively, the system instead models/mimics the physics of another environment such as a weight lifting machine with a weight stack, and a physics model (157) may adjust target torque (163) to produce the desired behavior. Note that such a physics model affects both output torque and output speed because the two are related. A physics model (157) takes as input motor position (152) and/or weight readings (165), and based on physics model input parameters (158), uses a series of equations in a loop to continuously calculate target torque in order to cause the system to have in a manner that mimics the behavior of the target environment, such as a weight stack filter modeling a weight lifting machine with a weight stack. In one embodiment, the loop runs between 100 Hz and 20 kHz.

The system may include multiple physics models that may be selected and/or combined. Furthermore, the parameters to the physics model may be user accessible. For example, a user may indicate the amount of momentum they wish a weight stack to be allowed to have, or the amount of friction they wish a weight stack to experience.

Physics model input parameters (158) may be static based on user input including "please behave like a 50 lbs weight stack". Physics model input parameters (15) may be dynamic and change over time, such as in the case of implementing Trainer Intelligence, implementing Variable Strength Curves, implementing Dynamic Resistance, and/or implementing a Spotting Protocol. Such Trainer Intelligence and/or Dynamic Resistance may require the monitoring of both motor position (152) and/or weight reading (165). Both position (152) and weight (165) may be used to implement the extracting repetition information and/or range of motion information, or other parameters used in Trainer Intelligence and/or Dynamic Resistance.

Preferably, the control subsystem (101) is coupled to a User Interface (100). The User Interface (100) may have a means of taking user input, such as a touch screen, buttons, dials, or similar, and may have a means of giving user feedback, such as a screen, lights, and/or audible sound generator such as a speaker. Such a user interface may be directly coupled to the system, or indirectly coupled, such as the case of an mobile application on a mobile device such as a phone or tablet, coupled to the embodiment over a wireless and/or wired connection, such as USB, Ethernet, Bluetooth, or Wi-Fi.

Induction Motor Embodiment. Another embodiment besides the BLDC motor embodiment described above is one that utilizes an induction motor rather than a BLDC motor (1006). There are the following notable differences between the BLDC motor and induction motor systems:

Motor (108) is a 3-phase AC induction motor;

There is no need to monitor electrical current (140), or voltage (141) because an induction motor's torque is related to slip rather than current;

Accurate motor position (152) may be determined solely based on position encoder (133);

Target current 162 may be replaced by target slip (162); and/or

A PWM Allocation (164) function generates a three-phase sinusoid with a frequency such that the speed of the motor calculated from position (152) and frequency of said sinusoid corresponds to the amount of desired target slip (162). In some cases the amplitude of the sinusoid may be determined using a volts per hertz relationship.

Thus, the primary variable under control changes from current for BLDC motors to motor slip for induction motors.

Other Embodiments. Aside from the BLDC motor embodiment and induction motor embodiment described above, other embodiments of the disclosed include:

A controller circuit (1002/1004) that includes at least one of the following: a processor, an invertor, and a pulse-width-modulator and/or a Variable Frequency Drive (VFD);

The controller circuit driving a motor (1006) such as three-phase BLDC and/or induction motor;

The motor (1006) being coupled, either directly or via a shaft/belt/chain/gear mechanism, to a spool with a cable (1008) wrapping around the spool, and an actuator/handle (1010) at the end of the cable for the user to grip/pull;

In one embodiment, a gearbox to: multiply torque and/or friction; divide speed; and/or split power to multiple spools, between the motor (1006) and spool. Alternatively, a cable-pulley system may be used instead of a gear box;

One or more of the following sensors:

A position encoder, such as a Hall effect shaft encoder or grey-code encoder on the motor (1006), spool, cable (1008), or in one embodiment an accelerometer in the actuator (1010) a user grips. Other options such as optical sensors and encoders also exist;

A sensor to measure voltage/current being consumed by the motor, for example to measure effects such as back-EMF; and/or A torque/tension/strain sensor or gauge in the system to measure how much tension/force the user is applying. In one embodiment, a tension sensor is built into the cable. Alternatively, a strain gauge is built into the motor mount holding the motor. As the user pulls on the actuator (1010)/cable (1008), this puts strain on the motor mount which is measured using a strain gauge in a Wheatstone bridge configuration. Alternatively, the cable (1008) is pulled through a pulley coupled to a load cell. Alternatively, a belt coupling the motor and spool/gearbox is pulled through a pulley coupled to a load cell. This is termed a "User Tension Sensor" throughout this specification.

Figure 25:
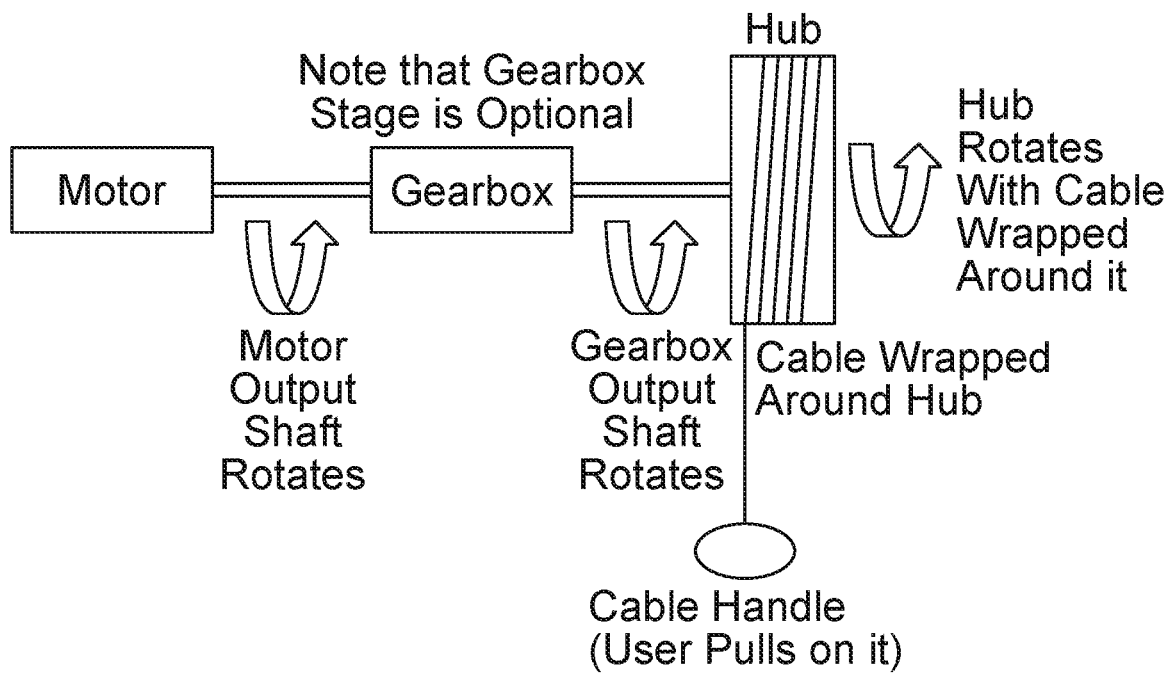
FIG. 25 is an illustration of a motor coupled to a hub.
Figure 26:
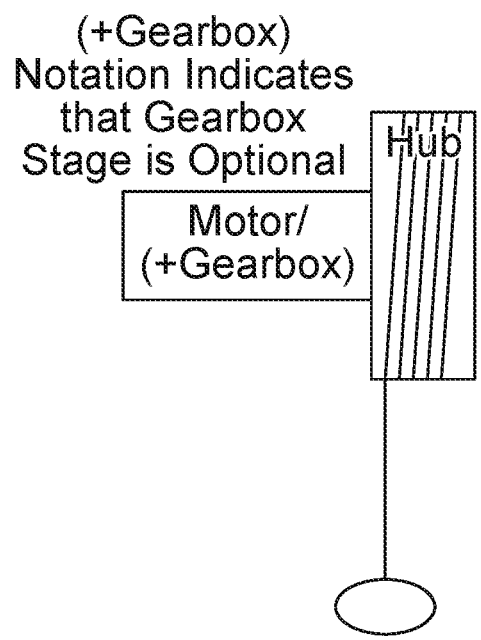
FIG. 26 is a simplified illustration of a motor coupled to a hub.
Figure 27:
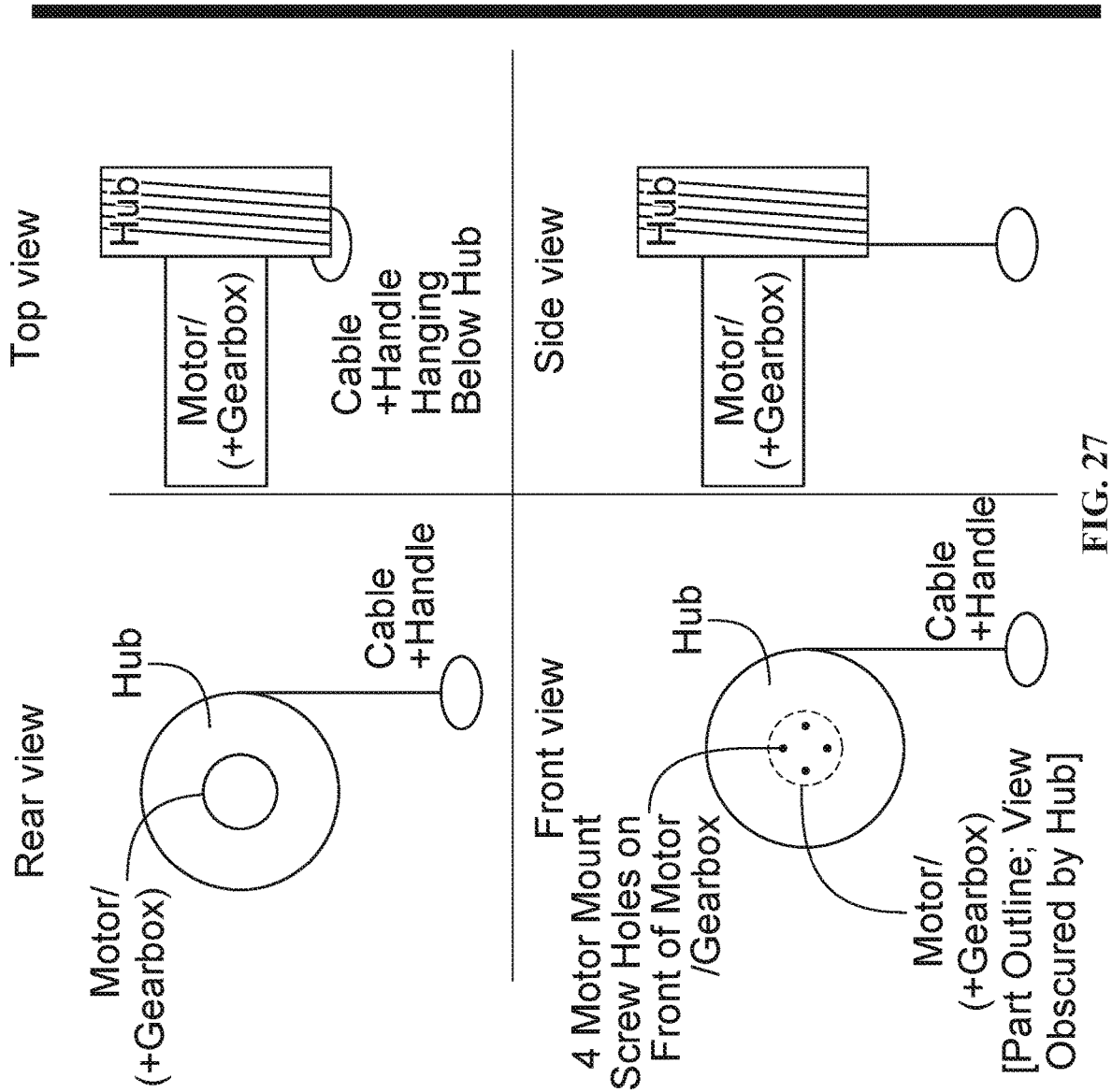
FIG. 27 is a three-dimensional illustration of a motor coupled to a hub.
Figure 28:
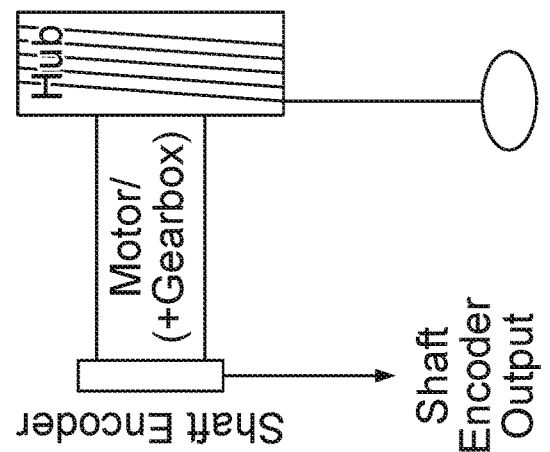
FIG. 28 is an illustration of a motor with a shaft encoder coupled to a hub.

FIG. 25 is an illustration of a motor coupled to a hub. In one embodiment, a motor (1006) is coupled to an optional gearbox coupled to a hub with the cable (1008) wrapped around it. FIG. 26 is a simplified illustration of a motor coupled to a hub. In one embodiment, the simplified illustration of FIG. 26 represents the illustration of FIG. 25. FIG. 27 is a three-dimensional illustration of a motor coupled to a hub. In one embodiment, the three-dimensional illustration of FIG. 27 represents the illustration of FIG. 25. FIG. 28 is an illustration of a motor with a shaft encoder coupled to a hub. The shaft encoder is used to measure the position of the motor/gearbox/hub.

Figure 29A:
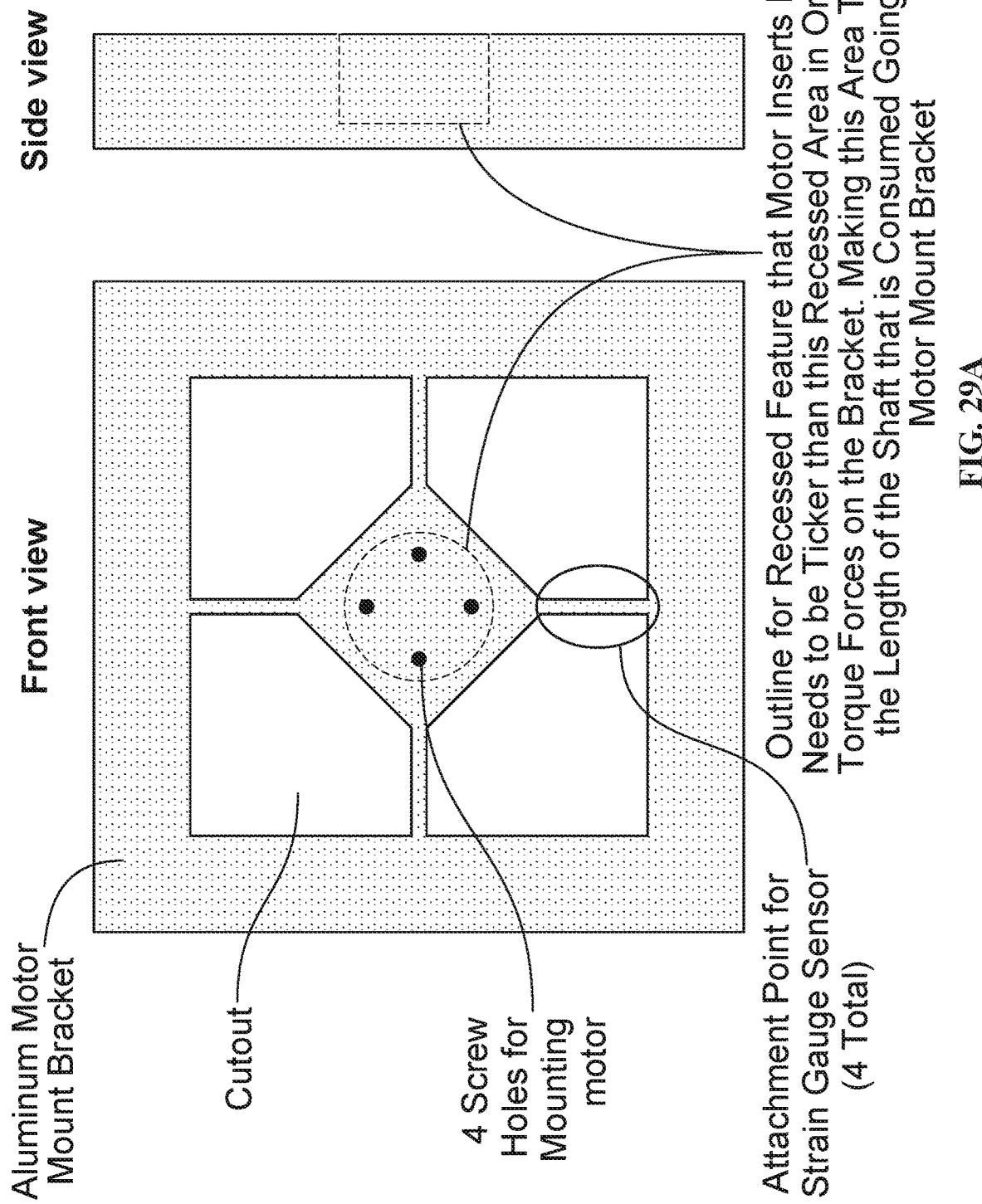
FIG. 29A and FIG. 29B are illustrations of measuring tension using a motor mount
Figure 29B:
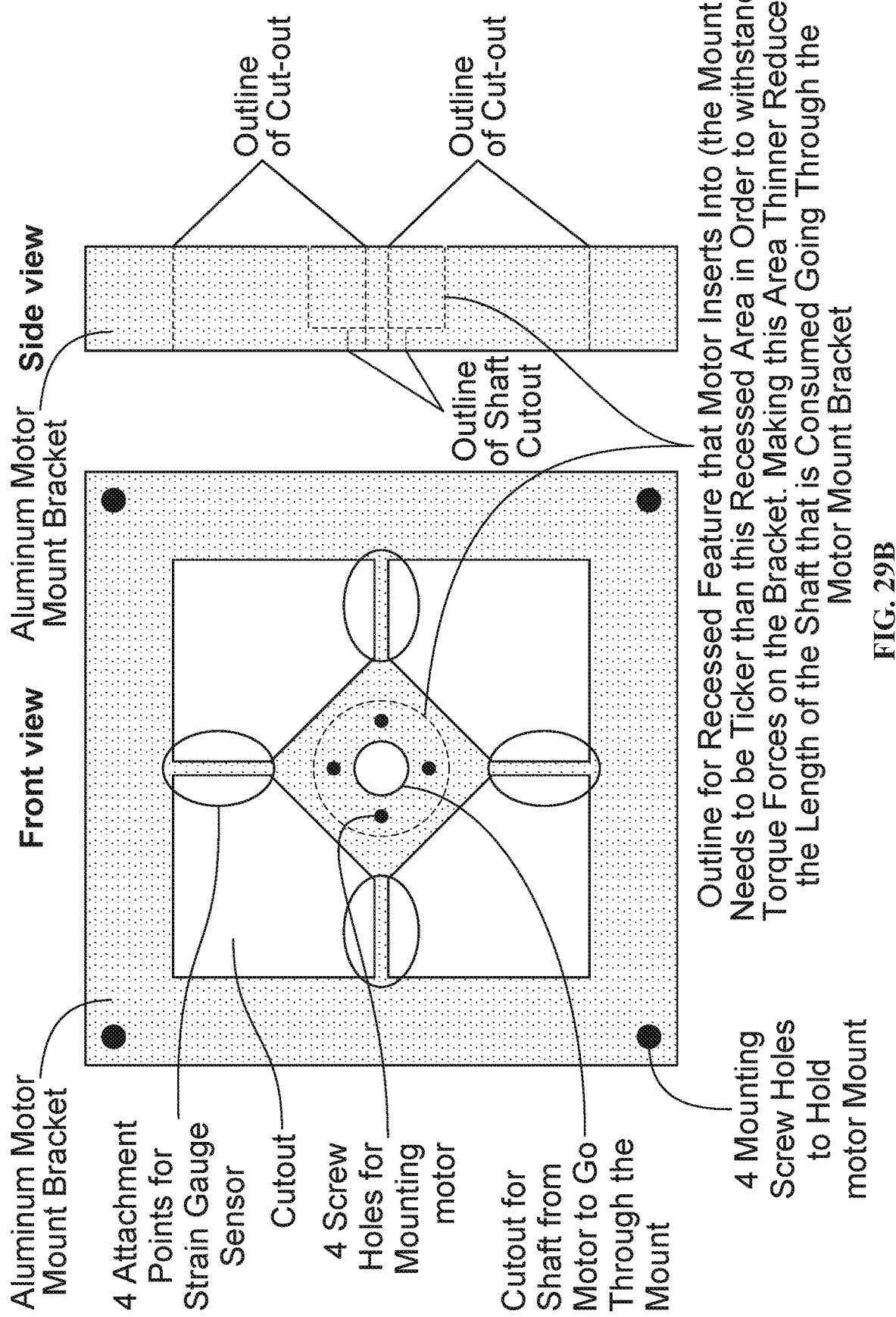

FIG. 29A and FIG. 29B are illustrations of measuring tension using a motor mount. In one embodiment, a strain gauge is attached to one or more attachment points. When force is applied to the motor mount because a user is pulling on the cable, and the motor resists, and translates that force into the screw holes holding the motor onto the motor mount bracket, the rods at the attachment points flex.

Figure 30:
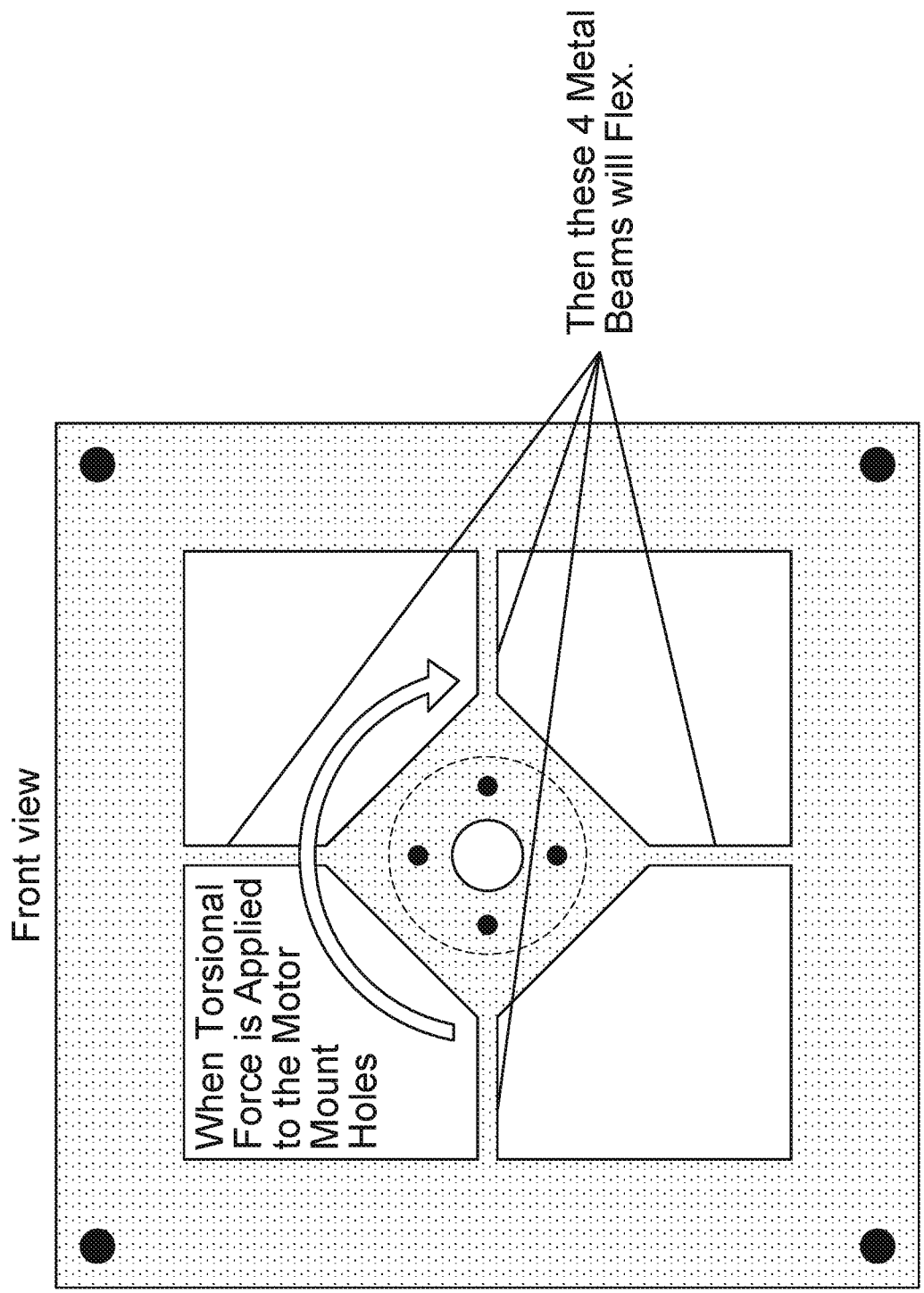
FIG. 30 is an illustration detail of the attachment point rods.

FIG. 30 is an illustration detail of the attachment point rods. As a rod at an attachment point flexes, the associated strain gauge also flex, causing its resistance to change. This change in resistance may be measured using a Wheatstone bridge circuit input to an ADC. The output of the ADC may be calibrated to various weights, which is accomplished by hanging weights on the cable against gravity, and reading the ADC output. The results of multiple weights may be plotted, and intermediate points may be interpolated. As strain gauges are typically linear, interpolation may be simple.

Figure 31:
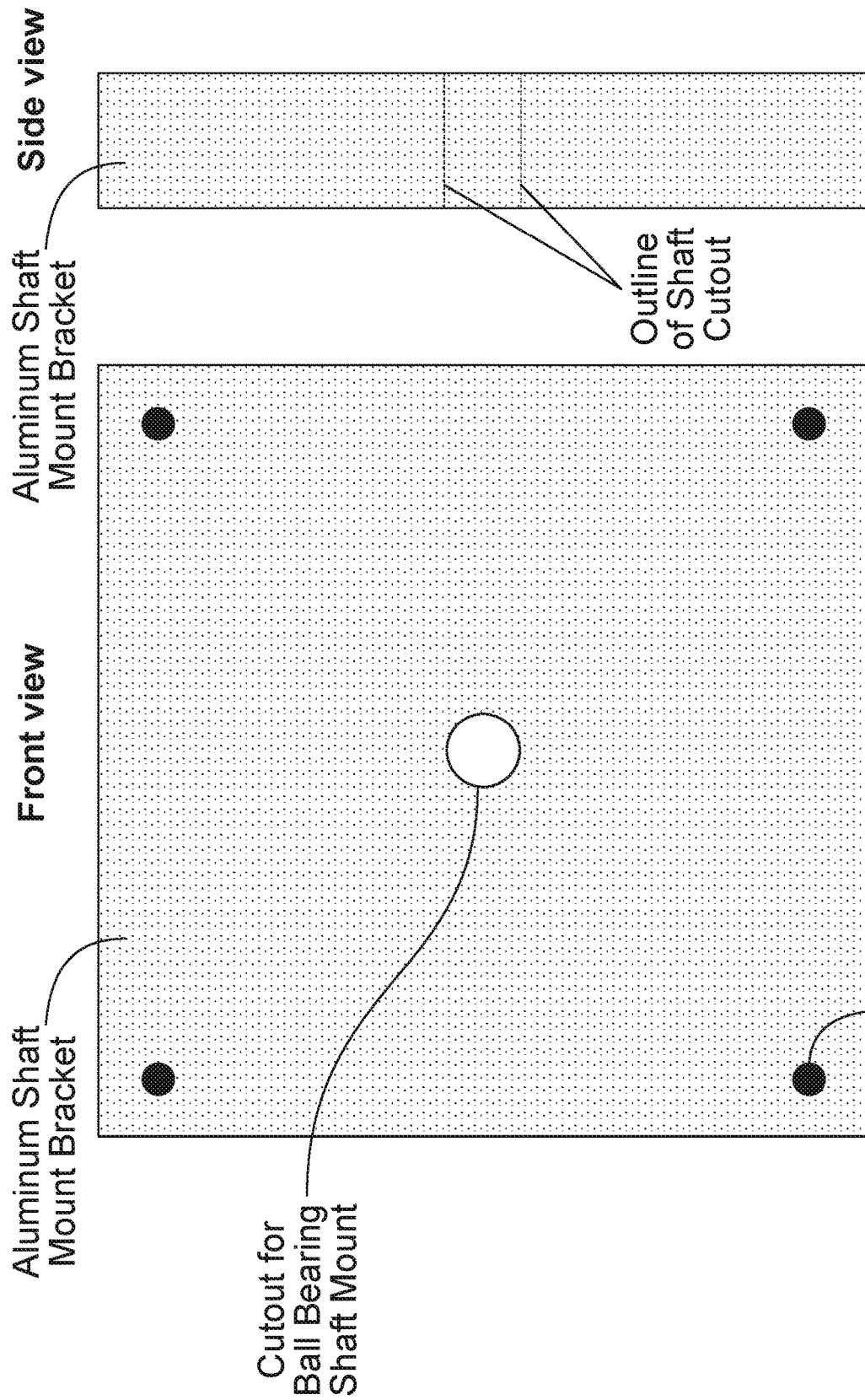
FIG. 31 is an illustration detail of a motor mount.
Figure 33:
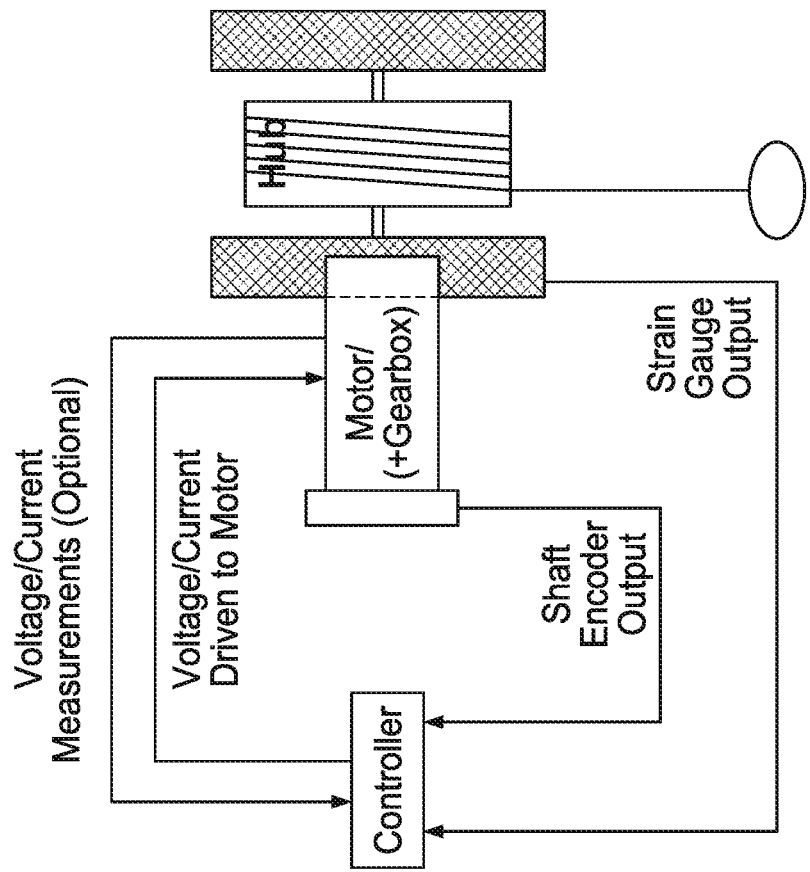
FIG. 33 is an illustration of a control system for a motor controlled by a hub.
Figure 32:
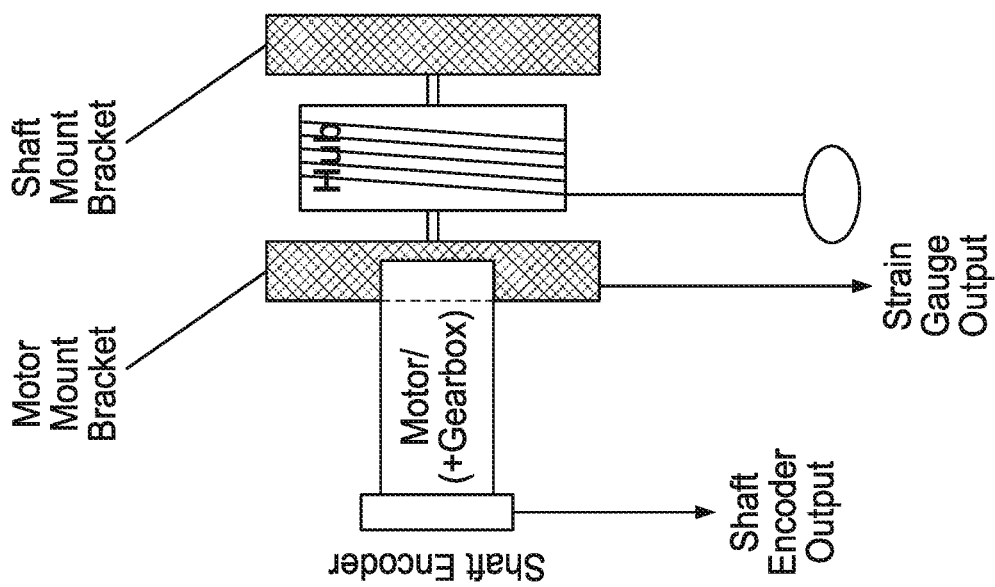
FIG. 32 is an illustration of a fully assembled motor mount, motor, optional gearbox, and shaft encoder.

FIG. 31 is an illustration detail of a motor mount. In one embodiment, to support the shaft of the motor (1006) including to prevent forces on the cable (1008) from causing the motor to torque in planes perpendicular to the rotation of the motor, a shaft mount with a ball bearing holding the shaft may be used as shown in FIG. 31. FIG. 32 is an illustration of a fully assembled motor mount, motor, optional gearbox, and shaft encoder. In one embodiment, the illustration of FIG. 32 is a fully assembled version of that shown in FIGS. 25-30. FIG. 33 is an illustration of a control system for a motor controlled by a hub. In one embodiment, the illustration of FIG. 33 is the control system for the system of FIG. 32.

In one embodiment, a controller programed/configured/designed to emulate a gravity-and-metal based cable machine is used, and so a Weight Stack Filter is used. In one embodiment, a controller uses a microprocessor such as a MIPS or 8051 based micro-controller running instructions/code to implement a control system. Every interval, such as every five milliseconds corresponding to 200 times per second, the system may:

1. Measure tension T and the velocity at which the cable is moving, $v_{actual}$;
2. The system may then model acceleration based on the state of the system:

$$a_{model} = \left(\frac{T}{m} - 1\right) \cdot g \cdot r$$

$$v_{model_n} = v_{model_{n-1}} - a_{model} \cdot \Delta t$$

where $\Delta t$ is the interval of time since velocity was last calculated. That is, five milliseconds ago wherein the velocity calculated at that time is referred to as $v_{model_{n-1}}$. Acceleration in the equation above is subtractive rather than additive to adopt the convention that $v_{model}$ represents velocity towards the ground.

With velocity modeled, it is compared to actual velocity measured:

$$v_{error} = v_{actual} - v_{model}$$

wherein $v_{error}$ may be used by the controller to modify the amount of voltage/current being driven into the motor.

The virtual weight stack may move in two directions. It may move away from the ground or towards the ground. The notion of the weight stack is one modeled in equations, as there is no physical weight stack. The physical embodiment is a cable (1008) wrapped around the shaft of a motor (1006), possibly coupled with a hub. So, a weight moving may be translated into a motor rotating. As the circumference of the hub is known, and how fast the motor (1006) is rotating is known, the linear motion of the cable (1008) may be calculated, which is equivalent to the linear motion of a weight stack. Each rotation of the hub equals a linear motion of one circumference or $2\pi r$ for hub radius r. Similarly, torque of the motor may be translated into linear force by multiplying it by radius r.

A convention of established such that if the "weight stack" is moving away from the ground, the motor is rotating in one direction, and if moving towards the ground the motor is rotating in the opposite direction. Thus, the system is nearly always applying voltage/current/power to motor (1006) so that it rotates or nearly rotates in the direction corresponding to a weight stack affected by gravity.

In one case, the tension on the cable is so high, that the calculated acceleration is in the direction away from the ground, and hence that acceleration over a period of time accumulates into a velocity that corresponds with the weight stack moving away from the ground. When that occurs, the power applied to the motor is in the direction of driving the weight stack towards the ground, but the force of the user pulling on the cable overcomes the force of the motor causing it to rotate in the opposite direction. In such a case, if the motor is rotating faster than the model dictates, in order to slow it down, the controller has to increase the power to the motor so that it resists the user more heavily.

In the opposite case, when the weight stack is moving towards the ground, and the motor is rotating in the direction corresponding the weight stack moving towards the ground, if the motor rotates too fast compared to the model, then to slow the motor down, the controller (1002) has to reduce the power to the motor (1006). Therefore, the controller not only accounts for the error in velocity, but also the direction of that velocity.

The voltage being driven into the motor is adjusted as follows:

$$V_{new} = V_{old} - c_1 \cdot v_{error}$$

wherein $c_1$ is a constant that represents how aggressively the voltage is adjusted in response to an error. Larger values result in overshoot, ringing, and instability. Lower values result in slow convergence.

Changing if voltage is increased or decreased depending on the direction of travel is automatically handled because the sign of $v_{error}$ may reverse when the velocity reverses, since in one case positive velocity is one direction and the other direction is negative velocity. In one embodiment, $c_1$ is not a static constant but adjusted depending at least in part on the direction of travel:

$$c_1 = \begin{cases} c_2 & \text{if } v_{actual} < v_2 \\ c_2 + (c_3 - c_2)\left(\frac{v_{actual} - v_2}{v_3 - v_2}\right) & \text{if } v_{actual} \geq v_2 \text{ and } v_{actual} \leq v_3 \\ c_3 & \text{if } v_{actual} > v_3 \end{cases}$$

wherein $c_2$ is a more suitable constant when the velocity is negative/moving away from the ground, and moving at a negative rate greater in magnitude than $v_2$;
wherein $c_3$ is a more suitable constant when the velocity is positive/moving towards the ground, and moving at a positive rate greater in magnitude than $v_3$.
As shown in the equation, at outer bounds the ideal constants are selected, and a linear function is used between the outer bounds to select the correct constant.

In general, for the disclosed techniques any transfer function may be selected, and a transfer function need not necessarily be linear. As shown in the example above, the system is flexible to accept $v_{actual}$ and/or $v_{model}$. The system is flexible to accept designs with static constants or dynamic factors like the aggressive $c_1$ and accept different designs with different design consequences. In one embodiment, a linear control loop is used for control. Alternatively, a PID control loop is used for more sophisticated control.

A weight stack may be modeled in the case when the virtual weight stack reaches the "ground". At this point, velocity is zero. A control system may thus monitor position at all times, and stops the rotation of the motor when the position reaches zero and/or ground position. Similarly, the starting case is that a weight stack does not move until the tension on the cable exceeds the weight of the stack. Thus, the system may measure tension and using that result to decide when to release the motor and allow it to start rotating. The motor may not be released until tension exceeds the weight of the weight stack. There are numerous ways to brake a motor and/or hold it in position, including controlling voltage into the motor to resist any force trying to move that motor, using the equations above wherein $v_{model}=0$. Braking a motor may also be used in an emergency and/or safety situation wherein the system senses a loss of control. In one embodiment, the controller (1004) provides a 'motor firewall' for a user to protect the user with braking using failsafe switches and techniques. This provides a measure of safety for the user.

Any person having ordinary skill in the art of control system design and theory may use tradeoffs to fine tune the system to achieve the desired result. This fine tuning may depend on factors including the characteristics of the exact motor being used, the gearbox if any, and/or the elasticity of the cable.

Applying manual power to a motor (1006) in order to slow it down and/or resisting rotation in the opposite direction that power is being applied may result in the motor generating power in the form of output voltage/current in excess of the voltage/current applied to the motor. Using a transistor as a switch and a capacitor to store this excess power, and then later using that power to drive the motor may result in a system that utilizes less power and generates less waste/heat.

In some embodiments, a motor is controlled in the manner described above such that a user pulling on a cable (1008) wrapped around a hub coupled to that motor (1006), possibly through a gearbox and with one or more sensors on that motor, may experience a tension equivalent to that of a weight stack. In one embodiment, a modified model is used as a "no cheat" or "true no cheat" model as described above.

With regards to motors, currently DC brush motors are least reliable. Permanent magnet motors such as DC brush and brushless motors also suffer drawbacks currently of being more expensive and risk demagnetization of the magnets over time. They may currently also have less torque requiring a gearbox. Higher ratio gearboxes currently may have more friction, making them harder to control. Stepper motors currently are loud and may be expensive. Series elastic actuators currently reduce the reliability of the system and add expense.

One simple and reliable preferred system uses an AC motor, such as a three-phase induction motor, with a motor powerful enough to not require a gearbox. Sizing the hub changes the amount of torque required to achieve a given amount of force, as the greater the radius of the hub, the more torque required. Systems with BLDC or stepper motors may be advantageous due to cost, performance, and/or availability.

Models discussed above rely on a variable m or some proxy for m, such as air pressure in a pneumatic system, voltage/current in an electro-magnetic-mechanical system, and so forth, which represents the mass of the weight stack. Some equations described above assume that m was a static variable that does not change, but the disclosed techniques may without limitation use protocols where m is not fixed. The mass variable m may change continuously causing the user to experience a weight stack that changes weight. In resistance training, a standard weight lifting setup is based on static resistance—one where the mass of the weight is constant. However, by changing m, we achieve dynamic resistance—one where the effective mass changes based on a number of factors. This has numerous health and efficiency benefits for the user.

Figure 34:
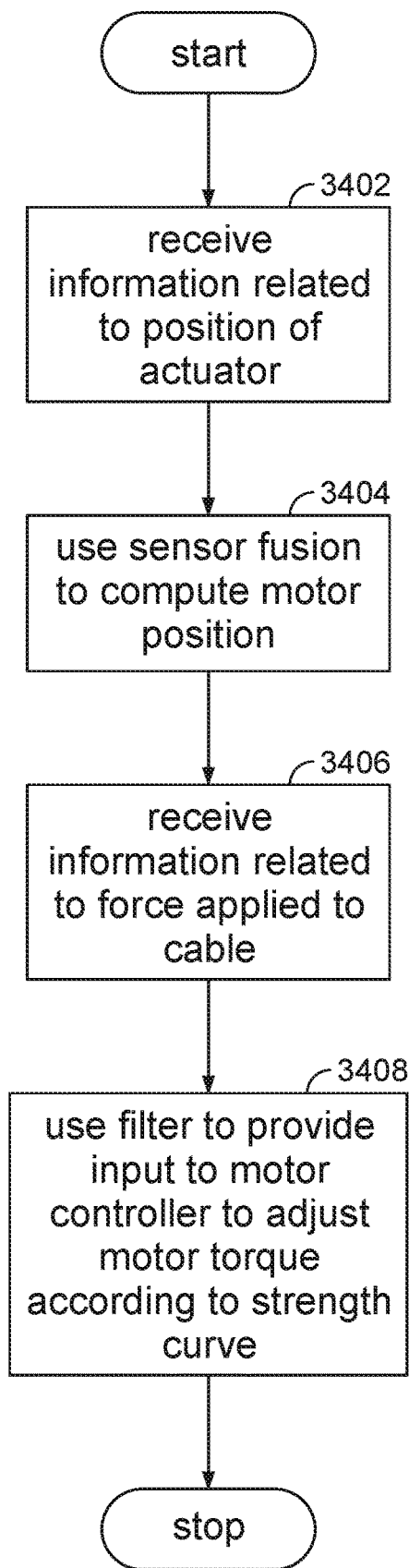
FIG. 34 is a flow chart illustrating an embodiment of a process for digital strength training.

FIG. 34 is a flow chart illustrating an embodiment of a process for digital strength training. In one embodiment: the system of FIG. 1A and/or FIGS. 22-24 carry out the process of FIG. 34; the filter (1002) and/or motor controller (1004) of FIG. 1A carry out the process of FIG. 34; and the control processor (137) and control loop software (136) of FIG. 25 carry out the process of FIG. 34.

In step 3402, an information related to the position of an actuator (1010) coupled to a cable (1008) which is coupled to a motor (1006) is received. In one embodiment, the actuator (1010) is a handle. In one embodiment, the motor (1006) is a three-phase motor, for example an AC induction motor. In one embodiment, the information related to the position of the cable includes a plurality of points in time to derive velocity of the cable.

In step 3404, a filter (1002) computes motor position based on sensor fusion comprising a high speed sensor to determine motor position at high speed and a low speed sensor to determine motor position at low speed. In one embodiment, the filter (1002) computes motor position based on sensor fusion comprising a magnet sensor to determine motor position based on magnetism and an optical sensor to determine motor position based on optics.

In an optional step 3406, the filter receives a second information related to the force applied on the cable. Force applied to the cable coupled with actuator position enhances information on the user to calculate momentum and so forth.

In step 3408, an input to a motor controller (1004) coupled to the motor (1006) is provided by using the filter (1002), to adjust torque on the motor (1006) such that a strength curve is implemented relative to the position of the actuator (1010). In one embodiment, the filter (1002) is a digital filter.

As described above, the strength curve may be a constant torque filter to drive the actuator (1010) with a constant torque. The strength curve may be a weight stack filter, mirroring to the actuator (1010) behavior of a weight machine with a weight stack. In one embodiment, the weight stack filter mirrors to the actuator (1010) behavior of a weight machine with a weight stack with at least ten pounds of accuracy. In one embodiment, the weight stack filter mirrors to the actuator (1010) behavior of a weight machine with a weight stack with at least five pounds of accuracy. In one embodiment, the weight stack filter mirrors to the actuator (1010) behavior of a weight machine with a weight stack with at least three pounds of accuracy. In one embodiment, the weight stack filter mirrors to the actuator (1010) behavior of a weight machine with a weight stack with at least one pound of accuracy.

The strength curve may be a momentum free weight stack filter, mirroring to the actuator (1010) behavior of a weight machine with a weight stack without momentum. For a momentum free weight stack filter, the filter may calculate an actuator momentum of the actuator (1010) and compensate for the actuator momentum and/or calculate an actuator friction being applied to the actuator and compensate for the actuator friction being applied. In one embodiment, the calculation of the actuator friction comprises a percentage of the mirrored weight stack weight.

In one embodiment, the strength curve includes an asymmetry, providing eccentric loading service to the actuator (1010). In a further embodiment, the strength curve includes a dynamic Spotter Protocol, providing a weight spotter service to a user using the actuator (1010). In a further embodiment, the strength curve includes a Trainer Intelligence protocol, for example a dynamic repetition protocol, including: a pyramid service, an escalation service, and/or a drop service. In a further embodiment, the strength curve comprises a dynamic nonlinear strength curve that changes over time.

Figure 35:
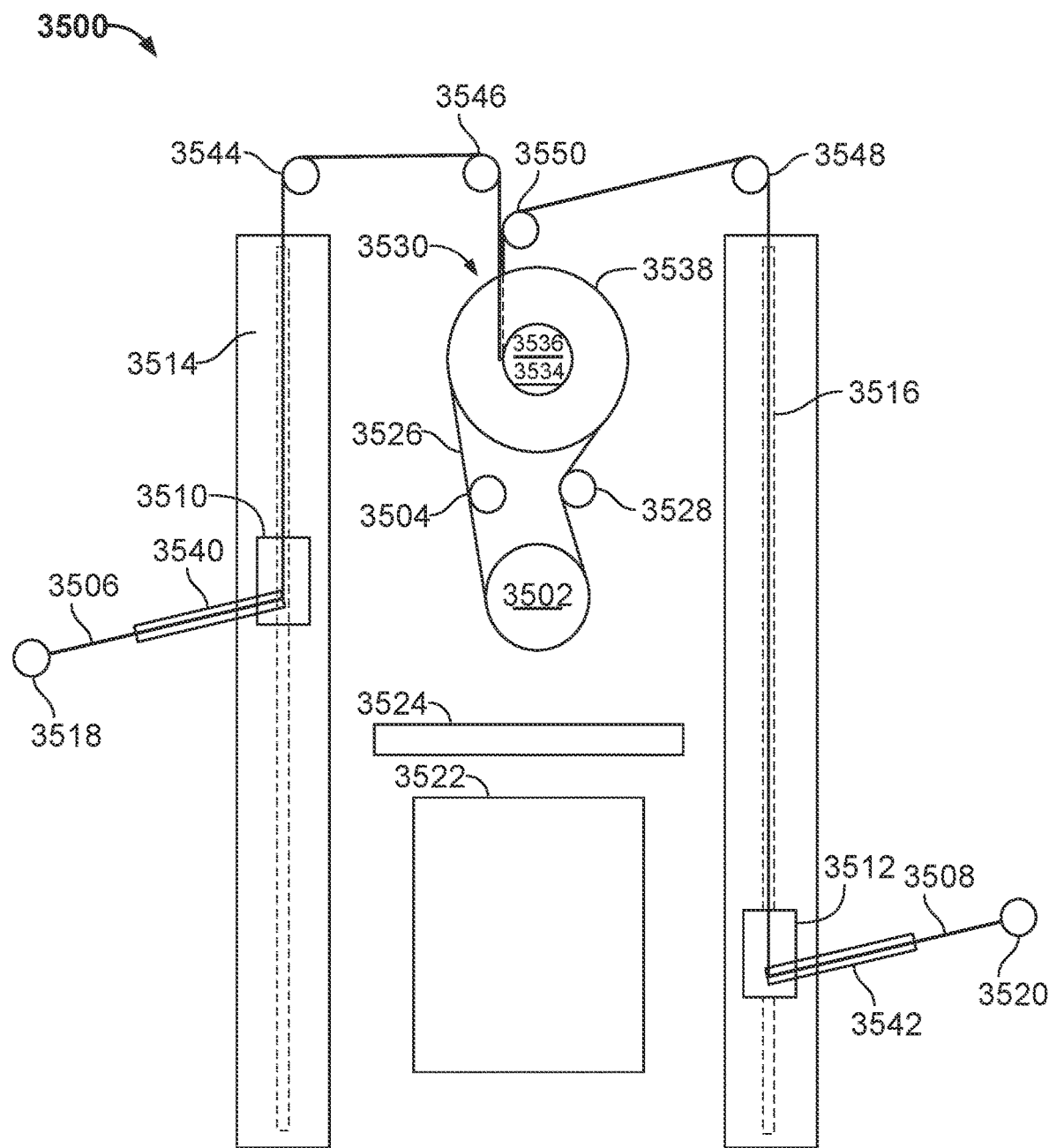
FIG. 35 illustrates a front view of one embodiment of an exercise machine.

FIG. 35 illustrates a front view of one embodiment of an exercise machine. In some embodiments, exercise machine 3500 of FIG. 35 is an example or alternate view of the exercise machine of FIG. 1A. In this example, exercise machine (3500) includes a pancake motor (3502), a torque controller coupled to the pancake motor, and a high resolution encoder coupled to the pancake motor (3504). As used herein, a "high resolution" encoder refers to an encoder with 30 degrees or greater of electrical angle. In this example, two cables (3506) and (3508) are coupled respectively to actuators (3518) and (3520) on one end of the cables. The two cables (3506) and (3508) are coupled directly or indirectly on the opposite end to the motor (3502). While an induction motor may be used for motor (3502), a BLDC motor may also be used for its cost, size, weight, and performance. In some embodiments, a high resolution encoder assists the system to determine the position of the BLDC motor to control torque. While an example involving a single motor is shown, the exercise machine may include other configurations of motors, such as dual motors, with each cable coupled to a respective motor.

Sliders (3510) and (3512) may be respectively used to guide the cable (3506) and (3508) respectively along rails (3514) and (3516). The exercise machine in FIG. 35 translates motor torque into cable tension. As a user pulls on actuators (3518) and/or (3520), the machine creates/maintains tension on cable (3506) and/or (3508). The actuators (3518, 3520) and/or cables (3506, 3508) may be actuated in tandem or independently of one another.

In one embodiment, electronics bay (3522) is included and has the necessary electronics to drive the system. In one embodiment, fan tray (3524) is included and has fans that cool the electronics bay (3522) and/or motor (3502).

Motor (3502) is coupled by belt (3526) to an encoder (3504), an optional belt tensioner (3528), and a spool assembly (3530). In one embodiment, motor (3502) is an out-runner, such that the shaft is fixed and the motor body rotates around that shaft. In one embodiment, motor (3502) generates torque in the counter-clockwise direction facing the machine, as in the example in FIG. 35. Motor (3502) has teeth compatible with the belt integrated into the body of the motor along the outer circumference. Referencing an orientation viewing the front of the system, the left side of the belt (3526) is under tension, while the right side of the belt is slack. The belt tensioner (3528) takes up any slack in the belt. An optical rotary encoder (3504) coupled to the tensioned side of the belt (3526) captures all motor movement, with significant accuracy because of the belt tension. In one embodiment, the optical rotary encoder (3504) is a high resolution encoder. In one embodiment, a toothed belt (3526) is used to reduce belt slip. The spools rotate counter-clockwise as they are spooling cable/taking cable in, and clockwise as they are unspooling/releasing cable out.

Spool assembly (3530) comprises a front spool (3534), rear spool (3536), and belt sprocket (3538). The spool assembly (3530) couples the belt (3526) to the belt sprocket (3538), and couples the two cables (3506) and (3508) respectively with spools (3536) and (3534). Each of these components is part of a low profile design. In one embodiment, a dual motor configuration not shown in FIG. 35 is used to drive each cable (3506) and (3508). In the example shown in FIG. 35, a single motor (3502) is used as a single source of tension, with a plurality of gears configured as a differential are used to allow the two cables/actuators to be operated independently or in tandem. In one embodiment, spools (3536) and (3534) are directly adjacent to sprocket (3538), thereby minimizing the profile of the machine in FIG. 35.

As shown in FIG. 35, two arms (3540, 3542), two cables (3506, 3508) and two spools (3536, 3534) are useful for users with two hands, and the principles disclosed without limitation may be extended to three, four, or more arms (3540) for quadrupeds and/or group exercise. In one embodiment, the plurality of cables (3506, 3508) and spools (3536, 3534) are driven by one sprocket (3538), one belt (3526), and one motor (3502), and so the machine (3500) combines the pairs of devices associated with each user hand into a single device. In other embodiments, each arm is associated with its own motor and spool.

In one embodiment, motor (3502) provides constant tension on cables (3506) and (3508) despite the fact that each of cables (3506) and (3508) may move at different speeds. For example, some physical exercises may require use of only one cable at a time. For another example, a user may be stronger on one side of their body than another side, causing differential speed of movement between cables (3506) and (3508). In one embodiment, a device combining dual cables (3506) and (3508) for a single belt (3526) and sprocket (3528) retains a low profile, in order to maintain the compact nature of the machine, which can be mounted on a wall.

In one embodiment, pancake style motor(s) (3502), sprocket(s) (3538), and spools (3536, 3534) are manufactured and arranged in such a way that they physically fit together within the same space, thereby maximizing functionality while maintaining a low profile.

As shown in FIG. 35, spools (3536) and (3534) are respectively coupled to cables (3506) and (3508) that are wrapped around the spools. The cables (3506) and (3508) route through the system to actuators (3518) and (3520), respectively.

The cables (3506) and (3508) are respectively positioned in part by the use of "arms" (3540) and (3542). The arms (3540) and (3542) provide a framework for which pulleys and/or pivot points may be positioned. The base of arm (3540) is at arm slider (3510) and the base of arm (3542) is at arm slider (3512). In some embodiments, the arms pivot vertically, with the pivot point being at the base of the arm. In some embodiments, the arm is mounted to the slider, which is able to slide or translate vertically up and down along the rail/track. This allows the position of an actuator to be adjusted along the vertical z-axis. In some embodiments, the rail/track rotates, allowing the arms to be pivoted/positioned horizontally.

The cable (3506) for a left arm (3540) is attached at one end to actuator (3518). The cable routes via arm slider (3510) where it engages a pulley as it changes direction, then routes along the axis of rotation of track (3514). At the top of rail/track (3514), fixed to the frame rather than the track, is pulley (3544) that orients the cable in the direction of pulley (3546), that further orients the cable (3506) in the direction of spool (3536), wherein the cable (3506) is wound around spool (3536) and attached to spool (3536) at the other end.

Similarly, the cable (3508) for a right arm (3542) is attached at one end to actuator (3520). The cable (3508) routes via slider (3512) where it engages a pulley as it changes direction, then routes along the axis of rotation of rail/track (3516). At the top of the rail/track (3516), fixed to the frame rather than the track is pulley (3548) that orients the cable in the direction of pulley (3550), that further orients the cable in the direction of spool (3534), wherein the cable (3508) is wound around spool (3534) and attached to spool (3534) at the other end.

One use of pulleys (3546, 3550) is that they permit the respective cables (3506, 3508) to engage respective spools (3536, 3534) "straight on" rather than at an angle, wherein "straight on" references being within the plane perpendicular to the axis of rotation of the given spool. If the given cable were engaged at an angle, that cable may bunch up on one side of the given spool rather than being distributed evenly along the given spool.

In the example shown in FIG. 35, pulley (3550) is lower than pulley (3546). This demonstrates the flexibility of routing cables. In one embodiment, mounting pulley (3550) leaves clearance for certain design aesthetic elements that make the machine appear to be thinner.

In one embodiment, the exercise machine/appliance passes a load/resistance against the user via one or more lines/cables, to a grip(s) (examples of an actuator) that a user displaces to exercise. A grip may be positioned relative to the user using a load arm and the load path to the user may be steered using pulleys at the load arm ends, as described above. The load arm may be connected to a frame of the exercise machine using a carriage that moves within a track that may be affixed to the main part of the frame. In one embodiment, the frame is firmly attached to a rigid structure such as a wall. In some embodiments, the frame is not mounted directly to the wall. Instead, a wall bracket is first mounted to the wall, and the frame is attached to the wall bracket. In other embodiments, the exercise machine is mounted to the floor. The exercise machine may be mounted to both the floor and the wall for increased stability. In other embodiments, the exercise machine is a freestanding device.

In some embodiments, the exercise machine includes a media controller and/or processor, which monitors/measures user performance (for example, using the one or more sensors described above), and determines loads to be applied to the user's efforts in the resistance unit (e.g., motor described above). Without limitation, the media controller and processor may be separate control units or combined in a single package. In some embodiments, the controller is further coupled to a display/acoustic channel that allows instructional information to be presented to a user and with which the user interacts in a visual manner, which includes communication based on the eye such as video and/or text or icons, and/or an auditory manner, which includes communication based on the ear such as verbal speech, text-to-speech synthesis, and/or music. Collocated with an information channel is a data channel that passes control program information to the processor which generates, for example, exercise loading schedules. In some embodiments, the display is embedded or incorporated into the exercise machine, but need not be (e.g., the display or screen may be separate from the exercise machine, and may be part of a separate device such as a smartphone, tablet, laptop, etc. that may be communicatively coupled (e.g., either in a wired or wireless manner) to the exercise machine). In one embodiment, the display is a large format, surround screen representing a virtual reality/alternate reality environment to the user; a virtual reality and/or alternate reality presentation may also be made using a headset.

In one embodiment, the appliance media controller provides audio information that is related to the visual information from a program store/repository that may be coupled to external devices or transducers to provide the user with an auditory experience that matches the visual experience. Control instructions that set the operational parameters of the resistance unit for controlling the load or resistance for the user may be embedded with the user information so that the media package includes information usable by the controller to run the machine. In this way a user may choose an exercise regime and may be provided with cues, visual and auditory as appropriate, that allow, for example, the actions of a personal trainer to be emulated. The controller may further emulate the actions of a trainer using an expert system and thus exhibit artificial intelligence. The user may better form a relationship with the emulated coach or trainer, and this relationship may be encouraged by using emotional/mood cues whose effect may be quantified based on performance metrics gleaned from exercise records that track user performance in a feedback loop using, for example, the sensor(s) described above.

Assisted Controlling of Digital Weight

Various control mechanisms may be used to rack (e.g., load) or unrack (e.g., unload) the digital weight described above. As one example, the handles may be smart accessories that include buttons or other types of controls via which the user may activate to explicitly indicate whether they would like to rack or unrack the digital weight. For example, the smart handles may include a button that the user presses on to explicitly indicate whether they would like to rack or unrack the digital weight (and thereby control where the motor activates or not). In another embodiment, the exercise machine is always loaded (with the motor providing resistance), in a similar way that a typical physical weight would always be present when connected in a weight stack.

The following are embodiments of controlling racking of digital weight. The techniques described herein provide various benefits, from safety to ergonomics.

While smart accessories may be used to control whether the digital weight is on or off for many exercises, there may be some exercises where there may be ergonomic challenges due to where the buttons are located on the smart accessory. For example, consider the goblet squat. Buttons on a handle or actuator may be in certain fixed locations. Depending on how the user grips a handle to perform the exercise, it may be challenging for them to press a button on the handle, given its location. Further, some accessories, such as ropes, may not be as conducive to having a button or other type of control input. Using the techniques described herein, improvements to ergonomics for controlling digital weights may be achieved, allowing users, for example, to interact with actuators in a more stable position throughout the entire range of motion (rather than, for example, having to move their hands at some point to press a button).

In some embodiments, the assisted motor control techniques described herein are based on determining that a user has completed exercise. In some embodiments, the determination that the user has completed exercise is based on detecting a state of the cable(s) of the digital strength trainer. In this way, the completion of exercise by the user may be inferred, without the user having to provide an explicit input to a control (e.g., by pressing a button). Further details regarding detecting exercise completion and resistance control are described below.

Assisted Weight Off (Assisted Racking Mode)

The following are embodiments and details regarding assisted racking of digital weights (e.g., reduction in resistance provided by a motor). In some embodiments, the assisted racking is performed by detecting, based on determination of a state of a cable, that a user has completed an exercise. Based on the determination that the user has completed the exercise (based on detecting the state of the cable), the resistance is selectively removed (e.g., ramped down). In various embodiments, the assisted racking techniques described herein may be used to address challenging scenarios such as those in a bench press, where it may not be clear whether a user is struggling with a weight (and where the user is stuck because they are unable to move further) or is simply holding steady. The techniques described herein allow how the exercise machine to differentiate between such possibilities, without reliance on gestures or explicit inputs from the user.

In various embodiments, the racking techniques described herein are implemented on embedded microcontrollers in the motor control board. For example, a PID (proportional-integral-derivative) controller is used. This allows for fast and reliable execution of the technique (as the motor control board may be run at a high frequency, and is directly connected to the motor(s) being controlled). In this way, the decisions on how to control the motor are made and executed in real time. In some embodiments, the racking techniques described herein take as input parameters that may be determined by the computing node on the exercise machine, which may in turn determine the parameters using information from a backend.

Figure 36:
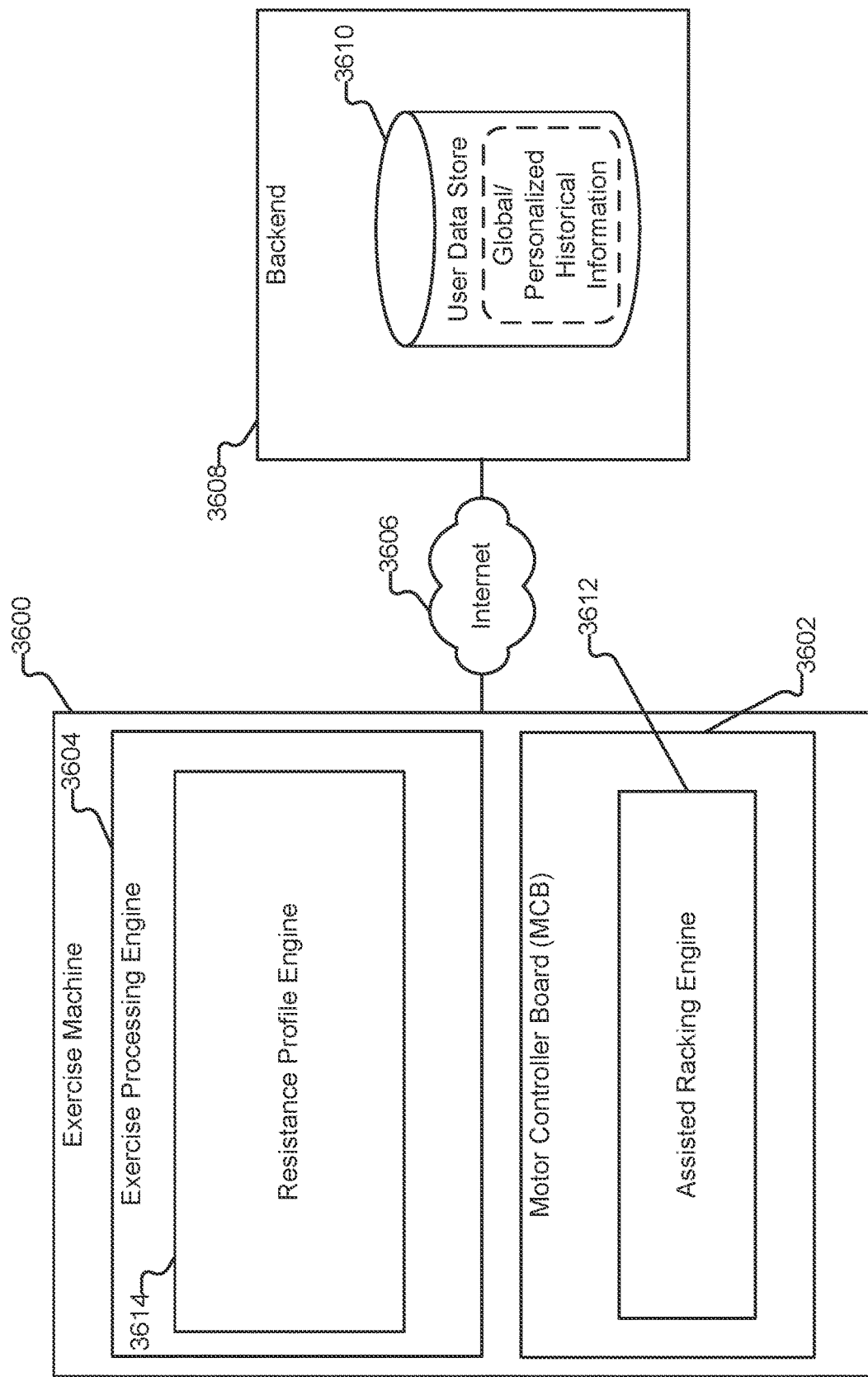
FIG. 36 illustrates an embodiment of a system for assisted racking of digital resistance.

FIG. 36 illustrates an embodiment of a system for assisted racking of digital resistance. As shown in this example, there are various systems that interact with each other. In this example, the exercise machine 3600 includes motor controller board 3602. In some embodiments, exercise machine 3600 is an example or alternate view of the exercise machine of FIG. 35. In some embodiments, the motor control board is at the firmware/embedded hardware level and interacts with hardware components such as the motor. The exercise machine further includes exercise processing engine 3604. As one example, the exercise processing engine is implemented using Android. In some embodiments, the exercise processing engine performs computations and communicates with the motor controller board. In some embodiments, the exercise machine communicates (over a network 3606 such as the Internet) with a backend server 3608. In some embodiments, the backend aggregates exercise data from various client exercise machines, and, for example, stores such data to data store 3610. The backend may perform various processing based on such information, which may be communicated to the exercise machine for use.

Each of the three systems (motor control board, exercise processing engine, and backend) may operate on different timescales. For example, the motor controller may be implemented using a PID controller, that is a tight loop that may operate on the millisecond level. This allows dynamic motor control in real time. In this example, the MCB includes assisted racking engine 3612, which is configured to perform dynamic motor control to facilitate assisted racking of digital weights. In some embodiments, the assisted racking engine performs motor control to adjust resistance based on measurements and samples collected from various sensors (e.g., based on motor speed measurements, motor position measurements, etc.).

The exercise processing engine 3604 may not be able to perform real-time motor control, but may have more computational resources to determine parameters and instructions, which are sent to the motor control board, for example, at the start, during, or end of a set. In some embodiments, the exercise processing engine includes resistance profile engine 3614, which is configured to determine input parameters for resistance profiles to be executed by the motor control board when determining how to control resistance provided by the motor. In some embodiments, resistance profile engine 3614 is also configured to determine what resistance profile or strength curve is to be used by the motor control board. For example, the resistance profile engine is configured to send signals to the motor control board to switch between different modes of operation, to pass input parameters used by the assisted racking techniques being executed on the motor controller, etc. As one example, the computing node may determine what type of strength curve that the motor control board should be executing, as well as the parameters for the strength/force curve. In other embodiments, the logic for determining how to control the motor for assisted racking is implemented in one or both of the MCB and the computing node (e.g., Android tablet).

The backend may perform various other types of processing, such as pre-processing of personalized historical data to predict the user's range of motion, to predict the first maximum range of motion, predict the speed at which the user may perform a repetition, etc. Such information may be computed at the backend, which is then sent to the computing node on the exercise machine (e.g., at the beginning of a set or a workout), where such parameters may then be forwarded by the computing node to the motor control board, which implements the motor control loop. For example, such parameters may be used as inputs to the strength curve or profile executed by the motor control board to facilitate assisted racking of digital weights.

The following are embodiments of techniques for assisted racking of digital weights.

Embodiments of assisted racking techniques include time and position-based weight control techniques. The time and position-based weight techniques may be used independently or in conjunction. In some embodiments, the two types of techniques work together to facilitate assisted racking of digital weights. In some embodiments, the resistance provided by the motor is selectively set to whichever technique outputs a lower target weight.

Timer-Based Weight Off

In one embodiment of an assisted racking mode, a timer is used. As one example, after the user holds the actuator still for a threshold amount of time, the digital weight/resistance is racked and removed or reduced (e.g., ramped down). The stillness of the cable may be determined from samples of the cable position. If the deviation of the cable from one sample to a subsequent sample is within a threshold amount of cable change, then the cable is determined to have been held still between those two samples. If the cable position has not changed by more than a threshold amount in the time between samples that spans the threshold amount of time, then the user is determined to have remained still. As another example, the cable velocity is measured. The cable velocity being below a threshold velocity may be used to indicate that the user is holding still (or that movement of the cable is below a threshold amount of movement). An exponentially weighted moving average of the observed cable velocity may be used to reduce noise and jitters in collected cable position updates/samples.

In some embodiments, the length of the timer that is used is dependent on what repetition the user is currently on in their set. As one example, the length or duration of the timer is different depending on whether the user has reached their repetition goal for a set (that is, the length of the timer may change depending on where the user is in their set). For example, if the repetition goal has not been reached yet, the length of the timer is set to be longer than what it would be if the user has already reached their repetition goal, because the user might be struggling, but does not necessarily want to finish the exercise. That is, the longer threshold amount of time is used by the exercise machine to distinguish between struggling by the user and an intent by the user to complete the exercise prematurely (prior to the repetition goal being met). Whereas, if the repetition goal has been reached, then there is a higher likelihood that the stillness of the cable is indicative that the user has completed their exercise, and the exercise machine need not wait as long to perform racking (it is more likely that the user is intending to signal to have the weight racked, versus struggling to perform the exercise). For example, the duration of the timer may be five seconds during a set (prior to completion of the repetition goal), and two second after the set (after the rep goal is met, indicating that the set has been completed). Thus, by having a timer with different lengths based on different conditions (e.g., whether or not a repetition goal has been met yet), a mechanism is provided that not only ramps resistance down at the end of a set, but also provides assistance in turning the resistance off in the middle of a set. In some embodiments, the mid-set assistance is optional when paired with a smart accessory.

The mapping between the timer length (to detect completion of the exercise, or detect behavior indicative of a user completing an exercise, in which the resistance is to be racked) and repetition number may be determined in various ways. As one example, global data collected across users and/or personal historical data pertaining to the user performing the exercise may be used to determine the timer length. One example of such data that is used to determine the timer length relative to repetition number includes the frequency with which the user finishes their set. For example, such information may be determined from the global data aggregated by backend 3608.

In some embodiments, the timer length is also dependent on the range of motion (another example of cable state that is detected by the exercise machine). For example, if the user is intending to hold the actuator in place to turn off the resistance, it is most likely that they will hold the actuator still to turn off the resistance at the extremum (e.g., minimum and maximum of range of motion).

In the middle of the range of motion, stillness in the actuator is more likely an indication that the user is struggling and should be spotted (versus the user indicating that they want the weight to be turned off). In some embodiments, the exercise completion timer is set to be longer in the middle of the range of motion as compared to at the extremum of the range of motion. By having a longer time in the middle of the range of motion, this allows the exercise machine to first initiate the spotter (e.g., using embodiments of the spotter protocol described above) to reduce the weight to determine if the person is struggling (versus wanting to end their exercise). If the user continues to hold still after the dynamic spotter has been activated (e.g., by meeting or exceeding the exercise completion threshold timer), then the exercise machine determines that the user has completed (or would like to otherwise end) their exercise, and the exercise machine ramps down the digital weight resistance.

As shown in the above example, the interactions and interplay between the dynamic spotting protocol and the assisted racking mode may be controlled by adjusting the exercise completion detection timer, as well as using the state of the cable position to determine when certain modes are activated. For example, the dynamic spotting protocol may be configured to be more sensitive in the middle of a range of motion (e.g., away from the extremum of the range of motion), while the timed weight off is configured to be more sensitive at the extremum of the range of motion of a repetition. The initiation or activation of the timed weight off may also be dependent on the movement being performed.

For example, some movements may start at a min or a max of the range of motion, depending on biomechanics. Thus, the regions of activity (defined, for example, based on cable position markers), may be different for the dynamic spotting protocol and the timed weight off technique, where one is active in regions where the other is less active. For example, the assisted racking mode may be activated when the user is in the top 15% of their range of motion, while the spotting is not allowed to activate in that portion of the range of motion. Having non-overlapping active regions minimizes the amount of conflict between the two modes, and allows the exercise machine to more accurately distinguish between whether the digital weight should be racked, or whether spotting should be performed.

Thus, when spotting or timed weight off (timed racking) is active may be tuned. For example, the spotting and the timed weight off may have different amounts of time before they are activated. For example, the timed weight off may include a longer timer than what is used to activate spotting. For example, the timer for starting timed weight off may be set to be longer than the time needed to activate spotting such that when the user begins moving the weight (at the reduced resistance determined by the spotting protocol), the timer for the timed weight off has not been met, and can be cancelled. For example, if after spotting, the user continues movement (which may be detected by evaluating cable position updates and determining that the user is no longer still), then the exercise machine determines that this is an indication that the absence of motion by the user was not an intent to end their exercise, and thus the timed weight off timer can be reset (where the timer for activating timed weight off starts when the cable position is determined to be still).

The following is an example of a timer-based assisted racking mode. In this example, consider the goblet squat. In this example, the motor control board tracks an exponential moving average of the velocity of the cable (e.g., to remove noise or jitter in the cable position samples/updates). The motor control board tracks whether the cable position is being held in place. The exercise machine also tracks what repetition the user is on, as well as what the repetition goal is. As one example, when the user reaches their repetition goal, the assisted racking mode becomes active. An indicator may be presented in a display of the exercise machine. For example, a weight dial may be presented to the user indicating the amount of resistance they are exercising against. An indicator, such as a pill or bar or meter that may be filled up, indicates to the user that if they wish to turn off the weight, they are to hold the cable position still. An indication of the amount of time (e.g., two seconds) needed to hold the cable position still in order to indicate completion of exercise may also be presented as output. As the user holds still, the bar fills up. In some embodiments, if the user starts to move, then the timer resets. If the user continues to hold the actuator still, when the bar fills up (e.g., after the completion timer of two seconds has been fulfilled), then the exercise machine racks the digital weight by removing or otherwise reducing the resistance (e.g., by reducing the torque of the motor) to ramp the weight down.

The following are embodiments of techniques for determining whether a user is holding still (and not moving). As one example, a determination is made whether the absolute value of the cable speed is above or below a threshold hold speed (e.g., five inches per second). If the measured cable speed is below the threshold, the user is determined to not be moving. If the measured cable speed is above the threshold, then the user is determined to be moving.

As shown in the above examples, the timer for the assisted racking may be triggered or started based on various conditions being met (e.g., rep goal, repetition count, range of motion, etc.). In some embodiments, the time-based weight off mode is always active, where the timer starts once the user holds still, but the duration of the timer changes based on various workout parameters. In some cases, the duration of the timer may be infinite, for example. For example, before the user has completed their repetition (or duration goal, depending on the type of exercise), the timer for the assisted weight off may be set to infinite (effectively making the assisted weight off inactive) until the user has finished their set (e.g., by meeting their rep goal), where the timer may then be set to a finite value. In this way, either the timer is not started, or the timer is started, but with an infinite duration (where the timer length may then be adjusted based on the type of detected conditions).

Having such an assisted racking mode, in which the user need not perform an explicit activation of a control input (e.g., pressing of a button on an accessory), has various benefits. For example, the assisted racking mode described herein provides an ergonomic way to reduce the resistance for moves such as goblet squats, where the grip on a handle to perform such exercises may make it uncomfortable to access buttons or other types of controls on the handle used to explicitly indicate or signal or issue a command to turn the resistance off.

In some embodiments, the assisted racking mode may be limited to a selected set of exercise movements and/or when the user has reached a repetition goal.

In some embodiments, the computing node (e.g., exercise processing engine 3604, such as an android tablet) issues commands to the motor control board to indicate what mode to operate in (e.g., spotter mode or assisted racking mode).

The following are further embodiments of time-based weight off. In some embodiments, when an actuator (e.g., one or both of the handles in a two-armed digital strength trainer) is ungrounded, the average motor speed is calculated. For example, the average motor speed may be calculated in a sliding window, such as a ⅓ second sliding window. The average speed is compared against a threshold, and it is determined whether the average speed is below the threshold for a threshold period of time. The resistance is then removed if the average speed is below the threshold for the threshold amount of time (e.g., speed being below the speed threshold persists for the threshold amount of time). Different thresholds may be applied depending on where the user is in the set relative to their rep goal. As one example, if the average speed is below six inches per second for six seconds prior to the rep goal, the resistance is removed. As another example, if the average speed is below six inches per second for 3.5 seconds (shorter timer length as compared to if the user has not yet completed their rep goal) after the repetition goal, the resistance is removed (i.e., racking is performed). In some embodiments, a countdown to weight being turned off is presented to the user. For example, a countdown with beeps is shown for the final three seconds prior to racking being initiated. In some embodiments, such as when the countdown is visible, a meter is rendered to display the current average speed.

In various embodiments of the time-based weight off scheme described herein, the exercise machine monitors for an absence or minimization of movement from the user. If the user is not moving much, the exercise machine infers that this is an indication that the user is likely done with their set, and the exercise machine, in response, automatically turns off or otherwise reduces the digital resistance on behalf of the user. For example, in some embodiments, during a set, when the absolute value of speed is below a threshold speed for a threshold amount of time (e.g., below five inches/second for six seconds), then the digital resistance is reduced. In some embodiments, as the digital strength trainer has inferred that the user has completed the exercise, the digital strength trainer also ends the set in response. This is an example of the exercise machine using the detected cable state to also affect the workout programming being presented. In some cases, a spotter could have engaged if the user is waiting at the bottom of the rep after an eccentric phase. This may be acceptable because, in some embodiments, being spotted on the last rep does not necessarily result in a reduced weight on the next set.

The following are additional embodiments of time-based weight off. In some embodiments, after two seconds (or any other threshold amount of time, as appropriate), the exercise machine starts ramping weight down. In some embodiments, the exercise machine ramps the digital weight back up if the user starts to move. In some embodiments, the digital resistance is ramped down or otherwise reduced if it is detected that a user has performed a rep that is 10-50% (or any other proportion, as appropriate) of ROM (range of motion) of the previous rep.

Range of Motion/Position-Based Weight Off

The following are embodiments of range of motion-based assisted racking of digital weights. In this example, during performance of exercise repetitions, the exercise machine detects what the minimum range of motion is for the user's repetitions. The exercise machine then applies a window below that threshold. If it is detected that the user (based on a current cable position) is below that threshold, then the resistance is ramped down (e.g., racking is performed). The resistance may be ramped down proportionally.

As one example, consider the bicep curl exercise. Suppose the user performs their repetitions. The user's minimum range of motion is at the bottom of the repetition, where the user's arms are extended downwards (and the cable is at its minimum extension). Now suppose that the user puts the handle down on the ground. In response to detecting that the user has gone below the minimum range of motion, the exercise machine determines that this is an indication that the user has completed exercising, and lowers the amount of resistance (by controlling the motor to reduce torque).

As another example, consider the bench press exercise. In this example, suppose that the bench press is performed using two handles, one from each of the arms (in an embodiment of a two-armed digital strength trainer). Suppose that the user is laying down on the bench, and has finished their bench press exercises. The user has completed the eccentric phase, where their hands are close to their body (versus extended upwards), such that the cable is at the minimum range of motion. When the user turns or rolls over (e.g., raising one shoulder and lowering the other), this will cause one side of the handles to go below the minimum range of motion for their reps, which the exercise machine detects and racks the weight accordingly (e.g., ramping down the resistance).

In some embodiments, when the user falls into the window below the minimum range of motion, the weight is ramped down proportionally. In some embodiments, if the user decides to continue to perform the exercise, and enters a concentric phase, the resistance is increased again. For example, if the user comes out of the window for activating racking, this will be a concentric phase (since they were lowering previously, and are pulling on the cable again, which is a concentric phase). If this occurs, the baseline minimum range of motion may be re-established (where, in some embodiments, the range of motion is updated as the user performs their repetitions). The window for activating reduction of the resistance may then be adjusted accordingly. For example, if the user goes below the range of motion, but begins to pull up on the cable again, then the exercise machine determines that the user is not indicating completion of exercise, but that the minimum range of motion should be updated. The resistance may be increased according to various weight profiles.

For example, in range of motion-based assisted racking, in order to avoid falsely determining that the user has completed the exercise when racking, the weight is not immediately removed, but rather, a ramp is applied. In this way, if the user comes back into the range for performing the exercise (and out of the window for activating racking), the resistance may be increased (as this is an indication that the user had not intended to finish the exercise, but had instead happened to go lower on this rep).

Further parameters, rules, and heuristics may be used to establish the baseline. For example, in some exercises, such as overhead tricep extension, users may gradually take half a step backwards on each rep. In some embodiments, the exercise machine tracks the changes to the minimum range of motion over time (e.g., its absolute cable position) to determine a new minimum range of motion (and corresponding cable position). For example, the exercise machine determines whether the maximum range of motion has changed, or whether the entire range of motion has shifted, or whether only a minimum or maximum has changed. The exercise machine uses the observed position updates to infer, predict, or otherwise determine what the next minimum range of motion is.

The following are further embodiments of position-based weight off. In some embodiments, when the digital weight is on (i.e., the motor is providing resistance by tensioning the cable), and the digital weight is ungrounded (e.g., the user is pulling the cable, such that they are using an actuator to resist the motor), the position of the cable is tracked. For example, the position of the cable is tracked relative to a baseline minimum range of motion.

In some embodiments, the baseline minimum range of motion is calculated as follows. For moves that start on a minimum (e.g., with the actuator at its lower point in the range of motion for an exercise), the total cable length is measured with the resistance turned on (where ramping of the weight to the target weight is begun), and at the end of the weight being ramped up to the target weight. In some embodiments, the minimum cable position is used as the baseline minimum range of motion.

In some embodiments, variable constants of the position-based technique are used to establish a default minimum range of motion for moves that start at the maximum range of motion and that will have consistent minimum ranges of motion between users, such as bench press. In some embodiments, on each repetition, the minimum range of motion is re-established as the minimum total cable length for that repetition.

In some embodiments, the variable constants are used to establish a position window starting from a inches (or any other measure or unit of distance as appropriate) below the minimum range of motion, and ending at b inches below the minimum range of motion. In some embodiments, a target weight w is also established. For example, the target weight w is established as a percentage of the original weight (e.g., suggested weight that is provided for the exercise). In some embodiments, the weight/resistance is selectively removed by ramping it down from the original weight to w as the cable length moves from a to b.

The position-based weight off techniques described herein may also be used in conjunction with the timed weight off racking techniques above. As one example, the weight/resistance is maintained at the minimum cable length until the user triggers the timed weight off or grounds the digital weight (e.g., by allowing the cable to retract fully into the arms).

In some embodiments, the assisted racking modes are disabled for certain moves (e.g., bar moves). In some embodiments, the execution or activation of a weight off mode is delayed. For example, suppose an exercise machine with two arms is used. In some embodiments, execution of the timed weight off mode is delayed if the difference between the cables (e.g., there is a skew in the cable positions between the left and right cables) is larger than a threshold deviation or skew. In some embodiments, assisted weight on techniques are disabled for a certain amount of time after a timed weight off has occurred after a complete set (e.g., after a rep goal has been met). In some embodiments, the digital weight is racked when grounded (e.g., actuator is allowed to retract fully, similar to when a user returns a handle of a cable machine, along a weight stack to return to rest, grounded) at any part of the position window. In some embodiments, the timed weight off technique is triggered when the user is past the minimum position of the position window. In some embodiments, when setting the minimum range of motion for the position-based weight off window, the first repetition is ignored. A default is replaced with the second repetition, where the minimum range of motion is determined from the subsequent repetitions.

In some embodiments, the time-based weight off techniques and the position-based weight off techniques are combined. For example, the position-based scheme (e.g., where the user going below the bottom of the range of motion is detected by the exercise machine as an indication that the user is done with their set, and the digital resistance is reduced in response) is layered on top of the time-based weight off scheme. As one example, in addition to the time-based scheme, during a set, when the position of the cable goes below the previous rep's minimum cable position (or the ending position of an eccentric phase or starting position of an concentric phase), the base weight is ramped down proportionally with the cable position following the below example code, which in this example has three example parameters, window_start_inches_below_rep (inches/arm), window_end_inches_below_rep (inches/arm), and window_end_base_weight_percentage (percentage of base weight to ramp down to at the end of the position window):

Trainer_arms_double_factor=1+trainer_arms_pulled_same_time window_start_inches_below_*rep**=trainer_arms_double_factor window_end_inches_below_rep*=trainer_arms_double_factor window_distance=(window_end_inches_below_rep−window_start_inches_below_rep)

distance_above_end_of_window=position−(previous_rep_min_position−window_end_inches_below_rep)

position_window_fraction=distance_above_end_of_window/window_distance//1 at start (high pos) of window,0 at end(low pos)

base_weight_fraction=((100.0−window_end_base_weight_percent)*position_window_fraction+window_end_base_weight_percent)/100.0//1.0 at start of window(high pos), at end(low pos)

reduced_base_weight=original_base_weight*base_weight_fraction

In some embodiments, if the cable position goes below the bottom of the window (position_window_fraction<0 above), then the digital resistance is reduced. In some embodiments, the set is also ended.

In some embodiments, if the position increases again (position_window_fraction>1), then the set continues as normal with, for example, the full base weight.

In some embodiments, the various thresholds are dependent on the exercise movement. For example, bench press, due to the bench, is very regular and so a smaller position window and faster ramping may improve the user experience. Rows typically have more variability, and may benefit from larger position windows and/or slower ramping.

Asymmetric Handle-Based Weight Off Scheme

As another example for detecting user completion of an exercise (or otherwise determining a user intent to rack a digital weight), an asymmetric handle-based scheme is provided by the exercise machine. In some embodiments, in an asymmetric handle-based scheme, the user performs a motion such as moving one handle, but not the other, after completing the desired sets. In some embodiments, if the handle movement is adequately asymmetrical (e.g., the difference between the cable positions exceeds a threshold deviation), the weight is shut off after, for example, audible and visual warning.

Figure 37:
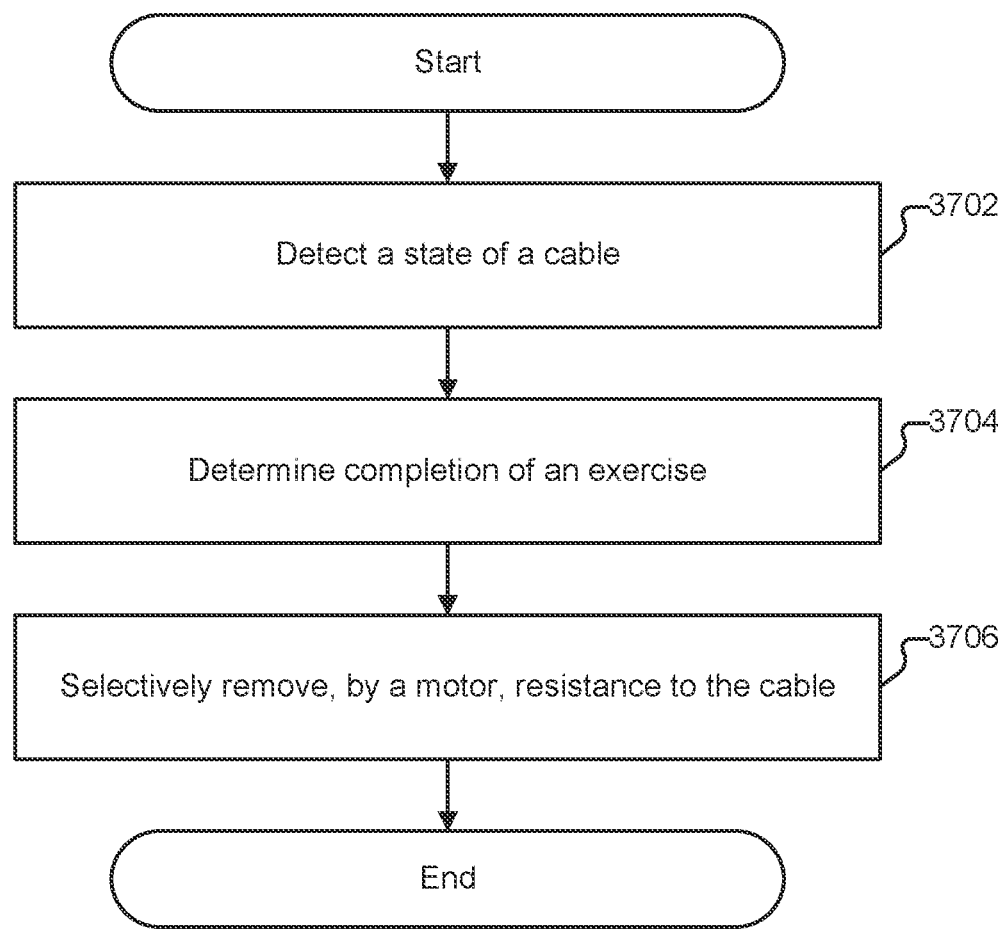
FIG. 37 is a flow diagram illustrating an embodiment of a process for assisted racking of digital resistance.

FIG. 37 is a flow diagram illustrating an embodiment of a process for assisted racking of digital resistance. In some embodiments, process 3700 is executed by exercise machine 3600 of FIG. 36. The process begins at 3702 when a state of a cable is detected (e.g., based on cable position measurements). In some embodiments, a motor is mechanically coupled to the cable to provide resistance during an exercise by tensioning the cable. At 3704, completion of an exercise is determined based at least in part on the detected state of the cable. At 3706, resistance is selectively removed from the cable based at least in part on the determination that the user has completed the exercise. As described in further detail above, in various embodiments, the removal of the resistance is timer-based and/or based on range of motion.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. An exercise machine, comprising:
a cable;
a motor mechanically coupled to the cable to provide resistance during an exercise by tensioning the cable; and
a sensor that detects a state of the cable;
wherein the resistance is selectively removed from the cable in response to a determination that a user has completed an exercise, wherein the determination that the user has completed the exercise is based at least in part a determination that movement of the cable is below a threshold for a threshold period of time, and wherein the threshold period of time is selected based at least in part on whether the user has completed a repetition goal.

2. The exercise machine of claim 1, wherein a timer is used to determine whether the threshold period of time has been met or exceeded.

3. The exercise machine of claim 1, wherein the resistance is selectively removed based at least in part on a determination that a position of the cable is within a window that is below a minimum range of motion.

4. An exercise machine, comprising:
a cable;
a motor mechanically coupled to the cable to provide resistance during an exercise by tensioning the cable; and
a sensor that detects a state of the cable;
wherein the resistance is selectively removed from the cable in response to a determination that a user has completed an exercise, wherein the determination that the user has completed the exercise is based at least in part on a determination that movement of the cable is below a threshold for a threshold period of time, and wherein the threshold period of time is selected based at least in part on a point that the user is in a range of motion.

5. The exercise machine of claim 4, wherein the threshold period of time is longer in a middle portion of the range of motion, as compared to an upper or lower portion of the range of motion.

6. An exercise machine, comprising:
a cable;
a motor mechanically coupled to the cable to provide resistance during an exercise by tensioning the cable; and
a sensor that detects a state of the cable;
wherein the resistance is selectively removed from the cable in response to a determination that a user has completed an exercise, wherein the determination that the user has completed the exercise is based at least in part on the detected state of the cable, wherein the resistance is selectively removed based at least in part on a determination that a position of the cable is within a window that is below a minimum range of motion, and wherein an amount of the resistance that is removed is based at least in part on the position of the cable relative to the window.

7. An exercise machine, comprising:
a cable;
a motor mechanically coupled to the cable to provide resistance during an exercise by tensioning the cable; and
a sensor that detects a state of the cable;
wherein the resistance is selectively removed from the cable in response to a determination that a user has completed an exercise, wherein the determination that the user has completed the exercise is based at least in part on the detected state of the cable, wherein the resistance is selectively removed based at least in part on a determination that a position of the cable is within a window that is below a minimum range of motion, and wherein based at least in part on a determination that the position of the cable has increased subsequent to being in the window, the resistance is selectively increased.

8. A method, comprising:
detecting, using a sensor, a state of a cable, wherein a motor is mechanically coupled to the cable to provide resistance during an exercise by tensioning the cable; and
selectively removing the resistance from the cable in response to a determination that a user has completed an exercise, wherein the determination that the user has completed the exercise is based at least in part on a determination that movement of the cable is below a threshold for a threshold period of time, and wherein the threshold period of time is selected based at least in part on whether the user has completed a repetition goal.

9. The method of claim 8, wherein a timer is used to determine whether the threshold period of time has been met or exceeded.

10. The method of claim 8, wherein the resistance is selectively removed based at least in part on a determination that a position of the cable is within a window that is below a minimum range of motion.

11. A method, comprising:
detecting, using a sensor, a state of a cable, wherein a motor is mechanically coupled to the cable to provide resistance during an exercise by tensioning the cable; and
selectively removing the resistance from the cable in response to a determination that a user has completed an exercise, wherein the determination that the user has completed the exercise is based at least in part on a determination that movement of the cable is below a threshold for a threshold period of time, and wherein the threshold period of time is selected based at least in part on a point that the user is in a range of motion.

12. The method of claim 11, wherein the threshold period of time is longer in a middle portion of the range of motion, as compared to an upper or lower portion of the range of motion.

13. A method, comprising:
detecting, using a sensor, a state of a cable, wherein a motor is mechanically coupled to the cable to provide resistance during an exercise by tensioning the cable; and
selectively removing the resistance from the cable in response to a determination that a user has completed an exercise, wherein the determination that the user has completed the exercise is based at least in part on the detected state of the cable, wherein the resistance is selectively removed based at least in part on a determination that a position of the cable is within a window that is below a minimum range of motion, and wherein an amount of the resistance that is removed is based at least in part on the position of the cable relative to the window.

14. A method, comprising:
detecting, using a sensor, a state of a cable, wherein a motor is mechanically coupled to the cable to provide resistance during an exercise by tensioning the cable; and
selectively removing the resistance from the cable in response to a determination that a user has completed an exercise, wherein the determination that the user has completed the exercise is based at least in part on the detected state of the cable, wherein the resistance is selectively removed based at least in part on a determination that a position of the cable is within a window that is below a minimum range of motion, and wherein based at least in part on a determination that the position of the cable has increased subsequent to being in the window, the resistance is selectively increased.

\* \* \* \* \*